(12) United States Patent
Debora et al.

(10) Patent No.: US 12,485,619 B2
(45) Date of Patent: Dec. 2, 2025

(54) APPARATUS, METHODS AND SYSTEMS FOR AUTOMATIC, CONFIGURABLE MANUFACTURING WORKFLOW FOR ADDITIVE MANUFACTURING SYSTEMS

(71) Applicant: Mosaic Manufacturing Ltd., Toronto (CA)

(72) Inventors: Mitchell Oliver Debora, Thornhill (CA); Derek Alan Vogt, Calgary (CA); Christopher Patrick Labelle, Canmore (CA); Alireza Olia, Mississauga (CA); Robert Douglas Vincent Wood, Guelph (CA)

(73) Assignee: Mosaic Manufacturing Ltd., Toronto (CA)

(*) Notice: Subject to any disclaimer, the term of this patent is extended or adjusted under 35 U.S.C. 154(b) by 539 days.

(21) Appl. No.: 17/705,578

(22) Filed: Mar. 28, 2022

(65) Prior Publication Data

US 2022/0324177 A1  Oct. 13, 2022

Related U.S. Application Data

(60) Provisional application No. 63/167,601, filed on Mar. 29, 2021.

(51) Int. Cl.
*B33Y 50/02* (2015.01)
*B29C 64/209* (2017.01)
(Continued)

(52) U.S. Cl.
CPC .......... *B29C 64/393* (2017.08); *B29C 64/209* (2017.08); *B29C 64/245* (2017.08);
(Continued)

(58) Field of Classification Search
CPC ... B29C 64/393; B29C 64/209; B29C 64/245; B29C 64/307; B29C 64/118;
(Continued)

(56) References Cited

U.S. PATENT DOCUMENTS

| 8,419,996 B2 | 4/2013 | Swanson et al. |
| 10,307,961 B2 | 6/2019 | Rezayat |

(Continued)

FOREIGN PATENT DOCUMENTS

| WO | 2020198881 A1 | 10/2020 |
| WO | 2021076115 A1 | 4/2021 |
| WO | 2022/204794 A1 | 10/2022 |

OTHER PUBLICATIONS

International Search Report and Written Opinion for International Application No. PCT/CA2022/050458, entitled "Apparatus, Methods and Systems for Automatic, Configurable Manufacturing Workflow for Additive Manufacturing Systems," with a mailing date of Jun. 27, 2022.

(Continued)

*Primary Examiner* — Christopher E. Everett
(74) *Attorney, Agent, or Firm* — Hamilton, Brook, Smith & Reynolds, P.C.

(57) ABSTRACT

Described is automatic, configurable manufacturing workflow (ACMW) technology for additive manufacturing (AM) systems. Apparatus, methods and systems employing ACMW technology provide AM systems with increased flexibility. ACMW technology is particularly suitable for lights-out AM and for continuous AM. In various embodiments of ACMW technology, efficiency and/or reliability of an AM system are increased and/or need for maintenance and/or human intervention is decreased. Broadly, ACMW technology can enable practical scale up of production AM, including automatic configuration of 3D printing clusters as may be desired, such automatic configuration including (Continued)

automatic reconfiguration as desired. This increases manufacturing flexibility and can lead to lower total cost per part (TCPP). ACMW technology addresses several cost and efficiency drivers involved in calculation of TCPP.

23 Claims, 9 Drawing Sheets

(51) Int. Cl.
*B29C 64/245* (2017.01)
*B29C 64/307* (2017.01)
*B29C 64/393* (2017.01)
*B33Y 10/00* (2015.01)
*B33Y 30/00* (2015.01)

(52) U.S. Cl.
CPC ............. *B29C 64/307* (2017.08); *B33Y 10/00* (2014.12); *B33Y 30/00* (2014.12); *B33Y 50/02* (2014.12)

(58) Field of Classification Search
CPC ..... B29C 64/176; B29C 64/255; B29C 64/30; B33Y 10/00; B33Y 30/00; B33Y 50/02
See application file for complete search history.

(56) References Cited

U.S. PATENT DOCUMENTS

| | | | |
|---|---|---|---|
| 10,870,268 B2 | 12/2020 | Debora et al. | |
| 2004/0133483 A1* | 7/2004 | Potter | G06Q 10/087 705/28 |
| 2010/0208016 A1 | 8/2010 | Menchik et al. | |
| 2010/0327479 A1* | 12/2010 | Zinniel | B29C 64/106 425/114 |
| 2013/0089642 A1* | 4/2013 | Lipson | B33Y 10/00 426/115 |
| 2014/0288699 A1* | 9/2014 | Williams | B29C 64/25 700/233 |
| 2015/0140145 A1* | 5/2015 | Schmehl | B29C 48/02 425/375 |
| 2015/0174824 A1* | 6/2015 | Gifford | B29C 64/245 425/183 |
| 2016/0082652 A1* | 3/2016 | Snyder | B29C 64/364 264/259 |
| 2017/0266876 A1* | 9/2017 | Hocker | B29C 64/106 |
| 2019/0286384 A1 | 9/2019 | Torrent et al. | |
| 2020/0061920 A1 | 2/2020 | Debora et al. | |
| 2020/0103857 A1* | 4/2020 | Wynne | G05B 19/4099 |
| 2020/0130256 A1 | 4/2020 | Debora et al. | |
| 2021/0041854 A1 | 2/2021 | Golway | |

OTHER PUBLICATIONS

Spool Winder, [online], [retrieved on Jun. 24, 2022]. Retrieved from the internet URL https://www.thingiverse.com/thing:3742997.
Voodoo Manufacturing: Project Skywalker, Mar. 15, 2017, [online], [retrieved on Mar. 9, 2021]. Retrieved from the Internet URL https://www.youtube.com/watch?v=GoNRTucoErE.
Formlabs FormCell, [online], [retrieved on Jun. 24, 2022]. Retrieved from the internet URL https://formlabs.com/3d-printers/form-cell/.
3D Systems Figure 4, [online], [retrieved on Jun. 24, 2022]. Retrieved from the internet URL https://www.youtube.com/watch?v=IYTobOMuMEM&feature=emb_title.
Tiertime X5 3D Print, [online], [retrieved on Jun. 24, 2022]. Retrieved from the internet URL https://www.tiertime.com/x5/.
Prusa Research MMU, [online], [retrieved on Jun. 24, 2022]. Retrieved from the internet URL https://www.prusa3d.com/original-prusa-i3-multi-material-2-0/.
Supplementary EP Search Report for EP Application No. 22778241.4 , Apparatus, Methods and Systems for Automatic, Configurable Manufacturing Workflow for Additive Manufacturing Systems, mailed Jun. 25, 2025.

\* cited by examiner

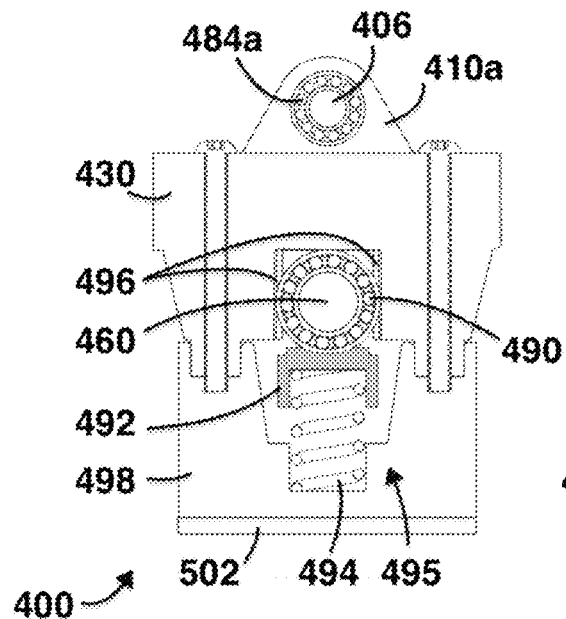
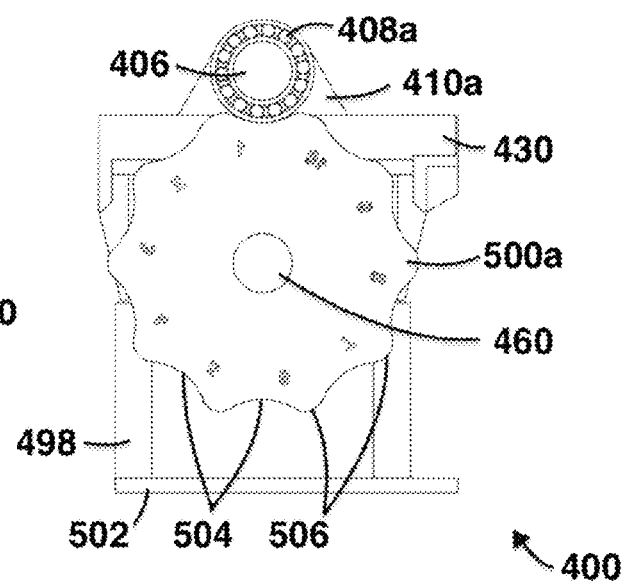
FIG. 9A   FIG. 9B
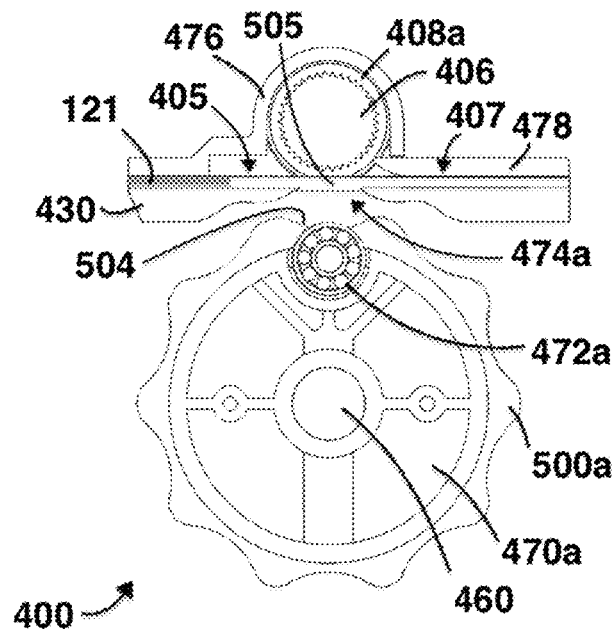
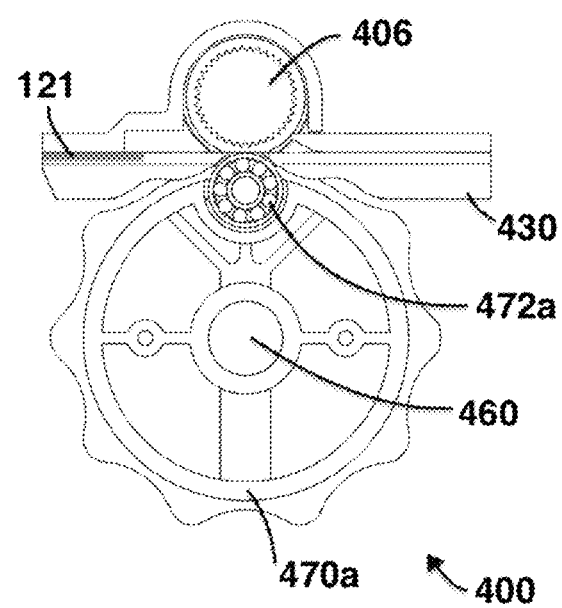
FIG. 10A   FIG. 10B

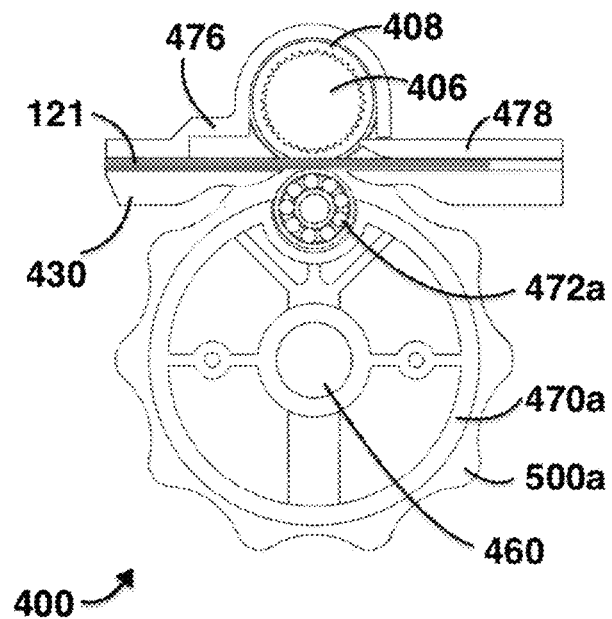
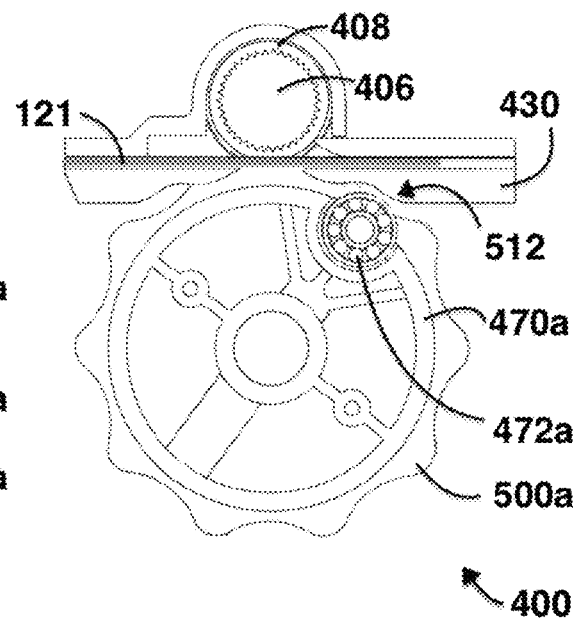
FIG. 11A    FIG. 11B
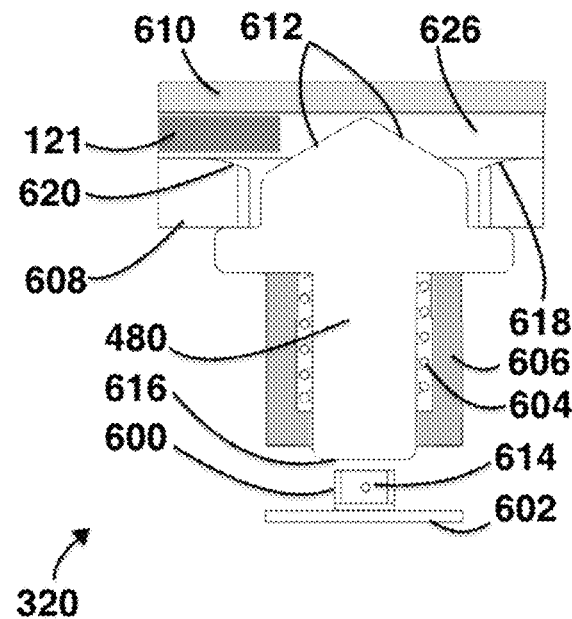
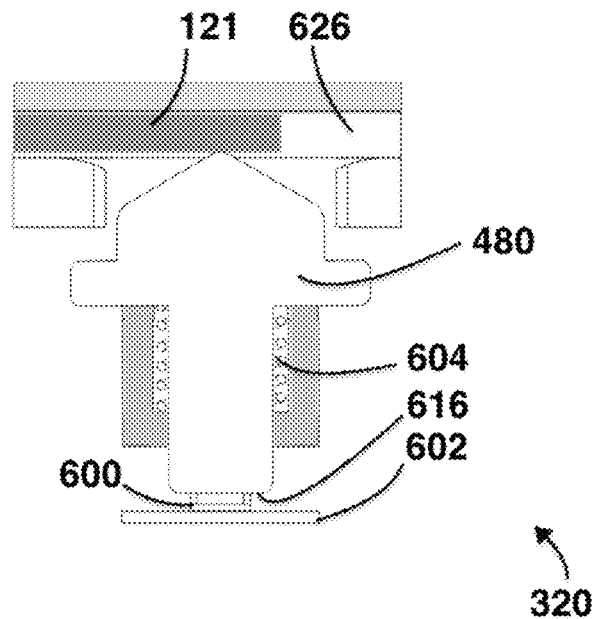
FIG. 12A    FIG. 12B

APPARATUS, METHODS AND SYSTEMS FOR AUTOMATIC, CONFIGURABLE MANUFACTURING WORKFLOW FOR ADDITIVE MANUFACTURING SYSTEMS

RELATED APPLICATIONS

This application claims the benefit of U.S. Provisional Application No. 63/167,601, filed on Mar. 29, 2021. The entire teachings of the above application are incorporated herein by reference.

FIELD

The field of the invention concerns methods and products for achieving efficient additive manufacturing, including high volume additive manufacturing.

BACKGROUND

Traditional mass manufacturing is characterized by high volume production of standardized products, typically by means of an assembly line. Components of mass-produced products are generally manufactured independently by specialized processes and then assembled into a finished product, which is then distributed. With many recent advances in additive manufacturing (AM), it is becoming more feasible to manufacture complex products in a single build process based on a digital representation of the product. Rather than building each part separately and then assembling them, AM has potential for products to be manufactured in an integrated manner. Such an integrated process is commonly referred to as direct digital manufacturing (DDM) or direct digital fabrication (DDF). DDF has potential to enable the production of personalized product, permit decentralized manufacturing, reduce negative environmental impacts of manufacturing, reduce inventory requirements, and facilitate rapid delivery of product.

Whereas previously AM was largely used for prototyping, its adoption in manufacturing has created a need for AM systems to become more reliable, more fully automated, faster, larger, have lower fixed system costs, have lower variable production costs, and have more capabilities to create a wider variety of end use parts/products. In order to achieve these advancements, many technological obstacles will need to be overcome. The disclosure herein relates to solutions to such obstacles, which are discussed in detail below.

SUMMARY

Described herein are additive manufacturing systems and associated methods and devices for automated 3D printing.

An additive manufacturing system for automated 3D printing includes: one or more 3D printers configurable to sequentially print parts on the same or a combination of the one or more 3D printers; one or more modules for use in or with the one or more 3D printers; a workflow configuration device; and a controller operationally coupled to the one or more 3D printers and to the workflow configuration device, the controller configured to determine a 3D printing workflow according to a production objective and to drive the workflow configuration device to configure at least one of the 3D printers and the modules, to achieve the 3D printing workflow.

A method for configuring an additive manufacturing system for automated 3D printing, where the system includes one or more 3D printers configurable to sequentially print parts on the same or a combination of the one or more 3D printers, and one or more modules for use in or with the one or more 3D printers, the method including, with a controller: determining a 3D printing workflow according to a production objective, and driving a workflow configuration device to configure at least one of the 3D printers and the modules, to achieve the 3D printing workflow.

An additive manufacturing system for automated 3D printing includes: first and second 3D printers configurable to sequentially print parts on the same or a combination of the first and second 3D printers; a feedstock source; a workflow configuration device operationally coupled between the feedstock source and the first and second 3D printers; and a controller operationally coupled to the 3D printers and to the workflow configuration device, the controller configured to drive the workflow configuration device to link the feedstock source to the first 3D printer to print at least a portion of a first part using feedstock from the feedstock source, and to link the feedstock source to the second 3D printer to print at least a portion of a second part using feedstock from the feedstock source, to achieve a 3D printing workflow according to a production objective.

A method for 3D printing includes: with a controller, driving a workflow configuration device to link a feedstock source to a first 3D printer; printing at least a portion of a first part with the first 3D printer using feedstock from the feedstock source; with the controller, driving the workflow configuration device to link the feedstock source to a second 3D printer; and printing at least a portion of a second part with the second 3D printer using feedstock from the feedstock source.

An additive manufacturing system for automated 3D printing includes: one or more 3D printers configurable to sequentially print parts on the same or a combination of the one or more 3D printers; first and second feedstock sources; a workflow configuration device operationally coupled between the 3D printers and the feedstock sources; and a controller operationally coupled to the 3D printers and to the workflow configuration device. The controller is configured to drive the workflow configuration device to link the first feedstock source to the one or more 3D printers to print using feedstock from the first feedstock source, and to link the second feedstock source to the same one or more 3D printers to print using feedstock from the second feedstock source, to achieve a 3D printing workflow according to a production objective.

A method for 3D printing includes: with a controller, driving a workflow configuration device to link a first feedstock source to one or more 3D printers; printing with the one more 3D printers using feedstock from the first feedstock source; with the controller, driving the workflow configuration device to link a second feedstock source to the same one or more 3D printers; and printing with the one or more 3D printers using feedstock from the second feedstock source.

A workflow configuration device to link one or more feedstock sources to one or more 3D printers includes: one or more inputs configured to couple to one or more feedstock sources, respectively; and one or more outputs configured to couple to one or more 3D printers, respectively. The workflow configuration device is configured to selectively direct feedstock from the one or more inputs to the one or more outputs, to link the one or more feedstock sources to the one or more 3D printers.

A feedstock container for use in an additive manufacturing system includes: a housing including a feedstock port; a feedstock spool mounted within the housing and configured to carry feedstock in the form of filament; and a sensor device positioned along a path of the filament from the feedstock spool to the feedstock port and configured to measure tension of the filament.

A method for use in an additive manufacturing system includes: providing a feedstock spool mounted within a housing of a feedstock container, the feedstock spool carrying feedstock in the form of filament; and with a sensor device positioned along a path of the filament from the feedstock spool to a feedstock port, measuring tension of the filament.

A feedstock container for use in an additive manufacturing system includes: a housing, a feedstock spool mounted within the housing and configured to carry feedstock in the form of filament; and an actuator system within the housing configured to rotate the feedstock spool to wind the filament onto the spool or unwind the filament from the spool.

A method for use in an additive manufacturing system includes: providing a feedstock spool mounted within a housing of a feedstock container, the feedstock spool carrying feedstock in the form of filament; and with an actuator system within the housing, rotating the feedstock spool to wind the filament onto the spool or unwind the filament from the spool.

A feedstock container for use in an additive manufacturing system includes: a housing including a feedstock port; a feedstock spool mounted within the housing and configured to carry feedstock in the form of filament; and a drive module within the housing configured to move filament in either direction, off the spool or onto the spool, along a path between the feedstock spool and the feedstock port.

A method for use in an additive manufacturing system includes: providing a feedstock spool mounted within a housing of a feedstock container, the feedstock spool carrying feedstock in the form of filament; and with a drive module within the housing, moving filament in either direction, off the spool or onto the spool, along a path between the feedstock spool and a feedstock port.

A feedstock container for use in an additive manufacturing system includes: a housing; a feedstock spool mounted within the housing and configured to carry feedstock in the form of filament; and a desiccant recycling device including a desiccant to absorb moisture released from the filament and a first flow regulator to regulate flow of air and moisture between the desiccant and an exterior of the housing.

A method for use in an additive manufacturing system includes: providing a feedstock spool mounted within a housing of a feedstock container, the feedstock spool carrying feedstock in the form of a filament; with a desiccant of a desiccant recycling device, absorbing moisture released from the filament; and with a first flow regulator of the desiccant recycling device, regulating flow of air and moisture between the desiccant and an exterior of the housing.

A filament drive system for use in an additive manufacturing system includes: a support; a drive gear rotatably mounted to the support; plural channels formed in the support, each channel including a contact region exposed to the drive gear, each channel configured to radially constrain filament and to guide the filament across the contact region for engagement with the drive gear; and a rotary selection mechanism coupled to the support and configured to cooperate with the drive gear to selectively engage filament present in the contact region of one of the channels, wherein rotation of the drive gear causes linear movement of the engaged filament along the one channel.

A filament sensor device for use in an additive manufacturing system includes: a housing body including a channel and a slot in communication with the channel; a switch tab positioned in the slot, the switch tab being movable away from the channel toward a sensing position by filament passing through the channel; a spring coupled to the switch tab and configured to bias the switch tab toward the channel; and a sensor to detect movement of the switch tab to the sensing position.

A vapor smoothing method for use in an additive manufacturing system includes rotating a printed part about an axis that is non-parallel to a gravity vector, and, while rotating, exposing the part to vapor to cause the vapor to smooth the part.

A vapor smoothing device for use in an additive manufacturing system includes means for rotating a printed part about an axis that is non-parallel to a gravity vector, and means for exposing the part to vapor, while rotating the part, to cause the vapor to smooth the part.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIGS. 9A and 9B show sectional views of the drive system of FIG. 8.

FIG. 10A is a partially exploded view of a portion of the drive system of FIG. 8 illustrating a drive gear, a selector disk, and a selector disk idler.

FIG. 10B shows the portion of the drive system of FIG. 8 in a non-exploded view.

FIG. 11A shows the drive system of FIG. 10B illustrating engagement of the drive gear and selector disk idler with filament.

FIG. 11B shows the drive system of FIG. 11A with the selector disk and selector disk idler rotated.

FIGS. 12A and 12B show sectional views of filament sensor according to an example embodiment.

DETAILED DESCRIPTION

Figure 1:
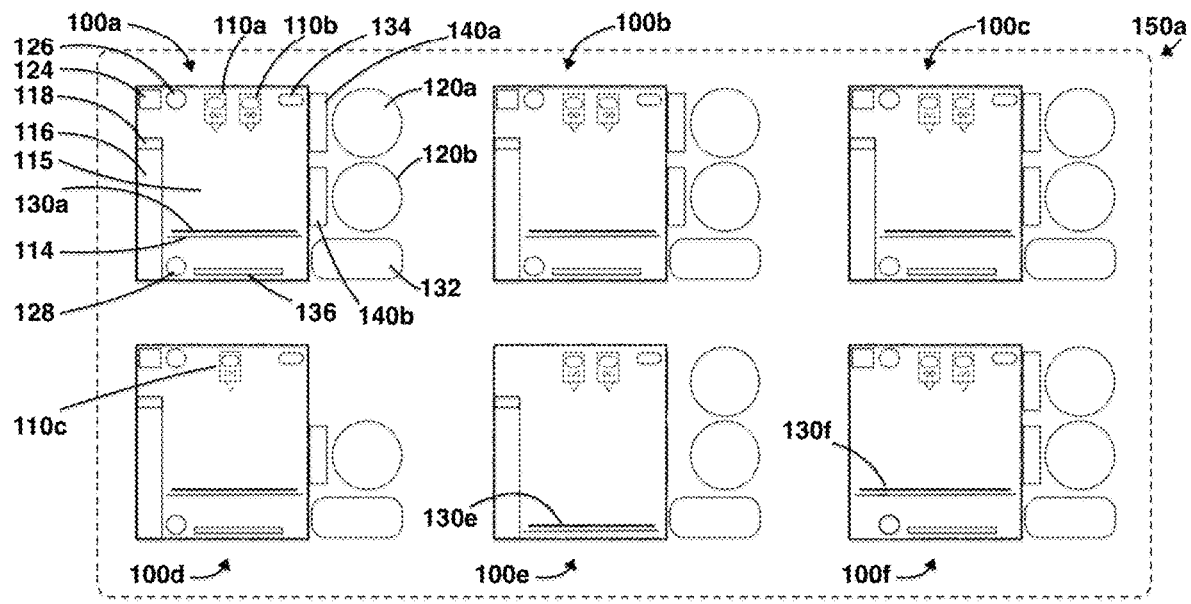
FIG. 1 illustrates an example of a conventional additive manufacturing (AM) system including multiple 3D printers.

A description of example embodiments follows.

Inventions disclosed herein are not limited to a single type of additive manufacturing (AM) but are applicable in all AM technology families including, but not limited to, material extrusion (e.g., fused filament fabrication or FFF), material jetting, stereolithography (SLA), selective laser sintering (SLS), binder jetting, direct energy deposition, sheet lamination, powder bed fusion, and automated knitting. Accordingly, the inventions are applicable to all forms of feedstock, whether solid, liquid, or gas form, including but not limited to filament, powder, pellets, resin, glue, wax, and liquids or pastes (e.g., chocolate, silicone, conductive inks, ceramic slurries, concrete). They are also applicable to combination advanced manufacturing technologies that include AM, such as, for example, hybrid CNC mill and FFF systems that are able to deposit material additively and remove material subtractively. For convenience, a significant portion of the discussion below will concern FFF using a 3D printer and feedstock in the form of filament.

For the purpose of this disclosure, the terms "additive manufacturing" and "AM" are used interchangeably with the term "3D printing."

For the purposes of this disclosure, the terms "material is printed" or "material is deposited" should not be taken to refer only to material extrusion technologies. Rather, as used herein such terms refer more generally to material that is being committed to form a structure. For example, in SLA, material is not deposited as in material extrusion but rather is cured or solidified in a certain region. Similarly, in powder-based AM processes, material is not deposited as in material extrusion but rather a region of pre-deposited material can be sintered, melted, or otherwise bound to form a structure. For the purposes of this disclosure, we will consider this "printing" or "depositing".

For the purposes of this disclosure, the term "printed part(s)" refers to the component(s) being manufactured by additive manufacturing, especially by a three-dimensional (hereinafter "3D") printer, and may include other structures such as support material, waste structures or other relevant specimens constructed during the additive manufacturing (e.g., 3D printing) process. For convenience, sometimes the shortened version "part" is used interchangeably with "printed part". For the purposes of this disclosure, the term "fixturing" refers to securing a printed part to a desired position on a build platform.

For the purposes of this disclosure, the term "build volume" refers to the maximum size (length, width, and height) of a part that a 3D printer can print. Generally, build volume is derived from the maximum limits of where the print head can move with respect to the build platform.

SEME technology is described U.S. Pat. No. 10,870,268 to Debora et al., the teachings of which are incorporated herein by reference in their entirety. A SEME apparatus forms and feeds multimaterial feedstock at a location spaced apart from a print head that is printing a part. The forming and feeding are concurrent with and coordinated with the printing. That is, progress of printing (e.g., amount of multimaterial feedstock fed into the print head) is monitored and fed back to the forming/feeding apparatus so that the rate of forming/feeding can be adjusted as needed. It should be understood that the abbreviation "SEME" is merely for convenience. That is, although many 3D printing systems involve extrusion (e.g., FFF) and, technically, the abbreviation expands to "series enabled multi-material extrusion", extrusion by a 3D printer print head is not absolutely required for SEME technology to be used with a 3D printer. (As used herein, an "extruder" is part of certain types of print heads.) A SEME apparatus can form and feed multimaterial feedstock to a variety of 3D printers, including but not limited to, printers for material extrusion (e.g., FFF), material jetting, stereolithography (SLA), selective laser sintering (SLS), binder jetting, direct energy deposition, sheet lamination, powder bed fusion, and automated knitting. It should also be understood that the terms "multimaterial" and "multicomponent" in respect of feedstock are used herein interchangeably.

For the purposes of this disclosure, the terms "cluster" and "bank" are used interchangeably to refer to a grouping of modules. In some embodiments, "3D printing cluster", "3D printer cluster", "3D printing bank" or "3D printer bank" refers to a grouping of two or more 3D printers that together provide a 3D printing capacity. In some embodiments, modules of a bank or cluster are in a common location. In some embodiments, one or more module(s) of a bank or cluster can be shared by two or more AM systems. (It should be understood that this does not exclude a single module being shared by two or more AM systems absent a "bank of modules" per se.)

For the purposes of this disclosure, the term "module(s)" of an AM system refers to components that may be added to or removed from the AM system so as to configure it for a selected use. A module may, for example, refer to a 3D printer or to components or subsystems of a 3D printer, such as, but not limited to, a print head, a build platform, a SEME module, or an air filter. The term "uniform" as it pertains to modules (i.e., uniform modules) refers to embodiments wherein two or more of the modules are the same. For example, two print heads of identical construction and with identical specifications would form a bank comprising two uniform modules. The term "non-uniform" as it pertains to modules (i.e., non-uniform modules) refers to embodiments wherein two or more of the modules are different from each other in one or more ways, effectively making the individual modules specialized. For example, two extrusion print heads that have different sized extrusion nozzle orifices (e.g., 0.3 mm and 0.6 mm respectively) would be considered a bank of non-uniform modules.

For the purposes of this disclosure, the term "3D printing workflow(s)" refers to the 3D printing infrastructure as well as the processes required to use the infrastructure to achieve 3D printing production objectives. For example, a 3D printing workflow may comprise a single desktop 3D printer and one staff member who operates the 3D printer to print parts at a designated frequency. In another example, a 3D printing workflow may comprise a cluster of 50 3D printers operated by a staff of five technicians and two managers as well as a software team of several staff processing hundreds or thousands of custom 3D models for printing by this cluster. Such processing may include computer modelling and slicing (e.g., to generate G-code), assigning respective materials and temperatures for different printed parts, etc. The 3D printing workflow may include post processing, assembly, or other steps relating to achieving the production objectives. It is to be understood that automated steps of a 3D printing workflow are generally preferable to steps performed manually by a person.

The terms "configuring" and "configuration" as they pertain to modules of an AM system, refers to the way the components are assigned and distributed within an AM system so as to provide specific selected outcomes such as, but not limited to, differing printing capabilities, differing pre-printing or post-printing processes, differing cost structures, differing amounts of input labor requirements. "Reconfiguring" and "reconfiguration" include changing a manufacturing system from a first configuration to a selected second configuration so as to provide a different selected outcome. The modules of the manufacturing system that are used in the first configuration may or may not overlap with the modules of the manufacturing system that are used in the second configuration. In general, "configuring" and "configuration" include "reconfiguring" and "reconfiguration".

For purposes of this disclosure, the term "lights-out manufacturing" refers to the commonly known manufacturing methodology wherein production systems (e.g., in factories) are automated and do not require human intervention for periods of time (e.g., overnight). That is, the term does not literally refer to or require the lighting in a manufacturing space being turned off.

During a 3D printing process such as for example an extrusion process, such as for example FFF, feedstock is deposited by a print head to form a printed part. However, there are a variety of circumstances where a print head will deposit some material that will not become part of the successfully completed printed part. This material will hereafter be referred to as "auxiliary material". Auxiliary material includes structures that are printed to aid in the printing of part such as, for example, rafts, printed fixtures, skirt, brims, supports, walls and other printed structures that are removed post-printing. Auxiliary material also includes waste material such as, for example, material that is used to prime a print head, material that leaks out of a print head in an uncontrolled manner (often called "ooze"), and transition material between sequentially employed feedstocks. An auxiliary material handling unit (AMHU) is described in Debora et al., U.S. Patent Application Publication No. 2020/0061920, the teachings of which are incorporated herein by reference in their entirety.

Users of AM systems often desire to quantify the complete cost to make a part. Using a manufacturing system such as a 3D printer, there are several factors to consider in order to form a complete understanding of total cost per part (TCPP). The primary factors are material costs, labor costs, equipment ownership costs, and overhead costs, all of which will be discussed below.

Material cost as it pertains to TCPP relates to the cost of the material used both directly and indirectly to fabricate a part. In general, TCPP includes the cost of all material used to print the part (build material, support material, and any other auxiliary material). Depending on the 3D printing process, TCPP may include the cost of powders, toners, binders, other liquids, other gasses, other solids, or other consumable materials. The form of the material may play a considerable role in cost. For example, many polymers are mass produced as granulated pellets, and when used in an AM process in such form, their material cost is very low. But in many AM processes such as FFF, the granulated pellets are first formed into a filament and then this filament is used in the AM process. Energy, labor and other costs go into the transformation from pellet to filament. Thus, a quantity of polymer in filament form generally costs significantly more than the same quantity of the same polymer in pellet form, sometimes as much as 20 times more. Accordingly, there is considerable advantage to using feedstocks that require less preparation prior to use, such as granulated pellets, because input costs to the AM process are lower. Expensive types of materials, expensive forms of the materials, and inefficient use of materials are the largest drivers of high material costs in 3D printing.

Labor cost as it pertains to TCPP relates to all direct and indirect costs regarding staff who attend to the 3D printing process and to the entire manufacturing workflow. For a small scale 3D printing job, this usually involves a single person, although for larger 3D printing jobs requiring clusters of 3D printers, significantly more staff can be involved. In addition to compensation paid to the staff working directly on the AM job(s), there are related indirect labor costs. Indirect labor costs to support the direct staff can include HR staff, safety officers, management, procurement officers, maintenance staff, etc., all of which labor costs increase the TCPP. Direct labor costs can derive from a number of activities such as, but not limited to, computer-based modelling, 3D model slicing for 3D printing, loading materials into a 3D printer, starting a 3D printer, monitoring a 3D printer during operation, maintaining the 3D printer, processing finished printed parts, tracking manufacturing data, taking inventory on equipment and consumables, as well as a variety of other tasks. Portions of the 3D printing process that require large amounts of labor and complex operations that require more highly skilled and expensive laborers are the largest drivers of high labor costs in 3D printing.

Equipment ownership cost as it pertains to TCPP relates to amortization of the equipment cost. One way to do this calculation is to divide the cost of the equipment by the number of parts fabricated (or expected to be fabricated) by the equipment during a reasonable period of time. Many manufacturers use a five year period of time and divide the total equipment cost by the total number of parts printed by their 3D printing system. For example, if a $250,000 3D printer were 100% utilized (i.e., 24 hours/day) for a five year period and thus printed 43,800 successful one-hour prints during that 43,800 hour period, the equipment ownership cost would be $5.71 per print. Given that it is unrealistic for currently offered 3D printers to be utilized 100% of the time, and given that it is unrealistic for such printers to print successfully 100% of the time, the actual equipment ownership cost would likely be considerably higher than $5.71 per part. Expensive equipment, underutilization of equipment, and poor yield from equipment are the largest drivers of high equipment ownership costs in 3D printing.

Overhead cost as it pertains to TCPP includes all other costs associated with the operation of a 3D printing system. This includes the cost of electricity or fuel used to power the AM system, the cost of real estate that houses the equipment, the costs of maintenance contracts, spare parts costs, inventory costs, insurance costs, and any other direct or indirect costs not included in the prior three categories. Power and real estate costs are usually the largest drivers of overhead costs from a TCPP perspective in 3D printing.

While TCPP is a major barrier limiting 3D printing from being used at large scale, in some instances, it is not total cost per se but rather particular individual components of the TCPP equation that present a barrier to use of scaled-up 3D printing. For example, in the healthcare space, the relatively high labor cost of physicians using 3D printing can be a major barrier. That is, in some cases valuable and scarce physician time cannot be taken up by 3D printing workflow operations, but hiring more staff is not an option. Lack of labor available to operate the AM system is a barrier, rather than TCPP per se. However, if in the same amount of physician time, 100 times as many parts could be printed, use of 3D printing could be scaled, even with an increase in total cost. Thus, there is strong motivation to reduce labor inputs to 3D printing processes, which is addressed by the invention described below.

In some instances, the particular limiting component of TCPP that is a barrier to scale up is overhead costs associated with real estate. Given that 3D printing workflows at scale can require large clusters of 3D printers that take up space, in some cases, it is such space that is expensive while labor, material, and equipment ownership costs are comparatively inexpensive. 3D printing clusters available today are generally not very dense; accordingly, they can take up a lot of space and use it inefficiently. If 3D printing systems could be densified so as to reduce the real estate needed to house them, 3D printing at scale could become more affordable. This is another motivation addressed by the invention described below.

Depending on the 3D printing system and the application, the magnitude of TCPP can vary widely. Using currently available AM technology and normalizing to an hour of print time on an average 3D printer, TCPP per hour (TCPP/h) today generally ranges from approximately $3 to over $50. When 3D printing is being used for prototyping, for example fabrication of 1-10 parts in the development phase, a higher TCPP is commonly acceptable. However, when 3D printing is considered as a production tool for higher volumes of parts, for example 100-100,000 parts, a TCPP/h of $3 to $50+ is generally outside the acceptable cost range for manufacturers. That is, the relatively high TCPP of 3D printing workflows on the market today commonly makes 3D printing unsuitable for use in high volume manufacturing applications, in comparison to other manufacturing options. For example, it may be desirable to use 3D printing in a local or domestic setting to reduce supply chain complexity, obtain product rapidly, and reduce environmental impact. However, high TCPP could cause a manufacturer to choose fabrication in another country (possibly with lower labor costs) instead. In an illustrative example, a local/domestic 3D printing system could take four hours to print a part at a TCPP/h of $8 (i.e., TCPP of $32). In contrast, the part could be produced in another country by CNC machining for a total landed cost of $5. At a volume of 1000 parts, the 3D printing cost would be $32,000 as opposed to $5000 for the alternative. Despite the other benefits of local 3D printing, the $27,000 of savings from the other option would not likely make 3D printing financially justifiable.

As discussed below, the present invention provides considerable improvements in 3D printing efficiency and capabilities that can significantly reduce TCPP. This in turn could lead to much wider adoption of AM for large scale production (hereafter "production AM"). Although discussion below focuses on high volume production AM, it should be understood that the solutions provided herein can also be applied to AM for more traditional low volume prototyping and development (hereafter "development AM").

Referring again to the example above, if the local 3D printing system were to employ the solutions provided herein to reduce TCPP/h to $1.25 (i.e., TCPP of $5), total cost would be the same between the two manufacturing options. The manufacturer could justifiably choose the 3D printing option and take advantage of its other benefits.

It should be recognized that the use requirements for production AM in high volume applications can differ in many ways from the use requirements for development AM applications. For example, a prototyping application wherein an engineer uses 20 minutes of his/her time as labor to run a 3D print may be acceptable for a single part. That is, the engineer's time is relatively expensive but 20 minutes is a relatively negligible amount of time in a work week. However, if the engineer were to print 50 such parts, the 1000 minutes of labor required would become a substantial part of the work week, and such scale up would not be acceptable for many businesses.

Typically, much of traditional manufacturing relies on the principle of economies of scale, where increases in production scale come with corresponding decreases in cost, sometimes exponentially so. However, economies of scale are generally not the case for AM using today's available technology; in fact, in many cases, TCPP actually increases during scaling attempts. Such lack of scalability has a negative impact on businesses' ability to be competitive and successful. For example, a business facing scaled costs that are too high may choose to forgo an AM prototyping step, thereby taking on risk, or may even choose to forgo a development plan altogether, thereby eliminating a market opportunity. Alternatively, a business may choose to solve the problem of scaling up AM by hiring a printer technician to run the 3D printers, thereby taking the burden off of a more expensive engineer. However, in this example, the fixed labor cost of a full-time salaried employee will likely increase TCPP in the short term. In another example, a business may choose an alternative manufacturing method to AM, such as injection molding (IM). However, IM comes with a large upfront tooling cost, as well as a relatively long (e.g., three to nine months) tooling time that delays part production. When compared to production AM that has no tooling cost and a nearly instant virtual tooling time, the switch to IM would be a higher financial burden and in some cases, could even hurt the company's competitiveness due to delayed market entry. In another example, a business may choose to outsource part production. This, like hiring an employee, comes with higher costs and likely slower service that can cause delays in the development timeline. It can be seen that, if AM could scale with a considerably lower cost structure, the need for delays in development, increases in staff, or outsourcing could be eliminated.

Another key aspect of production applications is manufacturing flexibility at scale. In order for a particular manufacturing application to be practical or feasible for fabrication using AM, the capabilities of the AM system must satisfy multiple requirements of the application. While TCPP is one factor, scale up time, scale up costs, production volumes, part consistency, and ability to achieve part specifications are other key factors that must be considered. When looking to fabricate a given part, product developers will often set specifications for build size, build material(s), build material color(s), build support structure requirements, surface finishes, tolerances for particular dimensions, as well as many other parameters. If a given AM process cannot achieve a particular specification(s), then the part will not be made with this AM system. Accordingly, it should be understood that the broader the capabilities of an AM system, the more it can be practically used for different fabrication applications, increasing market opportunity.

Each of the many different types of AM systems has its own capabilities and limitations. Including SEME technology in an AM system workflow provides capabilities to meet the needs of a broad range of production applications, as will be discussed below. Such workflows will involve configuration of various components and modules involved in production; reconfiguration is possible when it is desirable to change a workflow.

Traditionally, when using an SLA printer, it is common to have a single type of build plate and a single type of resin, i.e., printing with more than one material at a time has not been common. Changing of material on the SLA printer traditionally requires careful manual labor. In terms of workflow configuration, the user may configure the build material relative to the SLA printer, but otherwise, there has been no need to configure anything else. That is, modules that are shared between different workflows involving SLA are not known. The situation has generally been the same for SLS and other powder-based processes.

However, since the introduction of SEME technology, 3D printing systems have been able to achieve production of multimaterial (e.g., multicolor) parts by incorporating into the workflow a SEME module spaced apart from the print head. In particular, SEME technology is useful when coupled with FFF, which can print parts from a broad range of feedstocks, including but not limited to, engineering grade polymers such as thermoplastics, thermosets, metal-infused polymers, and the like. SEME technology provides multiple capabilities that increase the practicality and feasibility of production applications. These include ability to enable printing a broad range of materials and ability to enable printing with many materials and colors in a single part. Moreover, SEME provides ability for rapid, automated changing of materials used by a print head without considerable waste, labor, or system downtime. Accordingly, many examples below will include SEME although it should be understood that the present invention is not limited to AM involving SEME.

One aspect of SEME's flexibility in capability is that it can accommodate a broad range of materials. Accordingly, modules of an AM system comprising SEME can be varied to support specific materials. For example, one skilled in the art would know that different types of print heads with different internal geometries and thermal capabilities may be needed for different materials. As another example, different environmental controls regarding temperature and humidity may be needed for different materials. Nozzles of print heads may have different geometries so that different materials can be printed with different flow rates; this in turn may for example provide increases in speed and/or increases in printing resolution. In some embodiments, different build platforms may be needed in order to be compatible with the materials being printed. These are just a few of many examples wherein non-uniform modules may need to be adjusted to configure an AM system for a selected printing capability. Flexibility in capability of a module may accordingly increase the complexity of workflow configuration for some applications.

The flexibility in capability of SEME permits workflow configurations both with uniform modules and with non-uniform modules. Moreover, the functionality of each individual SEME module can be quickly changed. Such flexibility is commercially valuable for manufacturers. In contrast to the invention described herein, the configuration/reconfiguration processes of currently available AM systems tend to be manual, labor-intensive, and error-prone, thereby making scale up for production AM challenging. That is, with current offerings, providing a configuration with a single 3D printer may involve relatively small, acceptable effort and risk. However, when scaling up to clusters of printers, e.g., 50 printers, achieving the configuration often becomes a prohibitively expensive and complex aspect of the process. Thus, there is motivation to simplify and automate the configuration process so that the benefits of the flexibility of these systems can be realized commercially at large scales.

It is an object of this invention to address some of the problems of production AM discussed above. In some embodiments, solutions are provided to reduce configuration complexity of AM systems, to provide more practical scalability of AM, to reduce TCPP, and/or to expand the application flexibility of SEME.

The present disclosure relates to an automatic, configurable manufacturing workflow (ACMW) for additive manufacturing systems. ACMW apparatus, methods and systems provide AM systems with increased flexibility. ACMW technology is particularly suitable for lights-out AM and for continuous AM. In various embodiments of ACMW technology, efficiency and/or reliability of an AM system are increased and/or need for maintenance and/or human intervention is decreased. Broadly, embodiments of ACMW technology can provide practical scale up of production AM, including automatic configuration of 3D printing clusters as may be desired, such automatic configuration including automatic reconfiguration as desired. This increases manufacturing flexibility and can lead to lower TCPP. ACMW technology addresses a number of the cost and efficiency drivers involved in calculation of TCPP.

Multiple embodiments will be described below with the accompanying illustrative figures. Most figures are shown in block diagram, simplified layout diagrams, or in partial cross-section. While modules are shown in specific locations in the figures for clarity and purposes of illustration, it is to be understood that the configurations and spatial relationships between modules are not limited to what is featured in the figures of this disclosure.

For convenience, when referring to a group of items, where each item is identified by a common numeral and a letter, e.g., 100a, 100b, 100c, etc., the group, or a portion thereof, may be identified by using the common numeral, e.g., 100.

FIG. 1 shows a front view of a first example of a conventional AM system 150a. The AM system 150a includes a cluster of six similar 3D printers 100a-100f. The 3D printer 100a has two print heads, 110a and 110b, a build chamber 115, a build platform receiver 114, a build platform 130a, an integrated air filter 124, and a heater module 136 for the build chamber 115. The printer 100a has an Auxiliary Material Handling Unit (AMHU) 118 and an AMHU material container 116. The 3D printer 100a also has a bank of sensors 134; the sensors 134 may include but are not limited to one or more of the following: cameras, humidity sensors, temperature sensors, enclosure door status sensors, and light sensors. For convenience, the sensors 134 are depicted as co-located in this figure but they may be distributed about the printer 100a. The build chamber 115 of 3D printer 100a has an air inlet 128 and an air exhaust outlet 126 which may be connected to an internal or external air conditioning unit that may filter the air and/or control the air temperature, pressure, and/or flow rate. The 3D printer 100a also has external auxiliary equipment 132 which may include but is not limited to an air compressor, a vacuum, or a liquid cooling module. The 3D printer 100a is operatively connected to two SEME modules 140a and 140b, wherein print head 110a is connected to SEME module 140a and print head 110b is connected to SEME module 140b (connections not shown). Each SEME module has a respective feedstock source 120a, 120b. Conveniently, the feedstock may be in the form of filament.

In FIG. 1, 3D printers 100b and 100c are shown as being identical to the 3D printer 100a, although it should be understood that 3D printers in a cluster may vary, particularly in view of the various types of modules discussed previously for the printer 100a. For example, 3D printer 100d is shown as having a single print head 110c. As another example, 3D printer 100e does not have a heater module 136; this allows lower positioning of the build platform 130e thereby making available a larger build volume. Similarly, 3D printer 100f is shown as not having an AMHU 118 or AMHU material container 116, making space available for larger build platform 130f.

In addition to varying in size, it is also common for build platforms to vary in material, interface layer, texture, and coating; preferably these are selected to have good printing performance with the particular material(s) being printed. For example, build platform 130a may be a flat build platform coated in polyetherimide (PEI), which is a commonly used build platform surface when printing carbon fiber-reinforced polyamide, or polylactic acid (PLA). In another example, build platform 130e may be a textured build platform with a Kapton coating, which is commonly used when printing composite polyethylene terephthalate glycol (PETG) materials. In another example, build platform 130f may be a flat piece of borosilicate glass coated with a layer of PVA glue, which is commonly used when printing polyetherketoneketone (PEKK). Other common coatings or interface layers, such as commercially available products "3D Gloop", "Magigoo", and a variety of others, may be used in combination with various build surface materials to create, in combination, suitable build platform characteristics. In this context, suitable means that the 3D printed part adheres well to the build platform during printing but then can be easily removed after the print is complete. It may be beneficial in certain cases for a build platform to contain a rigid material like glass to form a rigid platform. In other cases, it may be beneficial for the build platform to contain a more flexible material like spring steel for the ability to bend the build platform easily to aid with removal of printed parts. In many embodiments, build platforms may have one or more linear and/or punctate receptacles, and/or trolleys, and/or separators to aid with mechanical joining and part removal as taught in Debora et al., U.S. Patent Application Publication No. 2020/0130256, the teachings of which are incorporated herein by reference in their entirety. It can be seen that the selection of build platform material, interface layer, rigidity, size, joiner features, and other factors can lead to a large number of variations that may be configured and optimized based on the specific requirements of a given 3D print.

More generally, it can be seen that, given the many types of modules associated with 3D printers, the many variants of each module type (i.e., non-uniform modules), and the numbers of each module that may be desired, there exist a large number of configurations that are possible for each printer.

Figure 2:
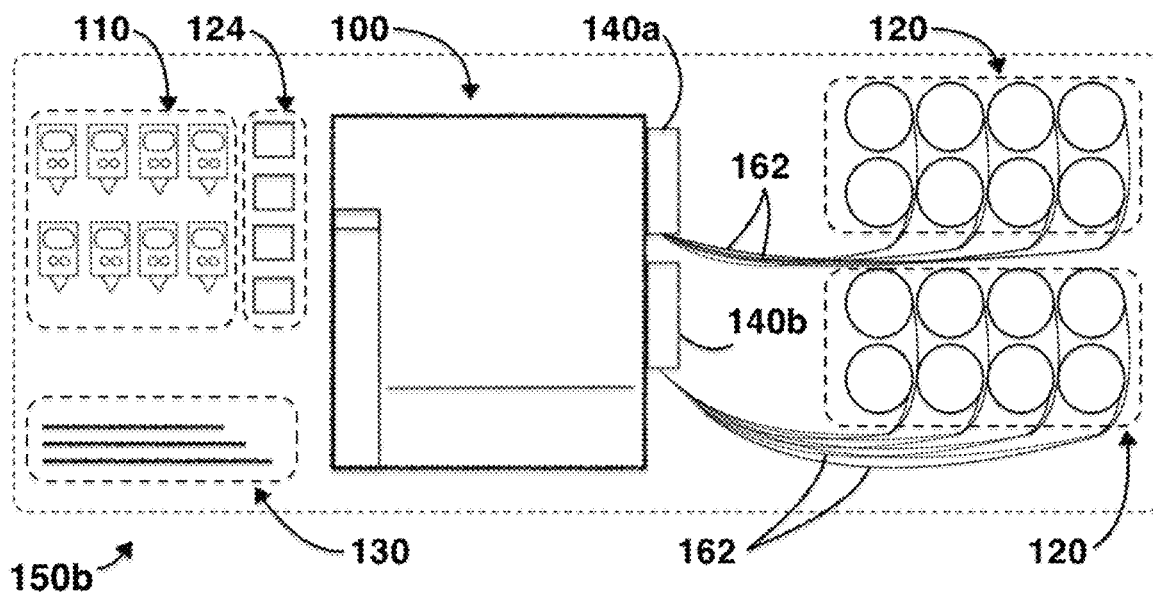
FIG. 2 illustrates another example of a conventional AM system including a 3D printer and multiple feedstock sources.

FIG. 2 shows a second example of a conventional AM system 150b, including a 3D printer 100 as well as several banks of modules that can be used with the 3D printer 100. It is common that 3D printer operators will situate different types of uniform and/or non-uniform modules close to a printer in order to increase the flexibility and uptime of their system. Some uniform modules are on hand for rapid maintenance or repair in case anything needs to be replaced within an AM system. Some non-uniform modules are on hand as they offer alternative functionality that may be desired to configure the 3D printer for a particular print job. For example, in the lower left corner of FIG. 2 are shown three non-uniform build platforms (per the discussion of different build platform types above). For the AM system 150b, an operator would need to install a selected build platform 130 manually based on the particular print specifications, e.g., the material being printed, the size of the printed part, etc. In other words, the AM system's 150b's flexibility derives in part from an operator manually configuring the AM system to make it suitable for a print job.

The AM system 150b may be thought of as an example of a fully stocked or "brute force" AM system. There is a bank of eight print heads 110. These modules may be uniform, non-uniform, or a combination of both. For example, an individual print head 110 may have a larger nozzle size to allow for printing at higher speeds or with a higher volumetric flow of material. Conversely, an individual print head 110 may have a small nozzle to permit very fine details to be printed. Some print heads 110 may be designed for printing in different temperature ranges to optimize them for the material being used. For example, printing polyetheretherketone (PEEK) may require the heating block and nozzle of a print head to reach a temperature of 450 degrees Celsius, which would be considerably hotter than a lower cost heating block that operates below 300 degrees Celsius and is intended for printing PLA and acrylonitrile butadiene styrene (ABS). Some print heads may have hardened metal components to resist wear from abrasive materials such as carbon fiber- or glass fiber-reinforced materials. Other print heads may use lower cost non-metallic components for printing materials that do not exhibit abrasive behavior. There are a variety of other properties that may be fine-tuned in a print head to optimize it for a selected print job, and there exist a large number of combinations of properties. Selecting and installing an appropriate print head for a particular job is currently the responsibility of the AM system operator.

In terms of the state of the art at the time of this disclosure, 3D printers commonly have a single print head that may have one or two nozzles, and the print head or part(s) of the print head (e.g., a print head housing) is a fixed component within the printer. In some printers, such as for example the Ultimaker S5 3D Printer, sections of the print head are removable by an operator to facilitate changing of certain components of the print head. In another example, the E3D ToolChanger 3D Printer contains up to four print heads that can be selectively used one at a time. In the case of the MakerGear M3-ID 3D printer, there are two print heads configured to print either one at a time (like the E3D ToolChanger 3D Printer) or together so as to print in parallel on a common build platform, either to fabricate the same part or different parts. It should be understood that, with regard to these different examples, the number of available print heads is fixed based on what is present in the printer; accordingly, the configurations achievable by the system in an automated way are limited to the modules on board, or modules must be manually switched by an operator. As discussed herein, in many situations this can result in excessive manual labor, excessive stock of inefficiently leveraged modules, and/or vulnerability to human error.

The air filters 124 in the bank of air filters, like the print heads, may be identical or different. A particular air filter 124 may be replaced when its lifecycle is over. Different types of air filters may be employed when particular print jobs have different requirements. For example, a mechanical air filter, such as a high efficiency particulate air (HEPA) filter, or an adsorption type filter such as an active carbon filter could selectively be used depending on the filtering needs of the materials being processed by the AM system. In terms of the state of the art at the time of this disclosure, 3D printers are commonly equipped with either no filter or a single type of filter. Thus, filter changes need to be performed manually by an operator.

The build platforms 130 of the bank of build platforms may vary as discussed previously in ways that include but are not limited to dimensions, build platform surface, interface layers, and thermal characteristics. In terms of the state of the art at the time of this disclosure, 3D printers commonly either have a fixed build surface that stays on the printer and from which parts can be removed while inside the printer (like that of the Artillery Sidewinder 3D Printer) or have a removable build surface (like the PEI coated spring steel sheet that can be slid off of the Prusa MK3S 3D Printer by an operator). In the Voodoo Manufacturing "Project Skywalker" demonstration, a robot was employed to remove a build platform from a 3D printer and to replace it with another identical build platform. In the case of the Tiertime X5 3D printer, a mechanical actuation system within the printer can remove a built plate from the 3D printer's build volume, push it to outside the 3D printer, and replace it with a new and identical build platform from on board "Build Plate Vault" of the system. It is worth noting that in these last two cases, the replacement build platforms are the same and are being drawn in top down sequence from a build platform stack. That is, a build plate is not being individually selected from a group of build plates but rather is taken from the top of a pile, implying a uniform supply. Distinction is drawn to this point as these cases demonstrate a degree of automation of build platform changing but do not demonstrate the act of configuring. As described earlier, ability to configure/reconfigure is desirable for flexibility of an AM system and there is growing demand for it. In contrast, for conventional AM systems that are limited to printing a single material with no automated capability to change the material, the need for configuring the build platform is generally not needed.

Referring again to FIG. 2, the example AM system 150b includes a bank of eight feedstocks 120 feeding into SEME modules 140a and 140b along feed paths 162. The feedstock materials could be uniform (e.g., duplicate feedstock modules could be used when other modules have been depleted). Alternatively, the feedstock modules could be non-uniform, e.g., of different chemical composition or the same chemical composition in a different color. Non-uniform feedstock modules permit the printer 100 to produce a wider variety of parts. Reference is made again to multimaterial printing with SEME taught in U.S. Pat. No. 10,870,268 to Debora et al.

It is to be noted that FIG. 2 only shows a selected number of modules cooperating in the AM system 150b for simplicity. However, many more modules could be configured as previously described for FIG. 1 and further discussed herein.

Figure 3:
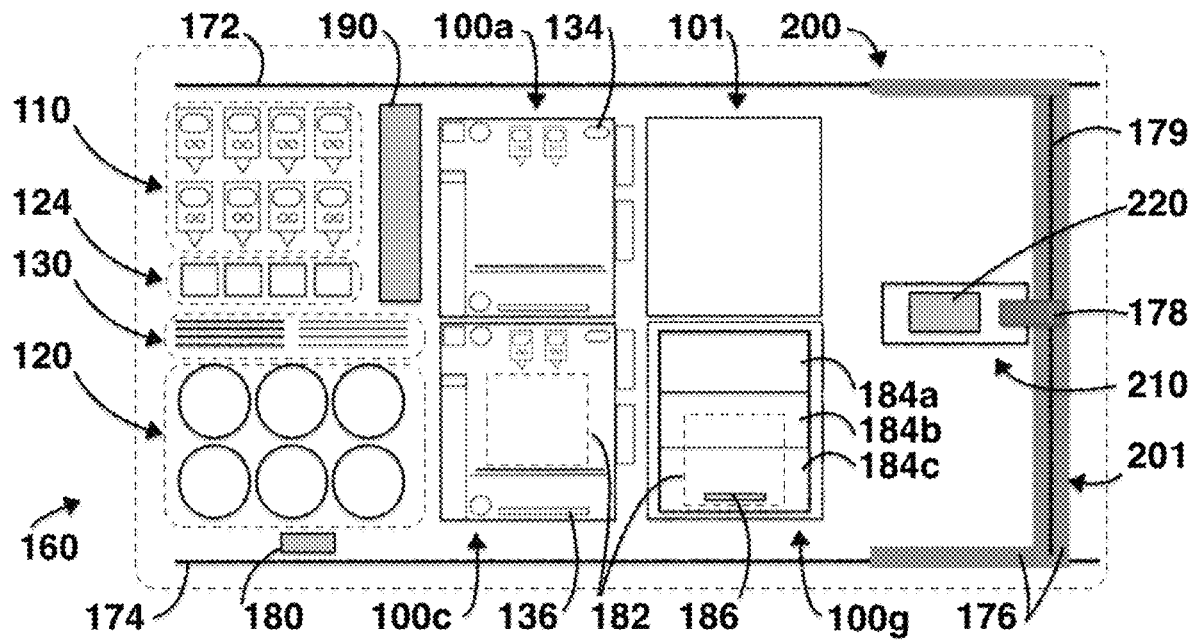
FIG. 3 illustrates an example AM system using ACMW technology according to an embodiment of the invention.

FIG. 3 shows an example of an AM system 160 using ACMW technology according to an embodiment of the invention. It begins to illustrate how ACMW can overcome or improve inefficient module storage, complex configuration requirements, inefficient system usage, and/or high labor requirements that are common in conventional attempts at flexible, scaled production AM. The AM system 160 includes a cluster of 3D printers including 3D printers 100a, 100c, and 100g. Note that module 101 (conveniently depicted without any particular characteristics) may be any of a number of different components, including another 3D printer 100 of the bank. This will be discussed in more detail below. The AM system 160 further includes a computing module or controller 180. The computing module 180 may be co-located with other modules of the AM system 160, or it may be located remotely, e.g., in the cloud, or a combination of both. The computing module 180 may comprise two or more computing systems in different locations. The AM system 160 also includes shared banks of modules respectively including print heads 110, air filters 124, build platforms 130, and feedstock modules 120.

The AM system 160 includes robotics 200 configured to remove modules (or components thereof) and exchange them with modules from the banks of modules. In the embodiment shown in FIG. 3, robotics 200 includes a robotic gantry system 201. The x-carriage 176 of the robotic gantry system 201 moves along a rail 172 and optionally a second rail 174, and the x-carriage 176 carries a y-carriage 178 that travels along a rail 179 within the x-carriage 176. The y-carriage 178 carries a z-carriage 210 which houses an end effector 220. The end effector 220 is configured to carry out module configuration, including but not limited to changing the print heads 110, the build plates 130, the air filters 124, and the feedstocks 120. In the depicted example, the robotics 200 have three mutually perpendicular degrees of freedom (DOF), namely x, y, and z. However, the invention is not limited to these three DOF's and may include more to permit more complex manipulation of modules. For example, adding another DOF to the end effector 220 could allow it to reach inside of a printer 100 to change a print head 110. This would permit greater flexibility in printer design in that a print head 110 would not need to be accessible through a door of the printer 100 from a single direction.

In some embodiments (not shown), the robotics 200 may move along a non-linear path(s). For example, the rails 172 and 174 may curve travel around to the opposite side of the printers 100, thereby providing the end effector 220 with access to other sides of the printer. In some embodiments (not shown), the robotics may not travel on rails, but instead move freely, e.g., on wheels. The robotics being able to access multiple sides of the printer 100 may be useful. For example, feedstock could be stored behind the printers 100 rather than between the printers 100, obviating need to spread the printers apart and instead increasing density of the system.

The robotic system 200 is not limited to one robotic system and may include two or more robotic systems that may be identical or different and may work together or independently. The robotic systems may have different types of end effectors 220 designed for specific tasks. The end effectors may be configured to be changeable by the robotic system 200 such that the system can switch between end effectors as desired. The process of changing an end effector is another example of configuring the AM system. For example, one end effector 220 may be designed for changing build platforms, another end effector 220c (not shown) may be designed for gripping printed parts, another end effector 220d (not shown) may be designed for changing print heads 110, and another end effector 220e (not shown) may be designed for changing entire printer modules 100. One skilled in the art pertaining to robotics would know that robotics may be controlled by servo motors, pneumatic controllers, or other actuators common in robotic systems and thus such specifics will not be discussed here.

In some embodiments, the robotic system 200 effects module changing (configuring of a portion of an AM system) using a pick-and-place style of material handling wherein an entire module or a portion of a module is physically moved from one location to another. In certain embodiments, a first location may be a storage bank outside of a 3D printer and a second location may be a 3D printer of an AM system. In other embodiments, the first location may be a given 3D printer or a section thereof and the second location may be another section of that printer or another 3D printer. (That is, a storage bank of modules includes any modules of the system including those that may be within a 3D printer.) In some embodiments, a bank of modules may be shared between two or more 3D printers; in certain embodiments a module can be configured automatically for use by a first or a second 3D printer.

The depicted embodiment depicted in FIG. 3 also includes a multi-input, multi-output system (MIMOS) 190, an alternative system to achieve the same or different outcomes as robotic system 200. The MIMOS 190 effects configuration by networking modules of the AM system 160 through constrained connections such as, for example, but not limited to tubes, pipes, channels, or cables, that permit the movement of medium between different parts of the system 160. This network is particularly suitable for the movement (and accordingly the sharing) of feedstock, including e.g., filament. The MIMOS will be discussed in more detail below with reference to FIG. 4.

The following discussion includes descriptions of some examples illustrating how the ACMW system depicted in FIG. 3 can carry out various workflows. That is, certain production objectives will be given, and the ACMW system will be employed to achieve those objectives. It should be noted that ACMW can be employed before printing commences and while printing is in progress. Configuring, i.e., automated configuring, is able to proceed during printing by the AM system. It is also possible for one or more production objectives to be changed and the configuration to be reconfigured accordingly, including during the workflow.

In a first example, a production objective requires three parts to be printed as rapidly as possible by the ACMW AM system 160. That is, short time to completion has been identified as a key factor or criterion for the controller's analysis. In order to achieve the production objective, the controller 180 will simulate various configurations of the AM system 160 to determine the most suitable achievable configuration that will yield the shortest print time. The AM system will be configured accordingly. Initially in this example printer 100a has two print heads 110, a filter 124 that has HEPA capabilities, as well as a SEME module 140, and printers 100c and 100g each have one print head 110 but no filters 124 and no SEME modules 140. The production objective includes three printed parts where a first printed part requires two print heads in order to be printed, a second printed part requires a build material requiring HEPA filtering, and a third printed part requires printing with a SEME module providing multimaterial feedstock. Thus, the system in the described initial configuration would not be able to print all three parts in parallel as only printer 100a would be appropriately configured to execute these three prints. The three parts would need to be printed sequentially on printer 100a while two printers 100c, 100g would be idle, resulting in poor system utilization and a long total print time.

Accordingly, controller 180 begins the simulation and optimization analysis by analyzing the production objectives to understand the quantities of each part to be made as well as the specific requirements of each print. Controller 180 will also analyze the AM system 160 to identify which 3D printers 100 and other modules are available and the current configuration of each. The controller 180 in this example would identify the three parts to be printed each with unique requirements, as well as the three 3D printers 100a, 100c, 100g (module 101 is assumed not to be a printer 100 for this example) and their current configurations. Controller 180 would then check the AM system's banks of modules to determine whether the robotic system 200 would be able to configure the printers 100 by moving modules to the printers. This would include referencing pre-programmed logic and system data such as, for example, which modules are compatible with which printers, which robotic end effectors 220 can move which modules, etc. The controller can determine that printer 100a can be used for the print requiring two print heads, printer 100c can be used for the print requiring a HEPA filter, and printer 100g can be used for the print requiring a SEME module. The controller may also simulate other configuration options and may score the options based on the expected total print time, the user having indicated total print time to be a key factor for this specific production objective. After automatically selecting a configuration to enable a specific (preferably optimal) workflow, the controller 180 would then control the robotic system 200 to achieve this. This would include the robotic system 200 moving the filter 124 from 3D printer 100a to 3D printer 100c, as well as moving the SEME module 140 from printer 100a to printer 100g. The system would then be configured such that the three 3D printers 100 can print all three parts in parallel. The controller 180 can confirm the configurations and then initiate the three 3D printers 100 to execute the 3D prints. Subsequently, the robotic system 200 can retrieve the completed prints and move them to a storage location (not shown). In this example the selected workflow is able to achieve the production objectives faster through automated configuration of the system for efficient parallel printing.

Figure 15:
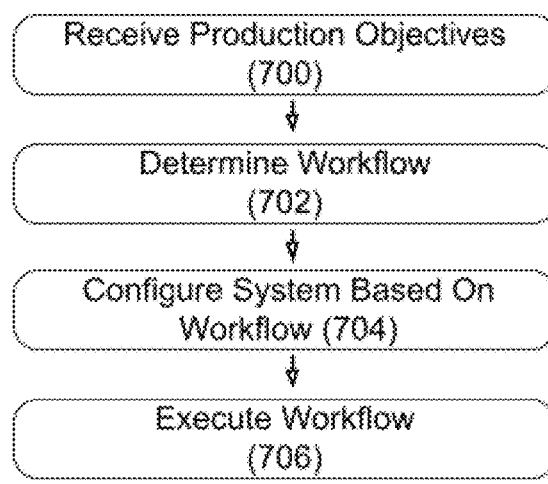
FIG. 15 illustrates a flow chart of a process for use in embodiments of the invention.

It can be seen from this example that there may be more than one configuration and workflow to achieve a production objective. As shown in FIG. 15, the ability of ACMW technology to receive, identify, or receive and identify one or more production objectives at step 700, determine a workflow at step 702, configure the system based on this workflow at step 704, and then to execute this workflow at step 706 provides a valuable additive manufacturing process. This process may be carried out by a controller automatically allowing the system to receive one or more production objectives and execute on the production objective(s) through a workflow without the need for a user to explicitly define the workflow.

In some examples, the selection of one workflow option over another may present benefits especially relating to key factors and criteria identified by a system user. In some examples, where the number of options may be large (i.e., 1000 or more), it will be complex and time consuming for manual identification of possible configurations, identifying the practicality of implementing each, identifying workflow options based on the identified practical configuration(s), and then deciding which workflow to execute on. Comparing the practical workflows can also be time consuming and challenging to be done manually. ACMW technology's ability to automate this process may allow for it to happen considerably faster and for the best, sometimes optimal, workflow to be selected. This will lower TCPP by saving operator time and selecting a workflow that may in some cases save energy, save material, be completed faster, and/or require less inventory, plus provide certain other benefits discussed in this application.

Figure 16:
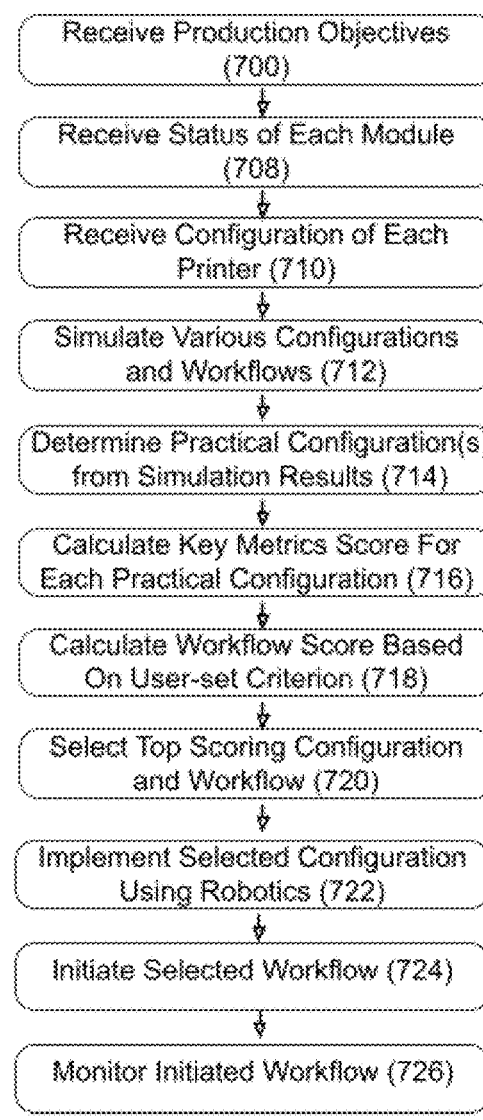
FIG. 16 illustrates a flow chart of another process for use in embodiments of the invention.

FIG. 16 illustrates a process used by ACMW technology in some embodiments for determining a workflow based on scoring between practical alternatives and with continuous monitoring. An ACMW system may receive and identify one or more production objectives at step 700. The status of each module will then be identified at step 708. This may include identifying the state of a module such as, for example, if a printer is available for a new print or if it is currently printing. This may also include time based information and predictive information such as when a printer will become available. Step 708 may also include identifying any feedstock sources at the system and the amount of each type of feedstock at each source. This may also include time based information and predictive information such as the amount of feedstock that will be available at each feedstock source based on expected consumption based on printing and other workflows that may already be scheduled. This may be important as for example, if a workflow is being decided on and will be initiated in the future then the input state in the future may in some cases be more useful than the current input state during the execution of the process of FIG. 16.

Considering inputs with a predictive nature adds another level of complexity, making it challenging for this process to be done manually. The system may then identify the configuration of each printer at step 710. This may for example include identifying the print head(s) at each printer and their capabilities. The system will then simulate various configurations and workflows at step 712. This may include computing a list of one or more permutations and combinations of configurations and workflows that can be achieved based on these configurations. The controller may use pre-programed logic and look-up tables to generate a list of productive configurations and workflows. The simulation may use a common approach known industrially as a "digital twin" wherein the ACMW system is represented virtually. In this case, a digital twin can be used to simulate various configurations and workflows to help with the computing of a list of one or more permutations and combinations of configurations and workflows. The system will then analyze various configurations for implementation feasibility at step 714. This may include analyzing each workflow and passing through each step in the workflow to ensure it is achievable. For example, in a workflow computed by the controller, it may be required for a print head to be moved from a storage location to a specific printer. In this example, the controller can then check for the ability or compatibility of the robotics 200 to configure the printer with the required print head, and determine what end effector would be needed for this. If the system identifies that the required end effector for this is not available, then it would decide that this particular configuration is not practicable and any workflows that require this specific configuration would be removed from the list of configurations and workflows. Once a list of practical configurations is computed, the system would then calculate key metrics for each practical configuration at step 716. This may include, for example, calculating the print time based on each configuration and then adding together the various steps of a workflow to identify the total time to achieve the production objectives through that workflow. Calculating the print time, for example, may be done through executing the slicing of a print file or by using a digital twin to simulate the process. This step may include calculating the total energy used by the system during the workflow. The total energy and total print time would be two examples of key metrics that could then be used to calculate a workflow score based on user-specified criteria at step 718. If, for example, there are two practical workflows where a first workflow ("workflow one") is projected to take 40 hours and 1000 units of energy, and a second workflow (workflow two") is projected to take 20 hours and 2000 units of energy, the decision regarding which one is "better" may be based on a user-specified or pre-programmed scoring system. If, for example, a user specifies that total print time has a relative importance of 90% and total energy usage has a relative importance of 10%, then these can be used to determine the weighting of each factor for a final score. For example, if scoring is out of 100 and since 90% of the score is based on print time, then workflow one would get 45 points and workflow two would get 90 points, as workflow one being half the speed of workflow two would get half the total points as workflow two. The scoring for energy used would similarly allot workflow one with 10 points given it has the lowest energy usage, and workflow two would get five points as it has double the energy usage. The total scores would thus be computed as 55 points for workflow one and 95 points for workflow two. Workflow two scoring higher than workflow one would then lead to workflow two being selected. The system would then implement the configuration of the selected workflow using robotics at step 722. This may include, for example, positioning the required feedstock (s) at one or more printers based on the printing requirements of the first print(s). The system would then initiate the workflow at step 724. It is worth noting that the workflow may include one or more printers and one or more prints to be done on each printer, and thus step 722 may require one or more configurations, e.g., to start the workflow as well as during the workflow. The system would monitor the workflow at step 726 to detect the status of the 3D printing workflow which may include using sensors to determine progress on printing objectives.

The process of FIG. 16 can be executed one or more times and, in some embodiments, may run during the entire workflow. The controller may change the workflow or select a different workflow once the workflow has begun based on changes in the inputs used to identify the top scoring configuration and workflows. This may include reconfiguring at least one of the 3D printers and the modules in response to the detected status of the 3D printing workflow. This may include reconfiguring at least one of the 3D printers based on a change in production objectives by a user of the system or based on a change in user set criteria by the user. For example, a user may have a change in needs, requiring the user to prioritize energy usage over print speed, and this may occur after the workflow has already begun. With this change in criteria, the system could then run through the steps of FIG. 16 to determine if a change in workflow may be required and, if so, to execute on this new workflow. The ability for the system to constantly monitor inputs and ensure that a beneficial, sometimes optimal, workflow is being executed has benefits in reducing TCPP.

It is worth noting that while the process steps of the flowcharts in FIGS. 15 and 16 have been presented in an order, this was done to exemplify specific embodiments of the invention although these steps can be usefully employed in various orders and not all steps need to be included. Further, in other embodiments, additional steps may be used and various steps may be used more than once.

In a second example, a production objective requires two parts to be printed as rapidly as possible by the ACMW AM system 160. In order to achieve this workflow, the controller 180 may configure the system so that both prints can happen in parallel on printers 100*a* and 100*c*. Initially in this example the two printers do not have any feedstock or SEME modules loaded into them. There are two feedstocks in the feedstock bank 120 of AM system 160 wherein these feedstocks are in the form of filament, one being black PLA and the other white PLA. There are also two SEME modules in a bank (not shown). The production objective includes two printed parts wherein the first part requires its bottom half to be black and its top half to be white and the second part requires its bottom half to be white and its top half to be black, and wherein both materials are PLA.

Controller 180 will begin by analyzing the production objectives to understand the quantities of each part to be made as well as the specific requirements of each print. Controller 180 will also analyze the AM system 160 to identify which 3D printers 100 are available and the current configuration of the printers. The controller 180 in this example would identify the two prints each with unique requirements, as well as the two printers 100a, 100c and their current configurations with no feedstock. Controller 180 would then check the AM system's banks of modules to determine whether the robotic system 200 can configure the printers 100 by moving feedstock modules to the printers. The controller 180 would identify that each printer will require both black and white PLA filament and that there is only one spool of each available. Preferably, each spool is in a material pod 300 (not shown in FIG. 3, discussed later for FIGS. 5A-5B). Material pods 300 facilitate automated loading of filament into printers and SEME modules. The controller would analyze the parts to determine if sharing of the spools would be an efficient workflow and would determine that in this example, each printer only requires one spool of filament at a time and that the printers require different spools at any point in time, meaning that sharing is possible. In this example there would be no instance where both printers need the same material at the same time. The controller 180 would then determine that use of a SEME module would permit a transition from a first material to a second material to be achieved through the forming and feeding of a multimaterial feedstock, thereby allowing printing to proceed uninterrupted by a material change. This would decrease time required and increase printing efficiency.

The controller 180 would control the robotics 200 to configure the system such that the first printer 100a printing the first part would have black PLA loaded to it, and the second printer 100c printing the second part would have white PLA loaded to it. Such configuring would include the robotic system 200 configuring itself by installing a specialized feedstock-changing end effector 220a (not shown) so that that it can pick up a first spool of feedstock 120 from the bank of feedstock and install it at the printer 100a, and pick up a second spool of feedstock 120 from the bank and install it at the printer 100c. The controller 180 would use the robotic system 200 first to remove the feedstock-changing end effector 220a and then to install a specialized SEME module-changing end effector 220b (not shown). The robotic system 200 will then be able to retrieve two SEME modules from a bank of SEME modules (not shown) one at a time and to install them respectively at each printer 100a, 100c. The controller 180 would then initiate printing by the printers 100a, 100c wherein each printer prints the first half of the print using the appropriate first color. The controller 180 would monitor progress of the prints and identify when they are approaching the need for material from the second spool of a different color. The controller 180 would then instruct the SEME modules of each printer to cut the respective first feedstock and retract it. The controller will factor in the printing speed and ensure that the feedstock is cut with a long enough final segment to allow time for the robotic system 200 to change to the next feedstock. If the controller 180 calculates that the printing speed is too fast that the printer will run out of filament before the new filament is able to be installed and loaded, then the controller will pause the print or slow printing speed to provide time for the second feedstock to be installed. The controller will also use sensor data from the SEME module and/or printer such as, for example, data about the amount of filament consumed by the print head to coordinate operations; i.e., the data is part of a closed feedback loop that coordinates timing the feeding of the second filament. The robotic system 200 would then remove the black feedstock from the 3D printer 100a, temporarily placing it in the feedstock bank. The robotics would then remove the white feedstock from the 3D printer 100c and position it at the printer 100a. The robotic system would then retrieve the black feedstock from the feedstock bank and position it at the printer 100c. The feedstocks would then be received by the respective SEME modules which would coordinate the forming of multicomponent feedstock. That is, for printer 100a, the multicomponent feedstock would include a white section abutted to the end of the black section already being printed by the printer 100a such that the printer is able to switch from the first material to the second material at the desired location halfway through the print. For printer 100c, the multicomponent feedstock would include a black section abutted to the end of the white section already being printed by the printer 100c such that the printer is able to switch from its respective first material to its respective second material at the desired location halfway through the print. The use of the robotics 200 for dynamic reconfiguration during the print, as well as use of the SEME modules, permits the two 3D printers 100a, 100c to share feedstock resources. This has not been done previously. In this example, printing can therefore take place in parallel in half the time than would be required if the two prints needed to be run sequentially, i.e., where only one 3D printer could use both feedstocks.

In a third example, an initial production objective requires two parts ("part one" and "part two") to be printed by the ACMW AM system 160 as rapidly as possible and with the lowest amount of energy consumption as possible. That is, speed and low energy consumption are two criteria used in the controller's analysis of possible workflows. Each of the two parts will require 24 hours to print. Part one requires no post processing and part two requires post processing in an annealing oven for 24 hours. The AM system 160 has two printers 100a, 100c available for printing, as well as a single annealing oven at location 101, wherein the annealing oven is large enough to accept multiple parts at a single time. Each printer is configured with appropriate modules to print the parts, so the controller 180 will initiate printing of the parts to print, one on each printer 100a, 100c. The controller will determine that the time to complete the full workflow will be 48 hours, where the part two requires 24 hours of printing followed by 24 hours of annealing.

However, one hour into printing of the parts, an operator changes the production objective by adding a third part ("part three"), identical to the part two, that will take 24 hours to print and then require 24 hours of annealing. The controller 180 will then calculate that part three can only begin printing after one of the part one or part two has been printed, and would then need 24 hours of annealing after the part two's 24 hour annealing process is over, meaning the time to complete the full workflow would increase to 72 hours. The controller 180 will analyze the new production objective of three parts and analyze whether the system can be reconfigured to minimize the total print time and/or use less energy. As stated, adding the third part to the workflow to print after the first and second parts have been printed will require three 24 hour printing cycles as well as two sequential 24 hour annealing cycles. The controller 180 will calculate the energy used for this workflow and compare this total energy, as well as the 72 hour total print time, to any other possible configurations it can simulate. For example, the controller 180 will consider alternate workflows wherein one or both of the prints on 3D printers 100a, 100c is cancelled/aborted after one hour and then the system is reconfigured. In one such alternate workflow, if part one was cancelled and part three was instead printed on printer 100a, this would mean that part two and part three would both be done printing after 25 hours have lapsed. The controller could schedule part two and part three to then be annealed at the same time in the same annealing oven module for 24 hours, avoiding a second 24 hour annealing time and thereby saving time and energy. Part one could be printed in its entirety during the same 24 hour period during which parts two and three are being annealed. The controller would also need to confirm whether the bank of build platforms 130 would have enough build platforms, given that this change in workflow would require the use of an additional build platform, the first build platform having been used for the initial aborted print of part one.

After confirming that the AM system has the necessary modules for configuration of this alternate workflow and that this workflow would result in the most efficient use of time and energy, the controller would have the system execute the necessary reconfiguration. The initial printing of part one would be aborted and the robotic system 200 would remove the aborted print from printer 100a and store it in a storage area (not shown). The robotics 200 would then retrieve a new build platform 130 from the bank of build platforms and place it in the build chamber of printer 100a. Printing of part two and part three would proceed. When completed, the robotic system would remove the build platforms bearing part two and part three from printers 100a and 100c and load the parts into the annealing oven together. The controller would then initiate the annealing process. The controller would also instruct the robotic system 200 to retrieve a new build platform 130 from the bank and install it at printer 100a so that part one could be restarted. This would allow part one to be printed in parallel to parts two and three being annealed. In this scenario, the total production time would be 49 hours and the energy needed for a second 24 hour annealing cycle (according to the initial workflow) would be saved. The selected alternate workflow would require wasting one hour of printing of part one on printer 100a.

In this example and other embodiments of ACMW, the computing module or controller 180 can use pre-defined user inputs for the relative costs of print time, energy usage, and/or waste in order to determine the most optimal workflow. The user can assign different weights to these and other parameters. Thus, the controller 180 can compare multiple simulated configurations and workflows and by comparing scores can determine the preferred solution. In the previous example, a preferred configuration is able to be determined by controller 180 and effected by robotic system 200 to reduce total print time and total energy usage. Moreover, the new solution could be identified and implemented dynamically after production commenced.

ACMW technology provides automated configuration strategy and implementation for AM involving a shared module(s) or shared bank(s) of modules. This is superior to the conventional ("brute force") approach of having every type of module for every 3D printer (e.g., a dedicated SEME module for each printer, a dedicated feedstock source for each printer, a dedicated AMHU for each printer, a dedicated part polisher for each printer, a dedicated oven for each printer, a dedicated HEPA filter for each printer, etc.). For ACMW apparatuses, processes and systems, a predefined number of modules is stored and the controller manages and uses these modules strategically, including sharing modules. Further, the controller automates configuration and manufacturing workflow such that equal or better printing efficiency can be achieved as that provided by conventional, brute force methods. In some embodiments, configuration is automated by robotics and/or MIMOS. ACMW technology permits an AM system with a fixed number of modules to be strategically configured to optimize workflow in regard to multiple parameters, such as for example, but not limited to, productive hours, energy use, job completion time, number of input modules needed, part quality, number of operator interventions needed, reduction of printing risk, etc. This strategic optimization will be discussed further later in this disclosure.

Embodiments of the ACMW system provide advantages over prior approaches. For example, one can consider an example where the systems illustrated in FIG. 1 and FIG. 2. are looked at in combination and in contrast to the ACMW system of FIG. 3. It can be understood that each printer 100 shown in FIG. 2 having eight print heads, four air filters, three build platforms, and 16 feedstocks would require the storage of 31 modules and so for the six printers in FIG. 1, together they would have 186 modules. Keeping inventory on hand to replace the modules if they are damaged, depleted, or have reached their end of life would add even more modules to be stored. It can be seen that the current status quo of needing to have every module on hand for every printer for full flexibility of the AM system is expensive and inefficient. The cost of these modules needing to be held in inventory in the system can place a large burden on the system owner. The amount of space that these modules take up also acts to drive up space costs and reduce system density. Having every single module on hand would be a brute force method to obviate certain needs for configuration but this is unrealistic and not highly scalable.

As new capabilities come to market for 3D printers such as SEME in 2014, AMHU in 2018, and new innovative materials every year, the number of modules and variations of the modules that will be needed within an AM system is increasing and the brute force method cannot scale. Market drivers such as higher volumes, pressure on cost, the need for rapid switch over to keep manufacturing facilities flexible, the demand to reduce set up time to maximize productive machine use, the need to reduce human errors, the need for more material availability, the need for more combinations of materials being used together, all lead to exponentially higher demand for flexibility. Market trends are also showing a higher degree of specialization, leading to more non-uniform components. Where an operator may have in the past only had a single print head that would need to be replaced only at its end of life (EOL), we now see the need to have many print heads (e.g., a specialized print head per material) and this again drives the need for more configuration and the challenges that are present with configuring current systems on the market.

The automated configuration enabled by ACMW technology allows for the sharing of resources by the different printers in the system, drastically lowering the number of modules that must be stored. In the brute force method, in order for every printer to have the same level of functionality, every printer needs the same modules on hand. This might mean, for example, that 10 printers meant to print dual material parts using material one (M1) and material two (M2) would each need to have spools of M1 and M2, meaning there would be 20 spools in total. If any of the printers did not have an M1 or M2 spool, then they would not be able to print the dual material part. With ACMW technology, on the other hand, the 10 printers would only need as little as one spool of M1 and one spool of M2 in order to permit all the printers to print parts with M1 and M2, even at the same time, where the material can be shared by the printers, as will be discussed below. Given that both the ACMW system and the brute force system of this example would have identical output (i.e., same materials, same print time), reducing the number of spools from 20 to two would represent a 90% reduction in materials storage, which is valuable as described previously. If, for example, the 18 spools of capacity were replaced with 18 other materials (i.e., M3-M20) and the space was held constant, the ACMW system would provide a significantly more flexible system with a higher degree of configuration potential.

ACMW apparatuses, processes, and systems can include a variety of configurations, workflows, and features. Selected aspects and embodiments will be described now. It is to be understood that in the instances where additional modules and/or features are included in an ACMW AM system, these generally are under control by the computing module or controller 180 and generally can be configured, e.g., using the robotics 200.

Automated Doors

During a 3D printing process, it is common to maintain the build chamber (where the part is being printed) at a constant temperature in order to control quality and reliability of the process. In many cases and depending on the material being printed and the 3D printing process being used, it is useful to maintain the build chamber at an elevated temperature, i.e., provide a heated build chamber. Having the build chamber heated to a temperature near the glass transition temperature of the material being printed can help reduce warping and other thermal contraction effects that can cause problems with the printing process or the integrity of the printed parts. In order to maintain the build chamber at a selected temperature, it is required to insulate the build chamber or the regions around it and to use a heater module 136 to add energy into the build chamber. However, an insulation layer around the build chamber can present an obstruction for printed parts, for a build platform, for a print head, and for other system modules passing in and out of the printer, including during an automated process as in ACMW technology.

This disclosure provides a door, preferably a thermally insulated door, that can be automatically opened and closed and that provides access to the build chamber for the robotic system 200. In certain embodiments, the door may be actuated by an actuator, e.g., a mechanical or electromechanical actuator, that is built into the 3D printer. In other preferred embodiments, the actuator to open and close the door is part of the robotics 200. This would obviate the cost and complexity of adding a door actuator to all printers in the system 160 and instead would limit the cost and complexity to one section, the end effector 220 or another part of the robotic system 200.

The door may open and close in a variety of ways including swinging, sliding, pivoting, or other commonly understood door motions. One complication with a swinging door, however, is that the swing path of the door needs to be clear and, in some cases, this could interfere with robotic components, humans tending to the system, etc. Accordingly, it is preferable to have the door stay within the volume of the 3D printer. In certain embodiments, this is achieved by the door being divided into two or more panels that together form the door. An example is shown in FIG. 3, where three cascading panels, a top panel 184a, a middle panel 184b, and a bottom panel 184c, together form a door. The bottom panel bears an optional handle 186 that allows for a simple engagement with the end effector 220. The robotics may use on board sensors to locate the handle 186. The end effector 220 may be positioned by the handle, e.g., under the handle, and then may apply a force on the handle to slide the panel 184c. Panel 184c being actuated by the end effector would slide toward panel 184b also sliding it as the handle 186 engages the bottom of panel 184b. Both panels 184c and 184b would tuck beside panel 184a. This would permit an object the size of the build volume, identified by dotted line 182, to move out of the printer without interfering with the doors. The door panels 184a, 184b, 184c may slide in tracks (not shown). The 3D printer may have sensors that detect the position of the door panels to ensure that the door is fully closed during heating and printing and fully open during module or part removal.

When the door of a 3D printer opens, if the temperature inside the build chamber is elevated above room temperature and the temperature outside of the printer is room temperature, then the air will mix and may rapidly equalize. If such change in temperature inside the printer is too rapid, it can cause problems to the printer as well as to the parts being printed. For example, rapid thermal expansion or contraction can cause fractures in components of the printer and can cause accelerated fatigue of electronic components. Similarly, for the 3D printed parts, rapid thermal expansion or contraction can cause internal stresses that in some cases can cause fracturing of the part surface. Accordingly, for preferred embodiments, there is communication between build chamber temperature sensor(s) 134, the controller 180, and the actuator (not shown) or the robotics 200.

In some embodiments, the temperature of individual build chambers can be controlled independently as is shown in FIG. 3 using heater module 136. Accordingly, the temperature of the build chamber may be the same or different for each printer and can be configured automatically by controller 180 or user input, based on the requirements of the materials being processed.

Thermally controlled build chambers provide advantages in regard to the range of materials that can be processed, printing reliability, system performance, etc. The ability to automatically close the doors of a printer provides safety benefits, as there are hazards in a 3D printer including moving parts, heaters, and electrical components. In ACMW systems that can be scaled to include many printers, having doors on the printers that are closed during printing processes increases the system safety.

Printer Movement for Densification

As mentioned above, in some embodiments of ACMW technology, the 3D printer 100 is itself a module that may be positioned by the robotic system 200. There are several reasons why configuration and location of printers 100 is important and a few will be described. Different print jobs will require different configurations of printers 100 and these configurations may require different amounts of energy and/or computing power. While the ACMW system of FIG. 3 is shown to have four printer modules 100a, 100c, 100g, and in some embodiments 101, it should be understood that the system may be expanded to have any number of modules; this includes systems with thousands or more modules. The power and data requirements of large systems would likely require large systems to divided to have regions with different energy and data circuits. In order to balance the loads in these regions, the robotics 200 could, for example, move a high power requirement printer into a region that has lower power requirement printers in order to balance the electrical load.

In another example, the ability to configure the location of the printers can be useful for densifying the printers of an ACMW system. In order for an operator to get access to each printer for assembly, maintenance, or replacement, there needs to be space for the operator to travel. However, providing hallways between rows of printers for operators to travel in order to reach all printers could significantly reduce maximum achievable system density. Instead, in some embodiments an operator is able to access only a section of the system and the robotics 200 is able to bring printers or other modules to the selected section, thereby obviating the need for the operator to access the full system. This can lead to densification of the system. In certain embodiments, ACMW systems may be provided underground, where real estate is low cost and space is abundant. Such a system may for example have printers deep into the ground in areas which would be very difficult and/or dangerous for a person to service. In another example, a warehouse may be packed densely with ACMW systems and some printers may be very high up in areas that are again challenging and/or dangerous for a person to reach. However, ACMW presents a solution to such problems, wherein the robotics 200 have the ability to bring the printers 100 to a more suitable, e.g., ground level location.

There are a variety of other modules that may be part of ACMW technology in some embodiments. Conveniently, such modules may be considered as module 101 of FIG. 3.

Storage

Given the production capacity of ACMW, there may be a need for a supply of fresh build platforms and/or a need for places to store completed parts so as to allow the printer(s) to be cleared for subsequent print jobs.

In some embodiments, a build platform storage station is provided. In certain embodiments, this is a partially open container in which build platforms are stacked. (The container is partially open so that the contents can be easily accessed.) Conveniently, the build platforms may be stacked adjacent to the walls of the container for alignment. By stacking the build platforms on top of one another, they can be stored densely, allowing a large number of build platforms to be stored in a small area. In some embodiments, the build platforms may be stored on shelves of the storage station to separate them so that contact between them is limited. Contact can cause wear due to scratching and can also cause the build platforms to stick together or become contaminated due to interaction of the build platform materials and interface layers. In some embodiments, there may be two or more independent build platform storage stations such that non-uniform build platforms can be stored separately. For example, one storage station may be loaded with PEI-coated spring steel build platforms, while another storage station may be loaded with PVA glue-coated borosilicate glass build platforms. In some embodiments, non-uniform build platforms may be stored in the same build platform storage station which may be configured to selectively dispense build platforms either using integrated mechanics, the mechanics of the robotic system 200, or a combination thereof.

In some embodiments, each build platform has an integrated identifier. This could be a visual identifier such as a color, a bar code, a serial number, or the like. Alternatively, the identifier could be a non-contact sensing device such as, for example, a radio frequency identification (RFID) module, a near field communication (NFC) module or the like. The identifier may store data on the build platform and/or may link to a storage location in a database in order to track properties and parameters of the build platform, for example, usage. In some embodiments, the robotic system 200, the printer 100, or another component of the ACMW system may have a scanner or reader configured to read build platform identifiers and send data to the controller 180. The data may relate to any of a variety of build platform properties and parameters. For example, during a pre-processing step such as build platform inspection, surface application, cleaning, or interface layer application, the processing steps may be logged to the identifier and/or the storage location in the database. Accordingly, the controller 180 could access the most recent status of the build platform and ensure that the ACMW system uses the build platform in configurations for which it is suitable.

The ACMW system will be able to configure the printers 100 according to the specifications of respective print jobs. In some embodiments, the build platform storage station is configured to allow the end effector 220 of the robotics 200 to grip a single build platform in order to pick it up and install it at a 3D printer 100. In some embodiments, the end effector 220 has an outwardly protruding dowel pin that engages with a corresponding gripper hole in the build platform, permitting it to pull the build platform and slide it onto the z-carriage 210. In some embodiments, the end effector may employ a permanent magnet, an electromagnet, a mechanical gripper, a suction cup, an electromagnetic sheet fanner, or the like to selectively grip a build platform and to separate it from one or more other build platforms that may be in the build platform storage station.

In some embodiments, a storage station for completed printed parts is provided. However, given that parts printed by a 3D printer may have different sizes and shapes, it can be challenging to reliably and safely receive, position, and store any and all types of parts in a storage container. In some embodiments, it is more convenient if instead the printed part is kept on the build platform 130 on which it was printed, and stored on the build platform. Here, storage could be simplified since the storage station would be receiving a known geometry each time. That is, the known build volume would provide a limit to the size of the part(s) on the build platform 130. Accordingly, in some embodiments a storage station for build platforms bearing printed parts is provided. This includes those instances where multiple parts are printed in a single print job. The storage station may include a shelving or racking system, where shelves can be positioned one on top of another. In some embodiments, computing module 180 can plan and control storage of build platforms bearing parts, optionally to increase or maximize storage density. In some embodiments the storage module for build platforms bearing parts or selected shelves thereof may be easily removed from the ACMW system. They may be taken to a different location, optionally for subsequent processing either by robotics or by human operators.

Although storage of parts on build platforms may simplify the storage process, it comes with drawbacks in that it requires a high number of build platforms and is lower density in comparison to embodiments where only parts are stored at a station. Accordingly, in some embodiments, ACMW apparatuses, processes, and systems may include one or more part removing mechanisms. Optionally such part removing mechanism(s) may be employed at the build chamber or at the storage station to remove part(s) from a build platform. In some embodiments, controlled separation, separators, and/or trolleys as taught in Debora et al., U.S. Patent Application Publication No. 2020/0130256 may conveniently be employed.

Post Processing Systems

Optionally, the ACMW system may include any of a variety of post processing modules to enhance the quality and value of the parts being printed. In some embodiments, the ACMW system may include an annealing chamber that provides controlled elevated temperatures in order to remove internal stresses and strengthen parts. Annealing may be performed inside of a 3D printer 100 or the annealing chamber may be separate from the printer, particularly when it is desirable to use temperatures above what a 3D printer can provide. Also, using an independent annealing chamber outside of a 3D printer can free up a 3D printer to print new parts. Often multiple parts can be annealed at the same time in an annealing chamber. This can increase efficiency of the system and/or reduce the overall annealing capacity required by the system. For example, instead of having a dedicated annealing module for each 3D printer, the system may have one or more annealing modules that respectively service multiple 3D printers, e.g., an annealing module for every ten 3D printers. Consolidating the outputs of the printers can provide more efficient post processing. In certain embodiments, the batching and/or consolidating of printed parts for post processing can be automatically determined using software run on the controller 180 or externally. Optimization algorithms similar to those discussed below may be employed.

In some embodiments, an end effector may be adapted for annealing. In some embodiments, an end effector may be thermally insulated and/or actively heated in order to provide annealing and/or to control the temperature of printed parts as they are moved from a 3D printer to a post processing module such as, for example, an annealing chamber. Controlling a part's temperature can provide such benefit(s) as minimizing internal stresses within the part and/or maintaining the part's adhesion to the build platform. For example, if a part is printed in a 3D printer with a heated chamber at 200° C. and the completed part is then to be annealed at a temperature of 150° C., exposing the part to room temperature (22° C.) while an end effector moves it from the 3D printer chamber at 200° C. to an annealing module at 150° C. could cause a number of problems. For example, such 178° C. change in temperature could cause warping or deformation of the part and/or the part could detach from the build platform, which could lead to catastrophic failure of the process. Such 178° C. thermal shock might cause degradation of material properties such as, for example, tensile strength or toughness. In this example, if a thermally controlled end effector were able to maintain the temperature of 200° C. during relocation of the part, or to transition the temperature between 200° C. and 150° C., risk of thermal shock/disturbance during relocation could be reduced or eliminated.

In some embodiments, the ACMW system may include a sintering oven for sintering polymeric, ceramic, or metallic parts. In some embodiments, the ACMW system may include a debinding system for parts that are printed with a binding agent that must be removed before sintering. The debinding system may be integrated with the sintering oven or it may be separate.

In some embodiments, the ACMW system may include an automated support material removal system. For support materials that are soluble in water and/or another liquid, the support material removal system may include a vat that can be filled with an appropriate liquid, optionally agitated liquid, to dissolve the support material. For solid support materials, the system may include a sand blaster, bead blaster, air blaster, mechanical tumbler, or other medium blaster to mechanically remove the support material. While one purpose of such post processing systems may be to remove support material, they may alternatively be used to enhance surface properties. For example, a mechanical tumbler may be used in the absence of support material in order to smooth out or polish surface details.

In some embodiments, the ACMW system may include a vapor smoothing module for smoothing the surface of printed parts and thereby enhancing their aesthetic and/or structural properties. In some embodiments the vapor smoothing module may contain means for drying the part such as, for example, a fan to force air past the part, or a heater to dry the part. In some embodiments, the vapor smoothing module may include one or more actuators for controlling the position and/or orientation of the part during or after the vapor smoothing process.

Vapor smoothing typically requires a solvent that is able to chemically melt the part to smooth the surface. For example, acetone is commonly used as a vapor to smooth ABS and isopropyl alcohol is commonly used as a vapor to smooth polyvinyl butyral (PVB).

Configuration of the vapor smoothing module may include the loading of liquid solvent into a vapor smoothing module, which may be done by means of robotics or MIMOS as discussed elsewhere in the application. The solvent may be one or a combination of different solvents based on the material of the part being vapor smoothed.

In some commercially available vapor smoothing systems, such as the Polymaker Polysmooth, there is a single rotational actuator that rotates parts about an axis that is parallel to the direction of gravity. In all other commercially available vapor smoothing systems known to the inventors, the part remains fixed/static inside the vapor smoothing module and vapor is moved past the part. One problem with the state of the art is that it is difficult to achieve uniform vapor coverage on the entire surface of the part. Typically, external/exposed surfaces of the part will get the most vapor coverage, whereas features that are less exposed and/or smaller and/or deeper into the body of the part will get less coverage. In some cases, a part is only as good as its least smoothed section, so an operator chooses to "oversmooth" the part in order to ensure that all its surfaces are smoothed. One of the consequences of this is that the vapor and/or melted printed material begins to accumulate. Such accumulation can cause problems such as cosmetic defects and/or changes in geometry. Gravity acting on this excess vapor can cause the vapor and melted material to move downward and to pool on any flatter surfaces. Since the vapor can carry melted material with it, this can cause changes in part geometry. In order to reduce or eliminate such negative effects of gravity on the vapor smoothing process and/or to achieve more uniformly smoothed parts, a solution is described below.

A vapor smoothing apparatus or module is provided that includes means for rotating a 3D printed part about an axis that is non-parallel to the gravity vector and, in preferred embodiments, may be orthogonal to the gravity vector. Rotating a part about an axis non-parallel to gravity permits the applied vapor in a chamber to access the various surfaces of the part more uniformly. The surfaces of the part will rotate through the vapor with more equal access even if the vapor in the chamber is not uniformly distributed. Additionally, moving the part during and/or after the vapor smoothing process may reduce accumulation of vapor on the part caused by gravity, which may help overcome the negative effects discussed above.

The following test was conducted: A vertical cylinder having a diameter of 25 mm and a height of 100 mm was 3D printed and then smoothed for 15 minutes in a vapor smoothing apparatus wherein the part was rotated about an axis parallel to the gravity vector. The part was dried using forced air and then measured. It was found that the diameter at the top of the part was 24.5 mm (i.e., less than 25 mm) and the diameter at the bottom of the part was 25.5 mm (i.e., more than 25 mm). This change in diameter was caused by gravity as the vapor had melted the material at the surface of the part and caused it to move downward in the part. A second experiment was conducted wherein an identical part was printed and then mounted in a vapor smoothing apparatus on a rotational axis that was positioned orthogonal to gravity. After 15 minutes of vapor smoothing including rotation at a speed of 20 rotations per minute, the part was dried using forced air and measured. Its diameter was found to have remained 25 mm at both the bottom and top. There was no measurable change in geometry, which outcome is superior to the state of the art.

Thus, moving a part during the vapor smoothing process so as to distribute the time that gravity acts on its multiple sides can help overcome common negative effects of gravity on the vapor smoothing process. It is to be noted that this solution of moving the part to counteract the effects of gravity is not limited to rotation about a single axis that is non-parallel to gravity; rather, one or more rotational and/or linear motions can be employed. In some embodiments, a robot with a plurality of degrees of freedom can rotate and translate the part along multiple axes. In some embodiments, rotation may occur about an axis parallel to gravity in combination with rotation about an axis that is non-parallel to gravity.

One of the challenges of rotating a part about an axis non-parallel to gravity is that gravity may cause the part to fall off of the surface in the vapor smoothing module that it is on. In some embodiments, fixturing may be employed to stabilize a part so that movement of the vapor smoothing apparatus does not cause the part to fall over. In some embodiments, magnets may be used to secure a part to the vapor smoothing apparatus or to a selected moving part of the vapor smoothing apparatus/module. In some embodiments, the surface of the vapor smoothing apparatus that the part(s) are on may be heated in order to maintain adhesion between the part(s) and the surface. The part(s) may be on build platform 130 for a 3D printer of an ACMW system such that the part(s) can be moved from a previous module, e.g., a 3D printer, into the vapor smoothing module without need to manipulate the printed part(s) directly. It is known that an elevated build plate temperature can help parts stay adhered to the build plate, which is advantageous for movement of parts for vapor smoothing; thus, in some embodiments, the thermally controlled end effector described above may be used to ensure that the part(s) stay adhered to the build platform while they relocate from a previous module into the vapor smoothing module. That is, substantially continuous heating of the build platform can be provided during such transition. At the time of this disclosure, methods or apparatuses for moving a 3D printed part into a vapor smoothing module automatically and/or for moving a 3D printed part to counteract the degrading effects of gravity during vapor smoothing are not known.

In some embodiments, the ACMW system may include a laser etching module or CNC engraving module to add markings to printed parts. In certain embodiments, identification data may be communicated from the computing module 180 to the etching or engraving module so that such identification can be recorded on the part, e.g., for tracking.

In some embodiments, the ACMW system may include a CNC module that can perform other operations on a part, such as, for example, machining or lathing. This may include adjusting the dimension(s) of a part to enhance tolerances, tapping a hole to add threads, or another machining operation.

In some embodiments, the ACMW system may include an automated painting station, which may include an automated CNC controlled paint application module and/or powder coating module. Optionally the painting station may apply one or more priming layers before adding one or more layers of paint or powder. In some embodiments, the painting station may include one or more inkjet print heads to apply high resolution ink detail to the surface of a part.

In some embodiments, the ACMW system may include an automated plating station that is capable of adding a metallic coating to a part.

In some embodiments, the ACMW system may include an ultraviolet (UV) curing station for curing parts.

In some embodiments, the ACMW system may include an injection molding system capable of producing injection molded parts from molds 3D printed by the AM system or from molds installed onto the system.

In some embodiments, the ACMW system may include an automated assembly system capable of assembling printed parts with other printed parts or with other pre-loaded components. In some embodiments, the assembly system may include a pick-and-place system. In some embodiments, the assembly system may be capable of installing prefabricated components such as, for example, printed circuit boards, mechanical fasteners, mechanical components such as springs, or any other useful components. In some embodiments, the assembly system may include a printed circuit board assembly module capable of fabricating printed circuit boards locally. In some embodiments, the assembly system may include a sewing or knitting machine that capable of attaching printed parts to other objects such as fabrics, clothing, or other accessories. In some embodiments, the assembly system may include a heat and/or pressure press capable of attaching a printed part to another object. In some embodiments, the assembly system is capable of packaging parts into packaging material such as boxes, padded or bubble wrap mailing envelopes, or the like. The assembly system may be able to apply shipping information a package such that it can be directly passed into a mail system.

Inspection Systems

In some embodiments, the ACMW system may include any of a variety of inspection systems. Given that certain 3D printing processes exhibit inherent variability, it is useful for ACMW technology to include quality control and quality assurance processes and systems. The ability to inspect various parameters of printed parts, whether destructively and/or non-destructively, allows production of more consistent and valuable goods.

In some embodiments, the ACMW system may include a sensitive scale configured to measure the weight of one or more parts that have been printed and to communicate this information to the computing module 180. The computing module can then compare this weight to the expected weight in order to draw conclusions. For example, if a part is supposed to weigh 10 g but it only weighs 8 g, the part may be deemed not fit as it can be concluded that some material must be missing from the part.

In some embodiments, the ACMW system may include a coordinate measuring machine (CMM) or sensitive 3D scanner in order to inspect the geometry of a printed part. The system may include means for moving the part so that multiple sides of the part can be inspected. The means for moving may move the part along multiple axes. The means for moving may be, for example, a turntable. In certain embodiments, the 3D scanner may employ a measurement system capable of measuring inside a part, such as an ultrasound or x-ray scanner, in order to non-destructively inspect internal geometry.

In some embodiments, the ACMW system may include a photo station with one or more high resolution cameras in order to capture photo or video data of the printed parts.

In some embodiments, the ACMW system may include one or more systems for inspecting and testing mechanical properties. For example, the ACMW system may include one or more of a surface hardness tester, a compression tester, a tensile tester, an impact strength tester, a heat deflection tester, or any other mechanical testing apparatus. For the example of the tensile tester, this may be a uniaxial tensile tester capable of applying a tensile load to a sample and measuring stress and strain as the part is deformed. A test sample may be printed alongside a primary part allowing the test sample to be tested destructively thereby providing results to be logged for the primary part.

In some embodiments, the scale, CMM, scanner, tensile tester, or any of the other modules may require a sorting system in order to ensure that only one part is being measured at a time. In certain embodiments, the sorting system may employ a robotic actuator and a vision system to identify a part and to position it at a measuring area. For example, the robotic actuator may place a sample into a tensile tester or it may position a sample on a scale.

The data from the inspection systems is received by the computing module 180 and can be stored in a database to create a digital thread for given printed part. In some embodiments, the controller 180 will compare the inspected data to the expected data and may draw conclusions based on user-defined instructions. For example, if the user defines a minimum surface hardness and the part is found to not meet this requirement, the ACMW system may notify the user. In another example, if the user defines a surface roughness criterion and the data from the photo station shows that the part does not meet this criterion, the system may send the part back to repeat a post-processing step or may scrap the part. If the part is discarded, re-printing of the part will be added to a production queue.

Pre-Processing

The ACMW system may include any of a variety of pre-printing set up systems. In some embodiments, the ACMW system may have a build platform pre-processing station controlled by the controller 180. This station may be equipped with one or more feedstocks of build platform surface material for application to build platforms. For example, the station may have a roll of PEI sheet with adhesive and the ability to cut the sheet to an appropriate size and apply it to a build platform. The station may be equipped with one or more spray nozzles to clean build platform surfaces. For example, the nozzle(s) may spray a pressurized jet of isopropyl alcohol, water, or another material in order to clear any debris, used interface material, or oils from a build surface, since these can cause printing issues. The station may be equipped with a drying system that uses warm air and/or a cloth-like medium to dry build platforms. Then, optionally, one or more nozzles could spray an interface layer material onto the build platform such as, for example, PVA glue or a commercially available adhesive such as 3D Gloop or Magigoo. The station may further dry the interface layer using temperature-controlled air, curing lamps, or the like. Such a build platform pre-processing station could prepare build platforms rapidly and in an automated way, permitting rapid recycling of build platforms and stock availability so as not to limit printing capacity. Build platforms may be processed for use directly in a print or may be processed to build up inventory of build platforms ready to be used for configuration of printers based on upcoming prints.

It should be noted that, although the above modules have been described above as if they were external to the 3D printer (e.g., at location 101), these modules and their operations could alternatively be located and operate in whole or in part inside of a 3D printer. Also, these operations may take place in isolation or in combination; that is, two or more operations may be integrated into a single station or module of an ACMW system.

Multi-Input, Multi-Output System

Figure 4:
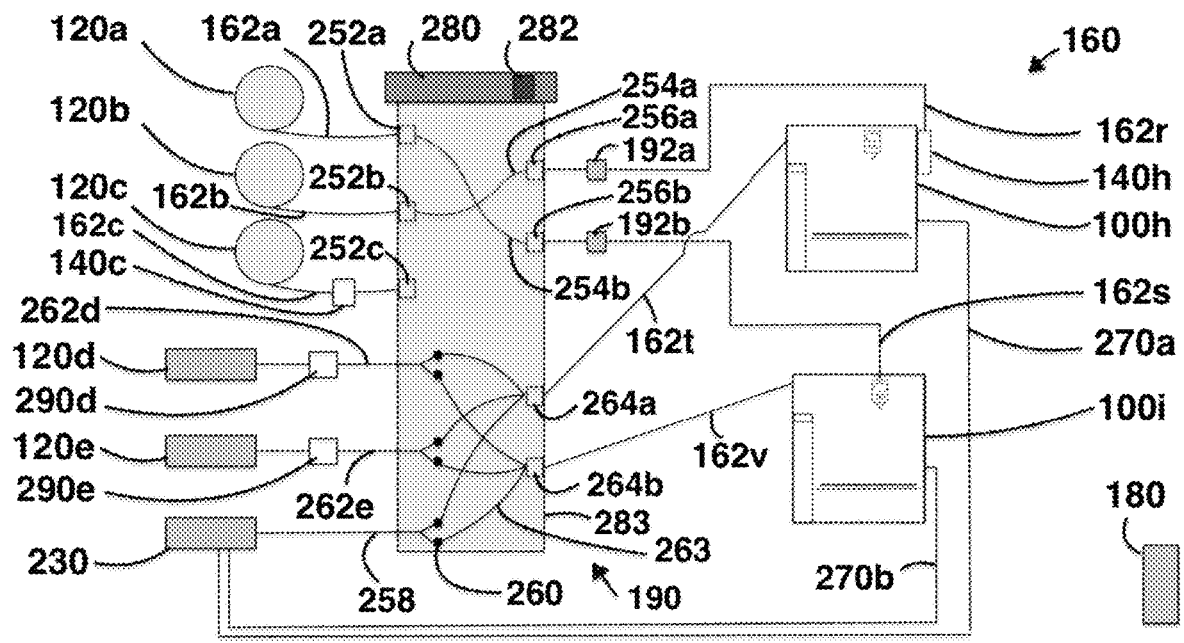
FIG. 4 shows an example multi-input, multi output system (MIMOS) that can move air, filament, and pellet as a part of an ACMW system.

As mentioned previously, an alternative to the robotic system 200 for the configuration of certain modules is the multi-input, multi-output system (MIMOS) 190. FIG. 4 shows an example MIMOS that moves air, filament, and pellet as a part of an ACMW system.

In some embodiments, medium that is moved by the MIMOS can include feedstock in the form of filament, feedstock in the form of powder, feedstock in the form of granules or pellets, or feedstock in the form of liquid, as well as compressed air, other gasses, liquids, pressurized warm air, pressurized cold air, pressurized clean air, pressurized contaminated air or the like. In some embodiments, the MIMOS can provide automatic switching of a single feedstock material between two or more printers. In some embodiments, the MIMOS can provide automatic switching between two or more print heads or extruders, which may or may not be in the same printer. That is, in an example (not shown), the MIMOS 190 can feed feedstock from a single source in the bank of feedstock 120 to a first extruder of a 3D printer 100 and then can automatically pass the same feedstock to a different extruder where the first and second extruders may be in the same 3D printer 100 or may be in different 3D printers. The first and second extruders may have the same or different extrusion nozzle diameters. In an example, a single 3D printer may have two extruders, a first extruder with a large extrusion nozzle and a second extruder with a significantly smaller extrusion nozzle. It may be convenient to print some of a part very quickly with a selected feedstock using the first extruder, and then to automatically switch the same feedstock to the second extruder and print some fine detail. Such sharing as provided by MIMOS can be valuable. The example depicted in FIG. 4 focusses on the use of MIMOS 190 to share feedstock between different 3D printers 100h, 100i but it is to be understood that this example does not limit the invention to sharing between different printers.

At the time of this disclosure, automatic switching of a single feedstock material between two or more different printers, print heads, or extruders is not known. To clarify a distinction between MIMOS and SEME, SEME is able to accept multiple inputs and feed them in the form of a multimaterial feedstock to a single printer, print head, or extruder, whereas MIMOS is able to accept one or more inputs and feed to different printers, print heads, or extruders that may be in different locations. MIMOS permits sharing of resources between different printers, print heads, and extruders, while SEME permits sharing of resources by a single printer, print head, or extruder. The capability of MIMOS to provide sharing of resources between different printers, print heads, and extruders permits automated configuration of 3D printers based on a common bank of modules.

Referring to the example of FIG. 4, three feedstock sources 120a, 120b, 120c have feedstock in the form of filament that moves along respective feedstock paths 162a, 162b, 162c and passes into inlet ports 252a, 252b, 252c respectively of the MIMOS 190, which is controlled by controller 180. The MIMOS has casing 283 and also includes outlet ports 256a, 256b.

Filament exiting outlet port 256a moves to printer 100h along feed path 162r, passing through optional cutter 192a (see discussion of cutting below) and through optional SEME module 140h. Filament exiting outlet port 256b passes through optional cutter 192b, then moves to printer 100i along feed path 162s. Inputs 252a, 252b, 252c can be selectively connected to outputs 256a, 256b along path linkages 254, 254b by linkage robot 280 and its end effector 282. Conveniently, feed paths 162 and path linkages 254 may be made of low friction material such as, for example, polytetrafluoroethylene (PTFE) tubing, in order to constrain the filament 120 and have minimal friction even over a relatively long path. In order for the MIMOS 190 to connect feedstock 120a to printer 100i, the linkage robot 280 would use its end effector 282 to operatively connect a first end of the path linkage 254b with the inlet port 252a, and to operatively connect a second end of the path linkage 254b with the outlet port 256b, such that feedstock can move into the MIMOS at inlet port 252a, along the path linkage 254b, and out of the MIMOS at outlet port 256b. In some embodiments, the linkage robot 280 may place the first end of path linkage 254b in a receptacle (not shown) of the inlet port 252a, and place the second end of the path linkage 254b in a receptacle (not shown) of the outlet port 256b, creating a path connecting feedstock source 120a to printer 100i via feed paths 162a,162s. The linkage robot 280 may include any convenient electromechanical system for configuring path linkages between inlet ports 252 and outlet ports 256, such as, for example, a pick-and-place system. In another example, a motor driven carousel such as those used for tool changing in CNC mill applications can be used to configure path linkages. Although three feedstock sources 120a, 120b, 120c are being discussed in this section of this example, it is understood that the MIMOS is able to link any of one or more feedstock inputs to any of one or more outputs.

Actuation of the feedstock can be provided by any of a variety of convenient feedstock actuators. For example, the MIMOS 190 can include one or more feedstock drive modules (not shown) at the input ports 252, along the path linkages 254, or at the outlet ports 256. Drive motors of the SEME modules 140 or drive modules of the 3D printers 100, or of the print heads 110 may also be used to move feedstock. The feedstock 120 may conveniently be contained in a material pod 300 (discussed below and exemplified in FIGS. 5A-5B) that can be used to push and pull filament into and out of the MIMOS 190.

In some embodiments, one or more SEME modules 140c may be connected upstream of an input(s) of the MIMOS 190, as is shown between feedstock source 120c and input port 252c. This does not mean that the input to the MIMOS at inlet port 252c is necessarily multimaterial feedstock. In some instances, the SEME module 140c may select a feedstock from one of its own multiple inputs, particularly if the MIMOS does not have a sufficient number of input ports for all of the feedstocks in use, and pass selected feedstock on the MIMOS. For example, if the SEME module 140c receives feedstock from 10 feedstock sources (not shown), it may be preferred to select from these feedstocks using the SEME module before passing the selected feedstock into the MIMOS 190, which in this example only has three input ports.

The output of the MIMOS may feed directly to a print head 110 or a printer 100 (see feed path 162s) or it may first pass through a SEME module 140h (see feed path 162r). In FIG. 4, only one feed path 162r from the MIMOS 190 is shown entering the SEME module 140h. However, the SEME module 140c may have multiple inputs (not shown), such multiple inputs being from the MIMOS 190, directly from a feedstock source (not shown), or from a combination of both (not shown). Accordingly, the SEME module may create multicomponent feedstock that is fed into the 3D printer 100h. Spacing the SEME module 140h not far apart from the print head of the 3D printer 100h may enhance printing performance.

The ACMW system may optionally include one or more cutter modules 192a, 192b configured to cut feedstock received from the MIMOS, separating the feedstock into portions. The cutter can work with the MIMOS to apportion and feed specific amounts of feedstock according to what is needed by the 3D printer for a given 3D print. It should be understood that cutting may be performed by a separate cutter module 192 as shown, or alternatively a SEME module 140 may include a cutter component that is used for this operation. It should also be understood that other components of a SEME module, such as, for example, a feedstock monitor or feedstock sensor, may also be usefully be employed and controlled by the controller 180 in cooperation with the MIMOS.

Here is an example of cooperation between the MIMOS and cutter. If the printer 100h requires 2000 mm of filament from the feedstock source 120b, the MIMOS 190 can feed this feedstock to printer 100h. Once 2000 mm of the feedstock has passed to the cutter module 192a, the cutter 192a can cut the feedstock. The MIMOS 190 can then retract the extra feedstock back to the inlet port 252b under the control of the controller 180, thereby evacuating the path linkage 254a so that it can be used to form another connection. The 2000 mm of feedstock can continue to be pulled by printer 100h while the MIMOS prepares the next material under the control of controller 180.

In some instances, the portion of feedstock that is created by the cutter is too short to reach the printer, be engaged by the printer, and pulled. In such cases, the MIMOS can push the short portion with the feedstock portion from which the short portion was cut (or with another feedstock). The "pusher feedstock" can push the short portion toward the printer 100h until it is engaged and then can retract the pusher feedstock. This approach of cutting feedstock to form portions and then optionally using feedstock to push the portion(s) to the 3D printer permits the MIMOS to provide the 3D printer with specified amounts of feedstock. Accordingly, the same feedstock source can be shared between printers, print heads, or extruders. In contrast, without ability to cut and retract feedstocks, a selected feedstock might be connected to a single printer, print head, or extruder during the entire duration of printing. For example, feedstock 120b might be connected to printer 100h or SEME module 140h during the entire duration that printer 100h is printing with this feedstock. This would limit the feedstock 120b from being usefully employed elsewhere in the system.

The MIMOS may be configured to process feedstock considerably faster than the printers 100 can consume it and, accordingly, the MIMOS can feed multiple printers from the same feedstock source. For example, if two printers 100h, 100i both need the same feedstock 120a concurrently, the MIMOS can rapidly feed 1000 mm to printer 100h in for example 20 seconds, whereas it may take the printer 200 seconds to consume the 1000 mm of feedstock. In this time the MIMOS can feed 1000 mm of feedstock 120a to printer 100i. The MIMOS can continue going back and forth feeding more feedstock to each printer faster than it can consume it. In some embodiments, a SEME module at each printer (not shown at printer 100i) may splice together the feedstock such that it is a continuous piece of material as it enters into the printer head of the 3D printer 100. As described previously, there is significant advantage regarding the density and flexibility of the AM system with the sharing of feedstock between printers.

Although the SEME modules 140c, 140h and the cutter modules 192a, 192b are shown outside of the MIMOS in the example of FIG. 4, it is to be understood that the modules of the system can be configured inside the MIMOS 190 and in any order. The drawing does not limit the disclosure and is simply meant to help exemplify a specific embodiment according to the invention.

Not shown in FIG. 4 is are splitters or diverters, which may be included in MIMOS 190, for example, near inlet ports 252a, 252b, to direct movement of filament feedstock, e.g. to outlet ports 256a, 256b. Such splitters or diverters may be similar to valves 260 that direct movement of pellet feedstock, as further described herein.

Shown in the lower left portion of FIG. 4 are two granulated pellet feedstock sources 120d, 120e. Pellet feedstock is fed into conditioning modules 290d, 290e and then passes into the MIMOS 190 through respective ingoing feed paths 262d, 262e. Inside the MIMOS the ingoing paths 262d, 262e are each split into two internal paths 263 with respective valves 260 (depicted by small black circles), each internal path 263 leading to one of the combiner outlets 264a, 264b. The valves 260 work to control the flow between ingoing feed paths 262 and the four internal paths 263 that lead to the combiner outlets 264a, 264b. Material exiting the combiner outlets 264a, 264b moves along feed paths 162t, 162v to printers 100h, 100i, respectively.

The valves 260 may be electromechanical valves controlled by the controller 180 of the ACMW system. The valves may have sensors (not shown) such as, for example, a flow sensor, a temperature sensor, or the like, in order to communicate information back to the controller 180. The sensor(s) can be used to form a closed loop feedback system with the controller 180 to control the valves 260 or other parts of the system. For example, a valve position may be controlled by the controller 180 in response to the flow rate measured by an internal flow sensor, in order to achieve a desired flow rate. The valves 260 can be selectively controlled by the controller 180 to control the flow of feedstocks such that no flow, partial flow, or full flow from any one may occur at any point in time, the flow entering the combiner outlets 264a, 264b. For example, the controller 180 may control the valves that receive ingoing paths 262d, 262e such that material from feedstock source 120d is shut off while material from feedstock 120e is able to flow to combiner outlet 264a, and this material feeds 3D printer 100h. In another example, the controller 180 may control the valves leading from ingoing paths 262d, 262e to combiner outlet 264a such that only feedstock 120d is fully open while feedstock 120e is shut off. In this case, the MIMOS would be connecting feedstock 120d to 3D printer 100h. In another example, the controller 180 may control the valves leading from ingoing paths 262d, 262e to combiner outlet 264a such that feedstock 120d is 50% shut off and feedstock 120e is also 50% shut off. In this case, the MIMOS would be connecting the flow of both feedstocks 120d, 120e to 3D printer 100h. The combiner outlets 264a, 264b can be configured to mix feedstocks passing through. For example, the combiner outlet 264 can include complex internal paths with flow agitating features that cause materials to mix. In another example, the inside of the combiner outlet 264 may include a motor-driven mixing actuator such as an auger to provide increased mixing. The three examples just described for selectively connecting either feedstock 120d, 120e, or a mixture of both to 3D printer 100h can equivalently be achieved using the valves 260 that connect ingoing paths 262d, 262e to combiner outlet 264b through internal paths 263. Also, both can happen concurrently such that material from input feedstocks 120d, 120e are being shared by both combiner outlets 264a, 264b and by both 3D printers 100h, 100i at the same time. It can thus be seen that the MIMOS 190 can provide sharing of feedstock sources 120d, 120e to both 3D printers 100h, 100i and can also deliver more than one feedstock concurrently to each 3D printer with controlled mixing.

It should be understood that although FIG. 4 shows the connections of feedstock sources 120d, 120e as fixed, valve-controlled paths 263 to combiner outlets 264, this is just an example. In other embodiments, the connections could alternatively be provided by movable, robot-controlled path linkages as was described above for feedstocks 120a, 120b, 120c.

The conditioning modules 290 can include any of a variety of functionalities for the conditioning and/or feeding of feedstock. For example, the conditioning module can include an active dryer that dries feedstock as it passes through it. In some embodiments, feedstock sources 120 may be contained inside such a dryer such that the feedstock source 120 and the conditioning module 290 are combined or integrated. In some embodiments, the conditioning module can include a feeding system that uses pneumatics to pull feedstock or to push feedstock. In the example of FIG. 4, the conditioning module 290d may use pressurized air to push feedstock 120d into the MIMOS 190 towards 3D printers 100h and 100i. In some embodiments, the conditioning modules 290 can include an internal system for adding colorant or other inputs to the feedstock material. This system may for example use a gravimetric feeder controlled by the controller 180. The ability to automatically add additives into the feedstock under the control of the controller 180 permits the system to configure the feedstock based on the specified printing needs of 3D printers 100. The ability to automatically add colorant or other additives at a conditioning module 290 can reduced the number of feedstock sources needed by the system, as opposed to storing feedstock sources with pre-applied additives. Controller-defined combinations of additives and different feedstocks can be mixed and selectively passed to selected 3D printers 100 by the MIMOS.

While the above discussion involves two feedstock sources and two 3D printers 100 it should be understood that this system can work for one or more inputs and one or more outputs. In the depicted example, using the MIMOS 190, two feedstock sources 120d, 120e and only two conditioning modules 290d, 290e are shared between the two 3D printers 100h, 100i. That is, both materials can be connected to both printers. In contrast, without the MIMOS 190, each printer would require its own set of feedstock sources and its own conditioning modules, effectively doubling the number of feedstock sources and conditioning modules needed.

Here is another example: A production objective initially requires one part to be printed containing a volumetric blend of 49% polycarbonate (PC), 49% acrylonitrile butadiene styrene (ABS) with 2% chopped glass fibers by volume density and wherein the color of the material is red. The controller 180 will control a first feedstock from a feedstock source of PC in the form of pellets to pass through a conditioning module 290 that will dry the first feedstock and add in chopped glass fibers in a proportion defined by user input using a gravimetric feeder and controlled by the controller 180. A second feedstock from a feedstock source of ABS in the form of pellets will pass through a second conditioning module 290 that will dry the second feedstock and add in red colorant in a proportion defined by user input using a second gravimetric feeder and controlled by controller 180. Both conditioning modules 290 will feed their respective materials to inputs of the MIMOS 190. The MIMOS 190 will then control valves 260 so that inputs from both the PC and ABS feedstocks will mix in a combiner outlet 264 that leads to one or more 3D printers configured to print with this mixture of pellets and additives. Flow sensors in valves 260 may provide information to the controller 180 that controls actuation of the valves in order to provide the desired volumetric mixture of PC and ABS with the additives. It can be seen in this example that two discrete feedstock sources are able to be mixed together in digitally defined proportions and have additives mixed in to automatically configure a custom material blend.

FIG. 4 also shows air source 230 connected to the MIMOS 190 by input path 258, which is then split to internal paths 263 to combiner outlets 264a, 264b. The internal paths 263 have respective valves 260, shown as black dots. After exiting the combiner outlets 264a, 264b, the air travels along paths 162t, 162v to printers 100h, 100i, respectively. Optionally, the air is returned to air source 230 by respective return paths 270a, 270b. In some embodiments, the air source 230 may be a compressed air source used to power parts of the ACMW system, e.g., parts of the printers 100h, 100i. By using a single compressed air source and valves to distribute the air, the system can use and share a single compressor, providing reliability, density, and cost benefits to the system instead of needing more than one compressor.

In some embodiments, the air source 230 may include an air conditioning unit for filtering the air, controlling the temperature of the air, or a combination of both. In some embodiments, the path 258 from air source 230 can include two internal channels (not shown) respectively connecting a hot air outlet and a cold air outlet of air source 230 along path 258 to the valves 260. The valves 260 can provide a computer-controlled mixture of air to flow to combiner outlets 264a, 264b. The combiner outlets can provide mixing of the air using passive or active methods as was described previously for feedstock mixing. Although FIG. 4 shows this section of the MIMOS for conditioning air from air source 230 as sharing the same combiner outlets 264a, 264b as are used for combining and mixing feedstocks 120d, 120e, these need not be the same. In some embodiments, it may be convenient or desirable for feedstock and air to share outlet(s) and path(s) from the MIMOS to the 3D printer(s) 100; in other embodiments, it may be convenient or desirable for them to have separate paths.

In some embodiments, air temperature sensors at the valves 260 or along the feed paths 162 to the 3D printers 100 can communicate in closed loop with the controller 180 to control the valves to maintain selected air temperature(s) at the printers. The air being fed to the printer can be controlled independently and thus the two printers could operate at different inside temperatures, as desired.

If in some embodiments the system 230 acts as an exhaust to pull fumes from the printer(s), the air coming out will need to be replaced with other air. If the replacement air is air from outside of the printer that is at room temperature, this could cause the printer to cool down inside at a rate faster than the printer or the air from the MIMOS can heat the new air. This could also cause inefficient use of energy as new air is constantly being heated as hot air is exhausted. By feeding exhausted air along the path 270 to the air conditioning unit 230 and back to the printers 100, energy is able to be saved, as the air returning will still retain much of its thermal energy. Some losses will be incurred along the air travel path but this can be minimized with thermal insulation along these paths. One can imagine a problem with this if, for example, one printer has an internal air temperature of its heated chamber of 100 degrees Celsius while the other printer has an internal chamber temperature of only 50 degrees Celsius, and the air from both mixes at air source 230 and is then fed back to the printers 100. In this imaginary example, the returned air may be at a temperature somewhere between 50 degrees Celsius and 100 degrees Celsius, which would be too hot for the 50 degrees Celsius printer and too cold for the 100 degrees Celsius printer. This would cause a problem that would make the sharing of an air conditioning unit not workable across multiple printers unless they are operating with identical build chamber temperatures. However, with the MIMOS system and ACMW technology, this problem can be overcome: A closed air system can be provided to reuse exhaust air but with the ability to controllably mix the hot and cold outputs of the air source 230 so as to independently control the temperature of the air entering each printer 100h and 100i. In certain embodiments, the air source 230 may take in fresh ambient air to act as a source of cold air if the returned air from return path 270 is too warm to provide the desired temperature for each printer after mixing in the MIMOS. Just as was the case with the feedstocks 120a-120e, the ability to share an air processing unit across two or more printers provides reliability, density, and cost benefits to the system, by obviating a need for independent printing systems, each with all modules.

Material Pod

It can be seen in FIG. 3 and FIG. 4 that in certain embodiments, the path from the MIMOS to the furthest printer in the ACMW system can be relatively long. Unlike in the conventional system of FIG. 1 where each printer 100 has feedstock 120 nearby, the ACMW system's sharing of feedstock can mean that printer(s) and feedstock source(s) are further away from each other.

As described above, there are instances in certain ACMW processes wherein a filament will need to be pushed most of the path from the MIMOS to the printer, such as, for example, when a short piece of filament is pushed to the printer using a "pusher" filament. This pusher filament may then need to be retracted most of the path length. Similar long retraction can occur in certain SEME processes. It has been observed that long retractions onto a spool or other source of feedstock can lead to problems, as the filament may become loose and this can lead to tangles. A tangle in the filament may cause catastrophic printer failure or system damage and thus is to be avoided.

Another possible consequence of retracting filament back into a feedstock source is that lack of constraint of the filament may cause it to travel along certain paths that put stress on the filament causing it to snap or be deformed. Another consequence of a long path from a feedstock source 120 to a printer 100 is that the resistance of the feedstock along such path can become large, putting strain on the modules of the AM system, such as but not limited to a SEME module, a print head, etc. If the force exceeds a safe level it can cause damage to the system or can cause catastrophic print failure. Additionally, if the resistance of the feedstock varies over time this can cause inconsistent printing performance. For example, when there is a large resistance on the feedstock, the system may under-extrude, and vice versa if there is little resistance on the feedstock. In order to overcome these issues caused by long retractions, a material pod (e.g., a feedstock container) has been invented as will be described below with reference to FIGS. 5A-5B.

A well-known challenge in 3D printing is that many feedstocks are hygroscopic and absorb moisture, and that the absorption of moisture can cause problems such as, but not limited to, material property changes, brittleness leading to feedstock breaking, poor end part properties, jamming in extruder, poor print quality, etc. Thus, it is desirable to print with dry feedstocks, i.e., feedstocks need to be dried and kept dry for extended periods of time. Given the level of automation of ACMW technology, it is desirable that materials are maintained in a dry condition in order to enhance system reliability and performance.

Figure 5A:
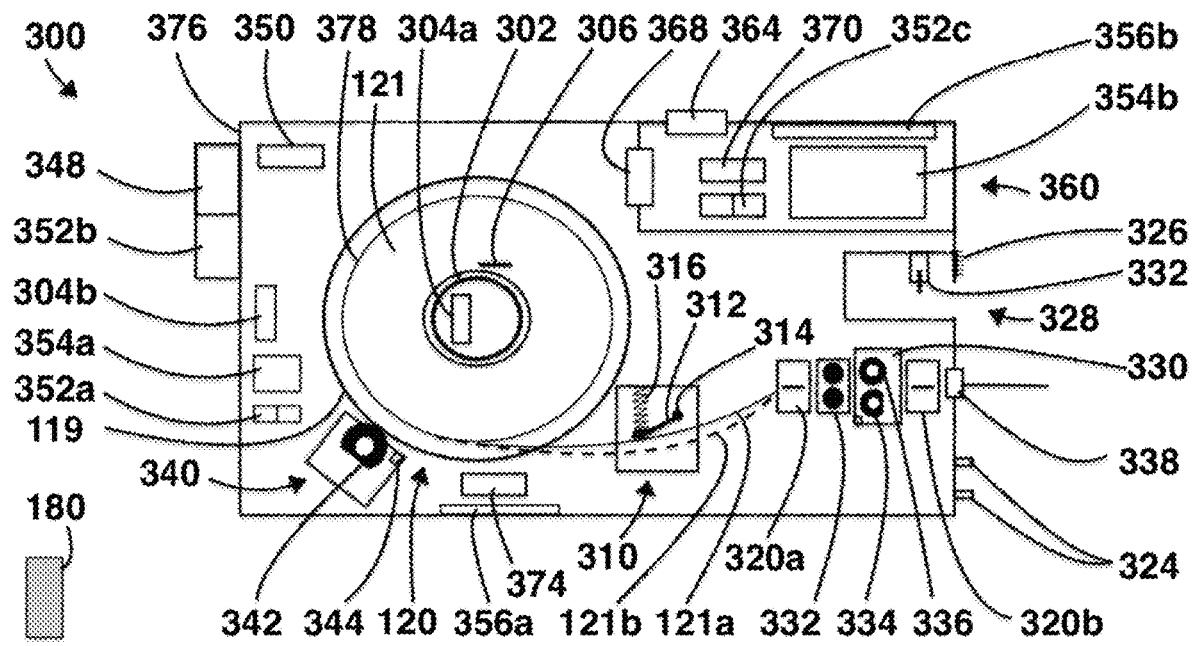
FIGS. 5A and 5B illustrate example feedstock containers for use in an additive manufacturing system.

FIG. 5A shows an example of a material pod 300 for feedstock in filament form. Various embodiments of material pods according to the invention can address one or more of the problems of feedstock tangling, inconsistent or excessive feedstock resistance, and maintaining feedstock conditions. In the embodiment of FIG. 5A, housing 376 contains one spool of feedstock 120; in other embodiments (not shown) the housing 376 may contain one or more feedstock sources. The feedstock 121 comes from the outer diameter 378 of the spooled filament and passes through a tension sensing module 310 configured to measure the tension of the filament on its way to exit port 338. Prior to this disclosure, tension sensing in a feedstock container was not known. In the depicted embodiment, the tension sensing module 310 has a pivoting arm 312 that contacts the filament 121 passing between the outer diameter 378 and filament sensor 320*a*. In this example, the pivoting arm tends to pivot about point 314 in a counter-clockwise direction as the filament moves. When the filament is under tension, it will tend to form a straighter path 121*a* which may cause the pivoting arm 312 to pivot in the opposite direction, i.e., clockwise. The position of the arm 312 may be measured using a sensor such as a potentiometer, an encoder, an optical sensor, a mechanical sensor, or the like (not shown).

In an alternative embodiment not employing a pivoting arm (not shown), the position of the filament may instead be directly measured to determine its path and to deduce from the path the level of tension of the filament. For example, multiple optical sensors (not shown) may be configured in close proximity, where the detection of filament at one or more of the sensors would indicate the position of the feedstock.

A complicating factor is that different types of filament and different sections of filament having different curves in them may produce an unpredictable path. In some cases, the filament would follow path 121*a* when under tension or when under no tension. In order to overcome the variability of a filament's natural path for more reliable tension readings, in some embodiments a spring 316 can be engaged with the pivoting arm 312 to bias the filament away from the tension path 121*a* and to a more curved or longer path 121*b*. In this configuration, the force of the spring deflecting the filament means that the tension on the filament needs to overcome the force of the spring, which can be controlled based on the parameters of the selected spring. This has been found to be highly reliable system for measuring the tension on the filament.

In some embodiments, the tension of the filament may be determined by other means. In some embodiments, a buffer including an expandable constrained passageway, as is described in U.S. Pat. No. 10,870,268 to Debora et al., incorporated herein by reference, may be employed. Since such buffer allows for the length of the constrained passageway to vary, the size of the buffer can be indicative of the degree of tension in the filament. For example, if the expandable buffer is collapsed or collapsing (getting smaller) it can indicate that the filament is under tension, whereas if the buffer size is expanded or expanding, it can indicate that the filament is under compression. A sensor(s) can be used to measure the size of the buffer and/or the change in size of the buffer in order to determine the state of tension of the filament. In some embodiments, a filament monitoring device, such as, but not limited to, a scroll wheel, may be used in combination with a buffer to determine the state of tension in the filament. In some embodiments, the tension of the filament may be measured anywhere along the filament length including inside the material pod 300, or outside of the material pod 300 along the feedstock feed path.

Spool rotating system 340 includes a motor (not shown) having a drive wheel 342 that can be configured to engage with the spool of feedstock 120. The spool rotating system 340 can be usefully employed to rotate the spool so as to wind filament onto it (e.g., when the filament has been retracted) and to rotate the spool for filament to unwind from it. In some embodiments, the drive wheel 342 of the spool rotating system 340 can engage with the outer rim 119 of the end cap of the spool, such that when the drive wheel 342 rotates, the rim 119 meshes with it and also rotates. In other embodiments, the spool rotating system 340 can engage with another feature of the feedstock spool 120, such as, for example, the inner core. Alternatively, the spool rotating system 340 can engage with the feedstock spool through a gear, belt, a chain, or through another component(s) that may be attached to or in contact with the feedstock spool 120. The spool rotating system 340 is able to cause the spool to rotate due to its control by controller 180. A computer controlled automated spool rotating system capable of rotating the spool body (i.e., by rotating the spool body and not by pulling the filament) was not previously known. A computer controlled automated spool rotating system capable of rotating the spool to wind filament onto it was not previously known.

The casing 376 of the material pod 300 may contain one or more bearings 302 to permit smooth motion of the spool and to ensure consistent location of the spool, thereby allowing reliable meshing between the feedstock spool 120 and the spool rotating system 340. In certain embodiments, the drive wheel 342 may be a gear, such as an involute spur gear, a helical gear, or the like. The rim 119 or other selected mating feature of the feedstock spool 120 can have a similar gear profile configured to mesh with the geared drive wheel 342, such that when the drive wheel 342 spins, the spool spins. In some embodiments of a geared system, the gears may be made from a low wear material such as polyamide or polyoxymethylene (POM). In a meshing system relying on friction, the drive wheel may be made of or contain an elastomeric material such as for example rubber, or a comparatively soft material such as for example thermoplastic urethane, in order to maintain sufficient engagement with the spool and to overcome potential eccentricity in motor or spool rotation.

Situations can exist where it would be useful for the feedstock spool 120 to be able to disengage from the spool rotating system 340. For example, the spool rotating system 340 may cause resistance to filament being pulled off of the spool by other modules (e.g., a printer or a SEME module). This may cause system performance issues or may require other motors of the AM system to be higher power (and thus more expensive) in order to overcome such resistance. For example, the spool 120 may need to spin faster than the motor in the spool rotating system 340 can spin; thus, disengaging the spool rotating system from the spool would eliminate limitations imposed by the spool rotating system on how fast material can be pulled off of the spool. During the lifetime of the material pod 300, the spool may spin millions of times. This could cause undue wear to the spool rotating system 340, if it were not possible to disengage it from the spool, as it does not ordinarily need to be engaged with the spool when material is being pulled off the spool.

In some embodiments, an actuator (not shown) may be employed to disengage the spool rotating system from the spool. However, including an actuator in the system would increase the cost, complexity, and weight of the system. In other embodiments, this is avoided by employing a drive wheel 342 that has one or more facets on it. FIG. 5A shows the drive wheel 342 having a single facet on its bottom left side, hereafter referred to as a D-shaped wheel profile. As shown, the flat side of the D-shaped wheel profile is 180 degrees away from the spool. If the drive wheel 342 rotated 180 degrees, the flat side would face the spool and would not make contact with it, putting the drive wheel 342 in an inactive position. This approach allows the drive wheel 342 to disengage from the spool by simply turning into this disengaged position. This is a simpler solution than requiring one or more actuators or manual intervention to disengage the spool rotating system 340. As the D-shaped wheel profile rotates, it will engage the spool 120 for a portion of the circumference of the wheel, and then will disengage for a portion. If the drive wheel 342 rotates continuously, it may rotate the spool 120 discontinuously with momentary pauses in driving when the flat side faces the spool, although momentum may cause the spool to continue to spin. In some embodiments, a homing sensor 344 may be included in the spool rotating system 340 to determine the orientation of the drive wheel 342 (i.e., the angular orientation of the flat side of the D-shaped wheel profile). The homing sensor 344 can send information to the controller 180 so it can control between the two states of active/engaged and inactive/disengaged. Although a D-shaped wheel profile is shown, it should be understood that other profiles could achieve the same function. For example, the drive wheel may have two opposing facets (not shown), creating two disengagement points. In another example, the drive wheel may have one or more points where the distance to the surface of the wheel is smaller than the distance to the spool it engages, thereby creating the disengaged state. An automatic spool rotating system capable of engaging in contact and disengaging in contact with a spool was not known prior to this disclosure.

Filament 121 passes from the feedstock spool 120 through the tension sensing module 310, then travels to the material drive module 330 before exiting the material pod 300 at exit 338, which may have an exit seal (discussed below). The drive module 330 can include a motorized drive wheel 334 and an idler roller 336. The drive wheel may have teeth to engage the filament, e.g., can be a drive gear. In some embodiments (not shown), the idler roller can be replaced by a motorized drive wheel or gear. The drive module 330 is configured to actuate filament along a drive channel. The drive module may be used to pull filament off of the spool, to push filament out of the material pod 300 and into other parts of the system, or to pull material into the material pod 300 from other parts of the system. The drive module 330 can automate the loading and unloading of filament from an AM system, which, as discussed above, can save operator time, increase system uptime, and reduce the TCPP for the system. In some embodiments, the drive wheel 334 has a D-shaped profile, as is shown in FIG. 5A. This drive wheel profile permits the drive module 330 to selectively engage/activate and disengage/deactivate the drive module from the feedstock. When the drive module disengages, it allows filament to slide past it with minimal resistance. This may be useful for a number reasons, one of which is to simplify the coordinated control of filament movement by the material pod and any other systems with which it is being used, such as, for example, a SEME module or a print head 110. If, for example, filament was engaged with both a drive motor or extruder motor of a print head 110 and the drive module 330, then both drive systems would need to move the filament at the exact same rate, which is nearly impossible to achieve; otherwise, they would cause the filament to be under compression or tension which could cause system damage, adverse printing performance, damage to the feedstock, etc. The ability for the drive wheel 334 to disengage from the filament means that in this example, only the print head 110 would engage the filament simplifying the control requirements and eliminating the risk that the filament could be unintentionally put under tension or compression.

In some embodiments, it is impractical for only the print head 110 to engage the filament, as resistance along the feed path may be too much for the print head to overcome alone. In some embodiments, engagement of the filament with the print head may be conveniently supplemented by engagement of the filament with a drive module, such as, e.g., the drive module 330 of the material pod, with the SEME module, or with the drive module of the material pod and the SEME module. In some embodiments, wherein the drive module 330 remains engaged with the feedstock, an expandable buffer may be used to overcome the issues with synchronization described above wherein the feedstock is also engaged by SEME module or print head 110. For example, the print head 110 can print and, as the buffer becomes smaller, a sensor that measures buffer size can send a signal to a controller instructing the drive module 330 to advance feedstock, thereby increasing the buffer size. In general, the system can coordinate the feeding of feedstock by drive module 330 based on closed loop feedback regarding the tension of the feedstock between the drive module and the print head. This tension may be determined by comparing the amount of feedstock consumed by the print head to the amount of feedstock actuated through the drive module 330, or by other means discussed elsewhere in this application such as, e.g., the use of a feedstock monitor. In an example configuration where the size of a buffer is monitored to provide information on feedstock tension, one advantage is that the print head 110 would only be required to overcome the resistance of the feedstock between the buffer and the print head 110, and the drive module 330 would only be required to overcome the resistance between the drive module 330 and the buffer. Positioning the buffer close to the print head 110 could reduce the resistance on the print head, which could in turn provide greater consistency in printing results. This could also reduce the amount of motor torque required, allowing for a smaller motor to be employed, which could in turn enhance printing performance such as print speed and print quality.

In some embodiments, the material pod may include one or more sensors along the feed path. For example, the material pod of FIG. 5A has filament sensor 320a before the drive module 330 and filament sensor 320b after the drive module 330. These sensors are configured to detect the presence of filament and to communicate this information to the controller 180. It may be useful for the material pod to have both sensors 320a, 320b for a number of reasons. For example, when filament is moving into the material pod 300, whether it is actuated by the internal modules 330 or 340 or by an external driver such as, for example, a SEME module pushing filament backwards, it can be useful to have the filament sensor 320b before the drive wheel 334 to detect the end of the filament before it passes through the drive module 330. When the end of the filament is detected at the sensor 320b, the controller can halt the module moving the filament into the material pod while the filament is at the drive module 330, meaning that the drive module can subsequently be used to move the filament back out of the material pod. It is possible that if the filament was pulled back into the material pod past the drive wheel 334, manual intervention could be needed to reload the filament, i.e., to re-feed it into the drive module 330, which would of course be undesirable. Conveniently, in situations where the drive wheel 334 is in a disengaged state and filament is moving into the material pod 300, having the filament sensor 320b in the depicted position allows it to send information to the controller so that the controller can rotate the drive wheel 334 so as to engage the filament and optionally lock it in place to halt it from retracting all the way.

In embodiments where the filament sensor 320a is present on the other side of the drive module 330, the end of the filament can be detected when filament runs out at the end of a spool and the end passes the sensor 320a. In this case, the controller 180 receives information from the sensor 320a and can initiate a process wherein the material is retracted back into the spool before the drive module 330 loses its ability to engage and actuate the filament. It may be desirable to retract filament back into the material pod when the end of the spool is reached since, if the entire length of that filament is not needed, the filament may end up stuck in a channel between the material pod and another part of the AM system, causing material jams or other issues.

In some embodiments, a scroll wheel 332 can be used to precisely track the movement of filament and communicate information to the controller 180. Motion tracking of feedstock material can allow the controller 180 to keep track of material inventory, to calibrate the 3D printing process, and/or other purposes. In some embodiments (not shown), a scroll wheel can be configured to engage with the spool 120 to track the rotation of the spool. The spool rotation information could be correlated with amount of filament by the controller 180 and this determination used in addition to or in place of direct filament tracking by the scroll wheel 332.

When the tension sensing module 310 and the spool rotating system 340 are used together under control of the controller 180, the system is able to overcome several challenges discussed previously. For example, feedstock being pushed backward was described above as potentially leading to material snapping or tangling, but here spool rotating system can rotate the spool backward to create the desired tension. It has been shown that if the spool is wound so as to maintain tension on the filament then the likelihood of filament tangling can be reduced or eliminated. If the spool rotating motor were simply to rotate indefinitely in an open loop configuration in an attempt to maintain tension, it would likely not rotate at the optimal rate to maintain tension and would likely over-rotate, putting strain on the motor and the filament that could lead to failure, or it would under-rotate, leaving slack that could cause tangling. Accordingly, use of the tension sensing module 310 to close the loop on the spool rotating is preferred. This permits long stretches of filament to be reliably passed to the spool and actively wound onto the spool. A feedback control loop can be controlled by the controller 180, wherein, when the tension sensing module 310 senses tension under a predefined threshold, the spool rotating system 340 will rotate the spool 120 to wind filament onto it to provide tension of the filament until the tension sensing module 310 senses tension at or above the threshold. When the tension sensing module 310 senses tension at or above the threshold, the system will idle and maintain the filament under tension.

When material is being pulled off of the spool, the material pod 300 can be controlled by the controller 180 to go into an idle state wherein the drive wheel 334 of drive module 330 is disengaged/inactive from the filament and similarly the drive wheel 342 is disengaged/inactive from the spool, so that filament can be pulled from the material pod with minimal resistance. Alternatively, the closed loop system described above can be used to push filament out of the material pod by monitoring tension on the filament and unwinding the spool any time that the tension exceeds a predefined threshold. As described above, tension on the filament may be monitored in a variety of ways including by using the tension sensing module 310. Another way is by monitoring the buffer size between the drive module 330 and another drive module such as that in a SEME module, in a print head, or other drive module along the feedstock feed path. By doing so, the material pod 300 would be able to reduce the force required by a module upstream of the filament to pull the filament, allowing filament to travel over longer paths. Similar to how the spool rotating module 340 may include a homing sensor 344 for the D-shaped drive wheel 342, the filament drive module 330 may include a homing sensor (not shown) to sense the orientation of the D-shaped drive wheel 334 such that the controller 180 can orient the drive wheel 334 as is needed.

In some embodiments, the spool rotating system does not employ the mechanism of engaging/disengaging the drive wheel 342 described above and depicted in FIG. 5A. Rather, disengagement between the feedstock source and the drive wheel/motor is achieved by other electromechanical or mechanical approaches. In such embodiments, the drive wheel may or may not have facets.

Figure 5B:
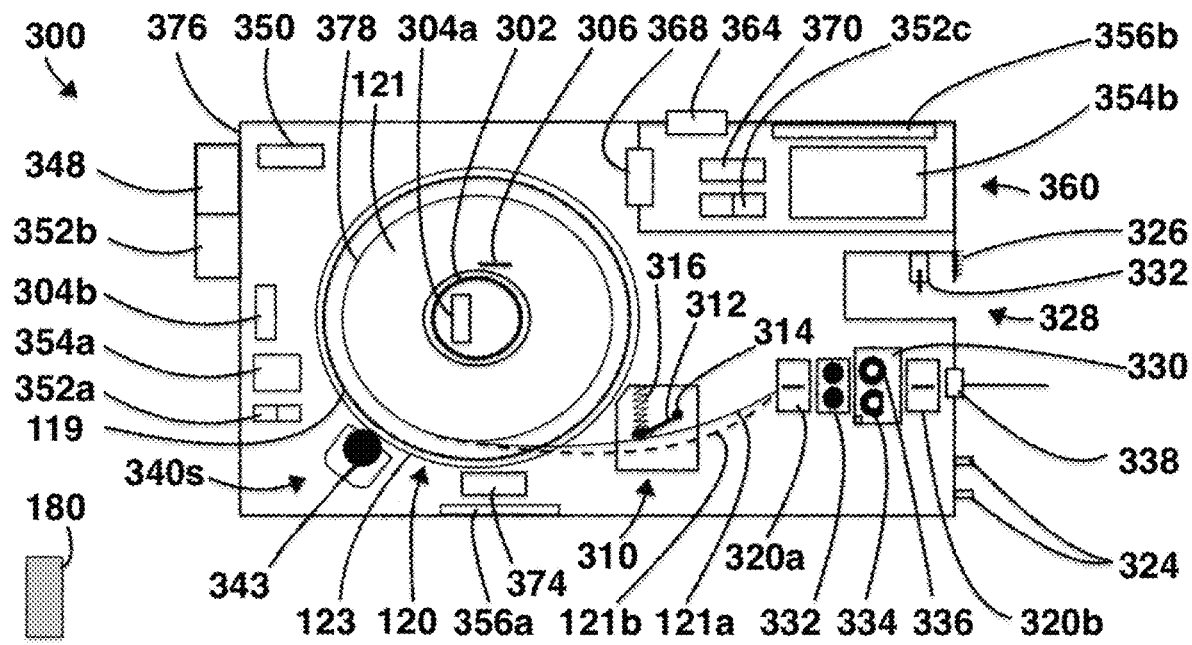

FIG. 5B shows an example material pod (e.g., feedstock container) wherein the spool rotating system 340 of FIG. 5A is replaced by alternative spool rotating system 340s for which disengagement approaches will be described below. The spool rotating system 340s includes a drive wheel for causing rotation of the feedstock spool 120. In FIG. 5B, unfaceted drive wheel 343 is depicted. As was described for spool rotating system 340, the spool rotating system 340s includes a motor (not shown) that drives rotation of the drive wheel under control of the controller 180. The motor may be a geared motor, a servo motor, a stepper motor, or the like.

Drive wheels 342, 343 can either engage directly with the outer rim 119 of the end cap of the spool (shown in FIG. 5A) or with an intermediary object such as a turntable 123 (shown in FIG. 5B) to which the spool 120 is secured or otherwise coupled. Rotation of the turntable 123 by the drive wheel results in rotation of the spool 120. The turntable 123 may comprise a platform mounted to bearings (not shown) to allow smooth rotation within the material pod 300. In embodiments of the spool rotating system (not shown) in which a D-shaped drive wheel 342 engages with turntable 123, the D-shape permits engagement and disengagement from the turntable 123 as was described above in regard to the rim 119 of the end cap of the spool. Conveniently, turntable 123 can be compatible with a wide variety of spools. Conveniently, a turntable may obviate a spool needing to have a certain geometry or dimensions (tolerances) for engaging directly with a drive wheel 342, 343.

A feedstock spool can be placed on a turntable and optionally the spool can be secured to the turntable using any of a variety of means such as, for example, threaded fasteners, hook-and-loop fasteners, a quarter-turn mechanism, strapping, magnets. In some embodiments, the turntable may comprise a mating geometry such as splines, dowel pins, or the like that is compatible with a mating geometry on the spool, allowing them to be easily coupled. In some embodiments, this type of mating system may be employed in combination with a locking mechanism such as, for example, a quarter turn or locking pin, for an easy and reliable way for humans or robots to switch in or switch out spools in the material pod.

In some embodiments, the turntable may be a part of the material pod. A benefit of having the turntable 123 be part of the material pod 300 is that the drive wheel may consistently engage the turntable regardless of whether or not a spool is in place. This means that when a spool is replaced, risk of damage to the drive wheel and/or motor, risk of user error, and/or any reliance on manufacturing tolerances of the spool dimensions can be reduced or eliminated.

Referring again to FIG. 5B, the drive wheel 343 can engage with the turntable 123 using friction, geared teeth, or any other convenient means of transferring force between the two moving components. Disengagement of the drive wheel 343 and the turntable 123 at certain selected times can be achieved by an electromechanical approach, involving operation of the motor. For example, the motor of the spool rotating system 340s may be selected to be a stepper motor, since stepper motors are known to be able to safely and reliably stall (sometimes known as "skipping steps"). Rotation of the drive wheel 343 by a stepper motor will cause the spool 120 to rotate. However, in the situation where filament is being retracted and wound back onto a spool, increased tension of the filament will cause a corresponding reaction torque on the spool. In the situation where this reaction torque exceeds the available torque of the stepper motor, the stepper motor will stall (skip steps). That is, the drive wheel would not be turned the full amount instructed by the controller, effectively being temporarily disengaged. The result achieved would be similar to the drive wheel mechanically slipping relative to the turntable.

Here is an illustrative example: The controller 180 can send instructions to the stepper motor of the spool rotating system 340s to rotate the spool 120 by 10 degrees clockwise. However, in attempting this rotation, the filament 121 in its straighter path 121a can become taut, preventing the spool from spinning the full 10 degrees, and the spool may only be able to spin 5 degrees before the torque of the motor is exceeded. The skipping of the motor would accommodate for this difference between the intended 10 degrees and the realized 5 degrees. This is useful as the motor can safely slip, rather than the filament breaking or the system becoming damaged. In some embodiments, the torque of the motor may be pre-adjusted to ensure that the motor skips at a lower torque than would cause damage in the system, an effective safety mechanism.

In another example of an electromechanical approach to disengagement between the feedstock source and the drive wheel/motor, the controller can stop the operation of the motor (e.g., cut the power) such that no force or negligible force (e.g., friction) is provided to the drive wheel and the motor rotates substantially freely. For example, many stepper motors are capable of spinning substantially freely with low resistance once the power is off. In some embodiments, the torque of the motor may be digitally controlled by the controller 180 to change the available torque. This may be achieved by adjusting the motor current setting on the electronics used to drive the motor. Reducing the torque digitally may provide motor skipping, when needed, at a lower torque. In some embodiments, the torque may be controlled adaptively during the process by controller 180. In such cases where the torque is adaptively lowered, the spool 120 may spin with low resistance without the need for D-shaped drive wheel 342 and associated homing sensor 344. As described elsewhere herein, disengaging of the spooled feedstock is useful in the situation where feedstock is being pulled off a spool, as the rotation of the spooled feedstock is decoupled from the motion of the feedstock. For example, when the print head pulls feedstock out of the material pod 300, the freely spinning spool will accommodate such filament motion and not cause excessive resistance that could damage or negatively affect printer performance.

In some embodiments, disengagement of the drive wheel 343 and the turntable 123 at selected times can be achieved by a mechanical approach, wherein the drive wheel and the turntable slip relative to each other. For example, the drive wheel 343 may be of a material that allows it to slip relative to the surface of the turntable 123 with which it is engaged. The material could be, for example, but is not limited to, rubber, Delrin, Nylon, ABS, or PC. By providing a selected material for the drive wheel 343 as well as controlling the force on the surface of the turntable that the drive wheel contacts, the spool rotating system 340s can rotate the spool 120 until there is a certain amount of resistance, at which point slipping will occur between the drive wheel 343 and the turntable. Of course, it should be recognized that the preceding discussion also pertains to cases in which a turntable is not involved. That is, the material of the drive wheel would be selected for slippage relative to the outer rim of the end cap of a spool, and the force on the spool would be controlled.

In some embodiments, a mechanical approach to achieve slipping (effectively, disengagement of the drive wheel from the feedstock source) may involve a clutch or the slip of a belt connecting the spool rotating motor to the spool 120 or turntable 123.

In some embodiments, the capacity for slipping or disengaging of the spool relative to the drive wheel/motor provides a mechanism for the material pod 300 to maintain tension on the filament. As described elsewhere herein, maintaining tension of the filament when the filament travels into the material pod is desired, since slack in the filament can easily become tangled, which can lead to catastrophic system failure. As also described herein, synchronizing the rotation of the spool to maintain tension on the feedstock involves careful coordination with any other drive modules engaged with the same feedstock (such as, for example, drive module 330 and/or other drive modules along the feedstock feedpath, such as, e.g., within SEME). That can be difficult to achieve. Methods for achieving such synchronization through the use of a tension sensing module 310 or a tension sensing buffer system are described elsewhere in this disclosure.

Another way to maintain tension on the filament is to use the approach(es) described above for disengaging (or "slipping") of the spool rotating system. In some embodiments, this can be achieved by overdriving the spool rotating system so that disengagement occurs at a desired level of tension of the feedstock that is sufficient to prevent spool tangling. Here is an example: If the controller requires 150 cm of feedstock to be retracted into the material pod, instead of the controller instructing the spool rotating system 340s to rotate the spooled feedstock the amount needed to retract 150 cm of filament (based on the diameter onto which it is winding the feedstock), the controller may instruct the spool rotating system 340s to rotate the spool by an amount that would wind 200 cm of feedstock onto the spool. In this case, the feedstock will be put under tension as the feedstock resists the rotation of the spool, which, e.g., will cause the stepper motor to stall and skip (or in some embodiments cause another selected approach to disengagement or "slipping"). The controller may cause rotation of the spool (such that filament is wrapped onto the spool) at a faster rate than the rate at which the feedstock is entering the material pod 300. In this situation, the feedstock would be under tension as the feedstock would resist the overdriving of the spool, leading to disengagement or "slipping." That is, instead of the controller calculating and sending instructions so that rotation of the spool consistently maintains the desired tension on the filament, the controller instructs the spool rotating system to overspin. By ensuring that the motor torque is insufficient to break the feedstock, the motor will stall/skip to maintain equilibrium, thus providing desired feedstock tension.

In some embodiments, the controller may reduce the motor torque during times that the motor is overdriving in order to reduce noise caused by skipping, as well as to reduce strain on the filament. As an example, continuing the case from the last example, the controller may instruct the motor torque to remain at full during the rotation of the spool for the first 100 cm of filament, where slipping is not expected, and then lower the motor torque for the second 100 cm of filament, where slipping is expected, so that the noise during such skipping is reduced.

Maintaining appropriate filament tension reduces risk of catastrophic failures caused by tangling of loose filament. A benefit of the above-described disengagement approaches is that in some embodiments, they obviate the need for a tension sensing module 310 in order to maintain tension of the filament inside the material pod.

The material pod 300 can include one or more internal sensors 352a that can relay to the controller 180 the status of various parameters, such as but not limited to, temperature, pressure, humidity, acceleration, material color or composition as determined by an optical sensor, etc. The sensor(s) 352a can include a camera for remote monitoring of operations.

The material pod 300 can include one or more reader sensors 304a, 304b that include an RFID/NFC reader or the like configured to read an RFID/NFC tag 306 or the like on the feedstock spool 120. The ability of the material pod to identify a given spool and to relay information including, but not limited to, serial number, material type, material amount, manufacturing data, etc. to the controller 180 enables the controller to automatically register the material into system control software. This obviates need for an operator to do this manually and likely reduces errors. In some embodiments, the reader sensor can also include a writer functionality that can write information on the spool.

Material pods 300 may need to be moved to various locations of an AM system, either manually, or automatically as in ACMW systems and processes. Accordingly, it is useful for the material pods to be modular and suitable for dense packing. In some embodiments, it is useful for the material pod to have integrated locating features and/or locking features for attaching the material pod 300 to other modules of the AM system and/or to the end effector 220 of the robotics system 200. Locating pins 324 can be conveniently positioned near the exit 338 where filament exits the material pod 300. Such positioning can permit configuration of the exit 338 elsewhere in the system with tight tolerance, such as, for example, at an inlet to a 3D printer 100. Alternatively, in some embodiments, a locating feature 328 can be embedded in the casing 376 wherein its geometry is able to engage (e.g., mate) with a corresponding feature (e.g., a hook feature) elsewhere in the AM system. The locating feature 328 can include an electromechanical lock 332, such as for example a solenoid, so that that control by the controller 180 is possible when locked in place. Alternatively, in certain embodiments, a mechanical lock, such as for example a cable-actuated latch, could be employed. In order for data and power for the material pod 300 to interface with other parts of the system, a printed circuit board (PCB) 326 or another suitable connector may be positioned at the outside of the material pod 300. The PCB 326 could for example include pogo pins or leaf spring pins that connect with corresponding electrical contacts elsewhere in the system. The interface between the material pod 300 and other modules is not limited to an electrical connection; it may also include one or more connectors to permit flow of air into and out of the material pod, such as for example, a connection to a vacuum line.

The material pod 300 can include one or more external sensors 352b that may be the same as or different from the internal sensors 352a. In some situations, a given AM system 160 may include hundreds or thousands of material pods 300 and it may be difficult for an operator to visually distinguish between the material pods to know what is inside. Accordingly, in some embodiments, the material pod 300 may include an external beacon 348 that produces an audible or visual signal (e.g., beeping sounds, a flashing light) to help an operator find a specific material pod 300. The material pod may conveniently include a battery 350 (e.g., a rechargeable battery) to permit certain functions, such as for example the locating beacon, to work even if the material pod 300 is not connected to power. In some embodiments, the material pod may include an antenna (not shown) for receiving wireless data such as call signals for the beacon, or for other one- or two-way data communication. An outgoing signal from the material pod 300 may function as a beacon, allowing a receiver, such as for example a mobile phone, to be used to locate the particular material pod.

In order to keep the feedstock material inside the material pod 300 dry, the material pod casing 376 can be sealed in some embodiments to have a moisture barrier when closed. In some embodiments, in order for the robotics of the ACMW system or an operator to access the interior of the material pod (e.g., to change build materials, to perform maintenance, etc.), the material pod 300 may have a door (not shown). The door may be configured to seal the material pod 300 when closed in order to keep out moisture. The seal at exit 338 may comprise a flexible material with a tight fit around filament that is passing through it, so that minimal air or moisture can flow past the exiting filament into the material pod, thereby maintaining integrity of material pod's moisture barrier. In some embodiments, when filament has been retracted inside the pod, a flap (not shown) on the exit seal may automatically close to seal an empty channel through which the filament had passed. Similarly, the flap could be configured to open when filament passes back into the channel and out of the material pod 300, so that the flap does not obstruct the filament's path.

In some embodiments, the material pod 300 can include a first means for moving air between two locations. The first air moving means 364 may have bi-directional functionality, i.e., be capable of permitting air movement into or out of the material pod 300. The air moving means may be passive, like a valve, or active, like a compressor, vacuum pump, etc. Pumping air out of the material pod can create a negative pressure inside the material pod that may be useful in a number of situations. First, such negative pressure may cause the flap of the exit seal 338 to be pulled inward, improving sealing. Second, a pressure sensor 352a can be used to measure pressure inside the material pod 300 and to quantify the integrity of the seal. If the first air moving means 364 activates a vacuum to remove air from the material pod, but the internal pressure does not change to a predefined threshold, the pressure sensor 352a could send a notification to an operator or to the controller 180 of the ACMW system so that the operator or the robotics 200 of the ACMW system, as the case may be, will service the material pod to repair the seal. Third, a negative pressure inside the material pod can help with drying of the filament, as negative pressure is known to help draw moisture from feedstock.

The material pod 300 may include an internal desiccant 354a that absorbs moisture inside the material pod. The material pod may include a heating element 356a to control the temperature inside the material pod and optionally a fan 374 to circulate the heat from the heating element 356a. It is known that elevating the temperature of feedstocks causes them to release moisture to help dry the filament. A combination of elevating the temperature and reducing the pressure will further aid in removing moisture from the material. Moisture that is released may be trapped by the desiccant 354a. Such drying processes can be controlled by the controller 180 and run in closed loop with the sensors 352a, wherein the sensors 352a include temperature and humidity sensors. For example, if a material's relative humidity threshold is set to be at 30% but the sensor 352a notifies the controller 180 that that the relative humidity is currently at 35%, the controller can activate a heating cycle based on a pre-set algorithm until the humidity falls below the threshold value. Alternatively, the controller can notify an operator and request that the desiccant be manually changed to fresh desiccant that has more capacity to absorb moisture and thereby lower the humidity. In an embodiment described below, the material pod may initiate an automated drying cycle. Such automated drying of filament can save operator time and/or improve printing performance, each lowering TCPP.

The desiccant 354a can fill up with moisture and decrease in effectiveness until eventually it is fully saturated and can no longer remove moisture. Accordingly, in some embodiments, the material pod can include an integrated desiccant recycling station 360. The station 360 can include the first air moving means 364 that connects the station 360 to outside the material pod, and the station 360 can include a second means for moving air between two locations 368 that connects the station 360 to the inside of the material pod.

Conveniently, the first air moving means 364 and the second air moving means 368 may independently be a valve or a vacuum. The recycling station 360 may include an air circulating fan 370, desiccant 354b, a heating element 356b, and sensor(s) 352c, which may be similar to sensors 352a or 352b. The desiccant recycling station 360 can work by first using the desiccant 354b to absorb moisture released from filament inside the material pod 300. The internal heating element 356a will warm the filament causing it to release moisture. The second air moving means (e.g., valve) 368 will be open, allowing air and moisture to travel into the station 360 to be absorbed by the desiccant 354b. After a drying cycle for the filament, the valve 368 could close and then the first air moving means 364 could open, exposing the desiccant 354b to the outside of the material pod 300. The heating element 356b, in combination with air circulating fan 370, can then heat the desiccant 354b causing it to release moisture that will then exit the material pod at the first air moving means 364. In the case where the first air moving means 364 comprises a compressor, the compressor can be used to reduce the pressure in the recycling station 360 to further pull moisture from the desiccant 354b and to move moist air outside of the material pod. The sensor(s) 352c may include humidity and temperature sensors that work in closed loop with the controller 180 to control such recycling process. In some embodiments, the controller 180 can employ the external sensor(s) 352b so that the humidity outside the material pod 300, inside the material pod 300, and inside the recycling station 360 can be compared by the controller 180 and used to determine drying temperatures and times. In some instances, the moisture outside of the material pod may be low enough that the air moving means 364, 368 (e.g., valves) can simply open to allow moisture to be pulled out of the material pod 300 without the need for additional heat, pressure differentials, or desiccant recycling.

Rotary Selector System

In some embodiments of ACMW technology, many feedstock materials, e.g., filaments, are needed, for example, to achieve a 3D printing workflow; in some instances, the need could be for 10 or more materials in a print. In some embodiments, 100 materials, 1000 materials, or more may be needed for a large scale ACMW system. Drive modules such as module 330 in the material pod 300 of FIG. 5A typically employ one or more drive wheel 334 powered by a motor to move filament precisely. Scaling up to many filaments while maintaining a ratio of one drive motor per filament could become expensive and/or require much space. It is desirable to have a minimal number of motors in the ACMW system as well as a high density of filaments and mechanics. It has been found that achieving a high density while having a system that is robust, reliable, precise, economical, and quiet is challenging, and a useful approach is described below.

A rotary selector system (RSS) has been developed that employs a rotating selector, wherein a plurality of materials can be independently driven and these materials can be arranged in high density. In one embodiment of the RSS, the inventors have achieved a density of 10 filaments in a spacing of 83 mm with an average spacing of 7 mm between filaments, which is believed to have never been achieved before. The drive force, applied across all 10 drives, has been measured and validated to be consistent to within ±5%, to have a drive force at each filament of 90 N or higher, and to have constraint within 1 mm on the full length of each filament on at least two opposing sides at a time. This is believed to have never been achieved before.

Figure 6:
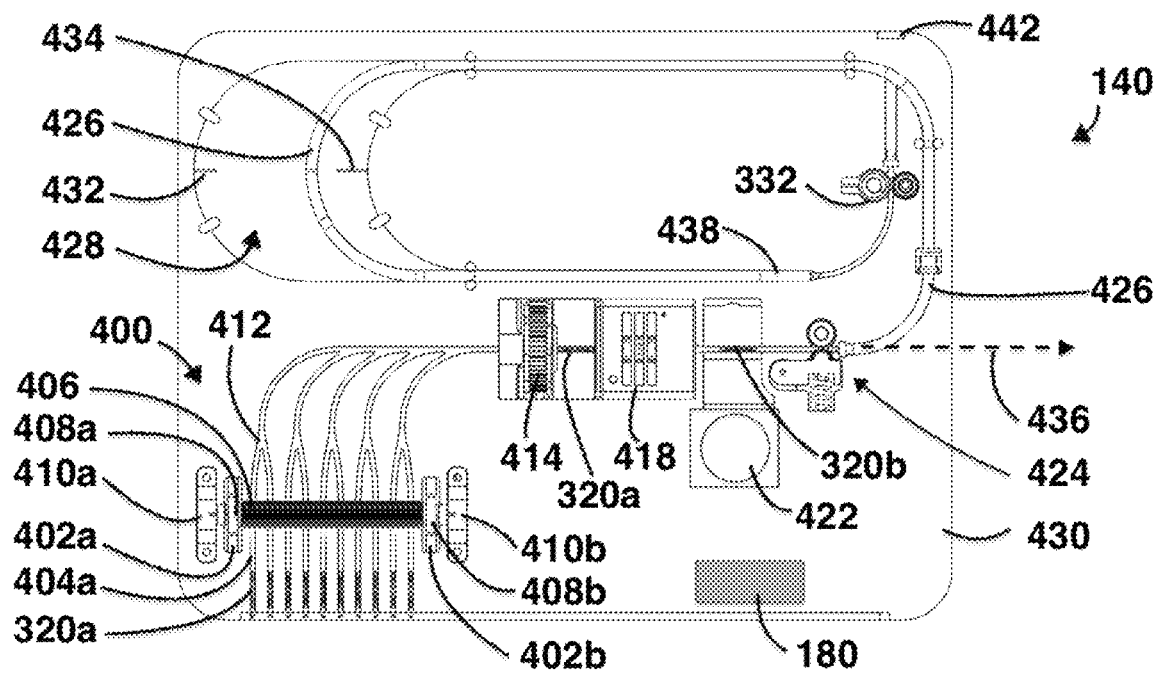
FIG. 6 illustrates a rotary selector system (RSS) including multiple drive channels to selectively drive feedstock according to an example embodiment. The RSS is shown coupled to a module implementing SEME technology. For ease of viewing, certain elements of the RSS are not shown in this figure.

An example RSS 400 can be seen in the bottom left of FIG. 6 for an exemplary embodiment of SEME technology 140. The depicted RSS has ten drive channels 404, each including filament sensor 320. Drive channel 404a with filament sensor 320a is shown at left-most position in substructure 430, and nine similar channels are shown beside it. All the filament channels 404 pass under drive gear 406, which is supported by drive gear bearing blocks 410a, 410b on substructure 430. The central axis running along the length of the drive gear 406 from block 410a to block 410b is located in a fixed position with respect to the substructure 430 and the drive gear 406 is able to rotate around its axis. The substructure 430 has cutouts that permit spacer disks 402a, 402b (obstructed from view) to engage with spacer disk bearings 408a, 408b positioned around the drive gear 406, as will be described in greater detail below. For each channel, a selector disk (see, e.g., 470a in FIG. 8) aligned with the channel cooperates with the drive gear 406 to form an input drive. The RSS is configured to activate any one of the input drives at a time such that the filament in the selected channel 404 can be driven forward or backward based on motorized control of the drive gear 406, while all of the filaments in the other channels 404 remain stationary and inactive. All of the filaments are constrained radially with between 0 and 5 mm of clearance, preferably 0.5 mm on at least one side at all times. That is, a barrier is present along the entire path of the filament on at least one side, where the barrier is spaced between 0 mm and 5 mm from the surface of the filament. This constraint is useful as it guides the filament along a path. Looser constraints, such as for example greater than 5 mm, can be problematic as the filament can buckle or jam more easily. A tighter constraint, such as for example 0.5 mm, is beneficial as it minimizes the ability for filament to buckle while also keeping friction low (as opposed to a 0 mm clearance which would have very high friction). When the filament enters the RSS it is constrained radially on all sides in channel 404. When the filament passes by the drive gear and it is in the section of channel 404 after the drive gear, the filament is also constrained radially on all sides in channel 404. When the filament passes by the drive gear, it is constrained on two opposite sides in the plane of the RSS in FIG. 6 and this constraint helps guide the filament as it passes by the drive gear.

In order for the RSS to be able to reliably pass filament by the drive gear 406 and through each channel 404, it is desirable that the filament be radially constrained. Since filament in some cases may be loaded into the RSS automatically, as would be the case when a MIMOS 190 feeds filament into a SEME module 140 as was described in a previous example, the constraint of the selected channel is useful to allow reliable automated loading. With a first motor 508b (not shown in FIG. 6, but shown in FIG. 8) being used to control the drive gear 406 and a second motor 508a (not shown in FIG. 6 but shown in FIG. 8) being used to control the selector disks 470 (not shown in FIG. 6, but 470a, 470f shown in FIG. 8), the RSS is able to selectively drive 10 different filaments using as few as two motors. This provides cost and density advantages in comparison to other systems that require one motor per input filament.

Although there are commercially available systems that employ a common drive gear and a rotating selection mechanism, we are not aware at the time of this disclosure of any system that has close radial constraint(s) for filament on at least one side of the filament along the entire path passing by the drive gear, which is a major shortcoming of these systems. Having unconstrained filament means that such systems cannot reliably load filament automatically, and accordingly such systems cannot be used in many of the applications discussed hereinabove.

Referring to FIG. 6, pairs of drive channels 404 merge after the drive gear 406 at location 412, and then these merged drive channels merge again on a path leading to a cutter module 414, which is configured to cut filament traveling through it. In some embodiments, the system can also include controller 180, splicer 418, filament sensors 320a, 320b, outgoing drive motor 424, buffer tube 426, telescopic buffer region 428, upper buffer sensor 432, and lower buffer sensor 434, where end 438 of the buffer tube 426 is constrained to travel linearly in a channel in substructure 430 to accommodate the expansion and contraction of the buffer tube 426 in the buffer region 428. The system can also include a scroll wheel 332 and a filament outlet 442 where feedstock leaves the SEME module 410. In some embodiments, the filament feedstock may leave the SEME module at path 436 instead of passing into the buffer tube 426. In some embodiments, a splicer is not included. For example, the SEME module can include the RSS 400, the cutter 414, and the filament sensor 320a, and the filament can pass directly out of the module to the path 436 to feed toward a print head 110 of a 3D printer 100. Many other combinations of components of a SEME module may usefully be combined with the RSS; the example of FIG. 6 is for illustrative purposes and is not meant to limit the way components/modules can work together.

Figures 7A, 7B:
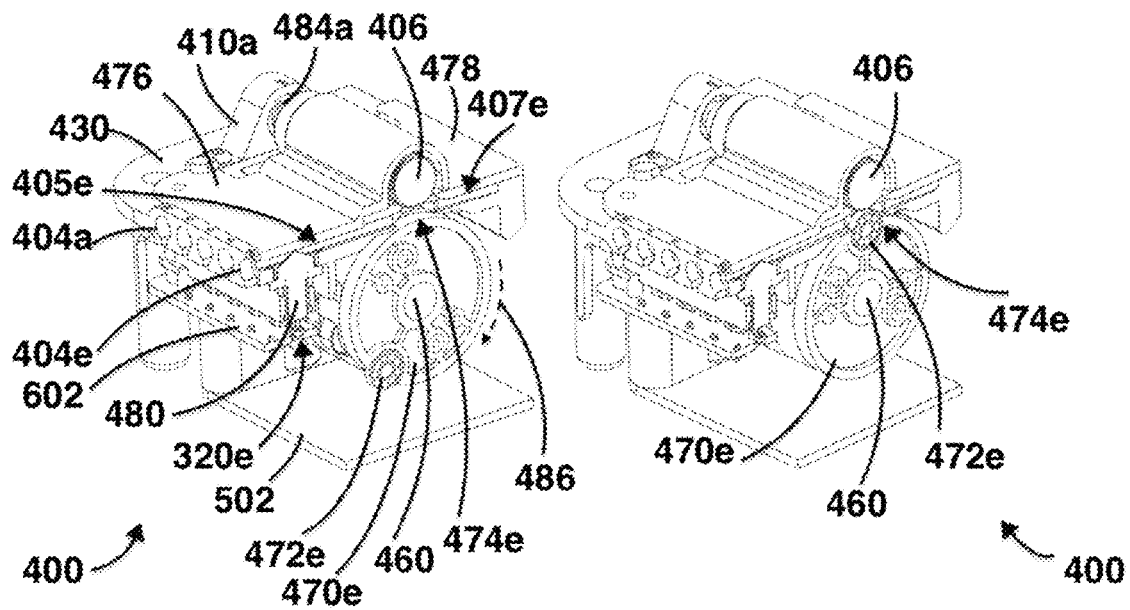
FIGS. 7A and 7B show isometric views of a cross section of five drive channels of exemplary RSS of FIG. 6.

FIG. 7A and FIG. 7B show isometric views of a cross section of the left-most five drive channels 404 of exemplary RSS 400. In FIG. 7A, drive channel 404e is inactive, and in FIG. 7B the drive channel 404e is active. Referring to FIG. 7A, the substructure 430 contains multiple drive channels 404, five of which are visible in the figure. The cross-section cuts through the middle region of the drive channel 404e revealing switch tab 480 of filament sensor 320e configured to detect the presence and position of filament in the channel, as will be described further for FIGS. 12A-12B and 13A-13B. The filament (not shown in FIGS. 7A-7B) can pass along ingoing path region 405e and travel through the drive channel 404e toward the drive gear 406. At the drive gear 406, the filament will pass over selector disk 470e in selective contact region 474e and then along outgoing path region 407e. In FIG. 7A, the selector disk idler 472e is not in contact with the filament at selective contact region 474e and thus the filament is disengaged or in an inactive state, wherein it can pass through channel 404e without interacting with drive gear 406. In this disengaged/inactive state, it can be beneficial to have a spacing between the drive gear 406 and the filament of, for example but not limited to, 0.01 mm-5 mm of space, such that the drive gear and the filament are not in contact. When the filament and drive gear are not in contact, rotation of the drive gear does not impart movement to the filament. This is beneficial since, if the drive gear 406 is engaging another filament in another channel that is active and the drive gear 406 is rotating to move that filament, it would be desirable for only the active filament to be actuated and for all others to be unaffected.

In some embodiments, there can be a selector disk 470 for each drive channel 404, wherein each selector disk 470 can have one or more selector disk idlers 472. Conveniently, there is one selector idler disk 472 per selector disk 470. For example, for the RSS 400 with 10 filament channels shown in FIG. 6, there can be 10 selector disk idlers that can be staggered and equally spaced radially by 36 degrees such that as the selector disks 470 rotate to different rotational angles, corresponding selector disk idlers engage with filament in selective contact region 474. Conveniently, selector disks may be rigidly attached to form a selector disk stack (obstructed from view in FIG. 7A but shown clearly in FIG. 8) that can be secured to selector disk shaft 460. The selector disk stack may rotate by control of a motor (shown in FIG. 8). When the selector disk stack rotates in direction 486, the selector disk idler 472e moves into 'contact with' the drive channel 404e at selective contact region 474e, where a portion of the disk idler 472e is positioned within the drive channel and below the drive gear 406, as illustrated FIG. 7B. With this rotation, the drive is in an active state wherein rotation of the drive gear 406 will actuate filament present in the drive channel 404e. A sensor 511 (FIG. 8) may be used to detect the angular position of the selector disk(s) such that the controller 180 can accurately activate and deactivate selected drives through actuation of the selector disks 470 by motor.

The ability of the RSS 400 to selectively disengage from one or more filaments permits the RSS to share a common drive gear for two or more filament channels. Additionally, this ability is beneficial when the RSS works along with other drive systems. Such benefit was described previously for the case of the spool drive wheel 342 and the material drive wheel 334 of the material pod 300 in FIG. 5A. There, the drive wheel geometry provided actuation of both the spool and filament, but also provided disengagement of both based on the angular position of the respective D-shaped wheels. Similar benefit is provided for the RSS 400, in that it is able to activate to actuate filament when in cooperation with the rotating drive gear 406 but also to selectively disengage from the filament by rotating into an inactive state.

In some embodiments, a portion of the drive channel 404 may be constrained by a removable cover 476 at the path region 405 and/or by a removable cover 478 at the path region 407, as depicted in FIG. 10A. Conveniently, the removable nature of a portion of the channel 404 may provide access for repair. The covers may also act as protective features to cover the drive gear 406 or other exposed hazards.

As described above, feeding of filament from the ingoing path regions 405, through the drive channels 404, to the outgoing path regions 407 without catching, jamming or tangling is beneficial for reliable operation of the system. Further, close radial constraints may be particularly useful for softer materials, such as for example thermoplastic polyurethane (TPU), that are more susceptible to buckling and jamming when pushed through a region with poor constraints. With the RSS 400, filament can be closely constrained radially and at path regions 405, 407, which can be seen in FIGS. 7A-7B, and will be shown in further detail in the following figures. In the selective contact region 474, however, the need for the drive gear 406 and the selector disk idler 472 to be able to contact the filament necessitates open areas on either side of the filament; i.e., constraints cannot be present in such contact areas. Constraints are present in the non-contact areas of the selective contact region, such as for example constraint/barrier 505 shown in FIG. 10A.

Given the limited volume in the area of the drive gear 406, selector disk 470 and drive channel 404, it could be challenging to provide sufficient material in this area to constrain the filament. Using thinner constraint material also could be challenging as it could be difficult to manufacture and/or have durability limits. For example, rotation of the selector disk idler 472 could damage the constraint/barrier material (e.g., the constraint/barrier 505 at the selective contact region 474), and damage thin constraint/barrier material in particular. In some embodiments, such challenges have been reduced or eliminated by employing a spacer disk 500 in a mechanism wherein the selector disk idler 472 follows a path that lowers the selector disk 470 and the selector disk idler 472 away from the drive gear 406 and the selective contact region 474 to avoid making contact with substructure 430 material in this region. Not only does the spacer disk 500 mechanism eliminate load being applied to the substructure in this region, but by controlling the selector disk idler 472 path to lower away during rotation, the constraint/barrier material used in this region can be thicker, since the selector disk idler 472 will not interfere with the material during its rotation and travel. Such controlled motion path of the selector disk(s) provided by the spacer disks 500 allows the constraint/barrier material to be thick enough and durable enough for reliable performance, enabling a feed path not prone to filament jamming.

Figure 8:
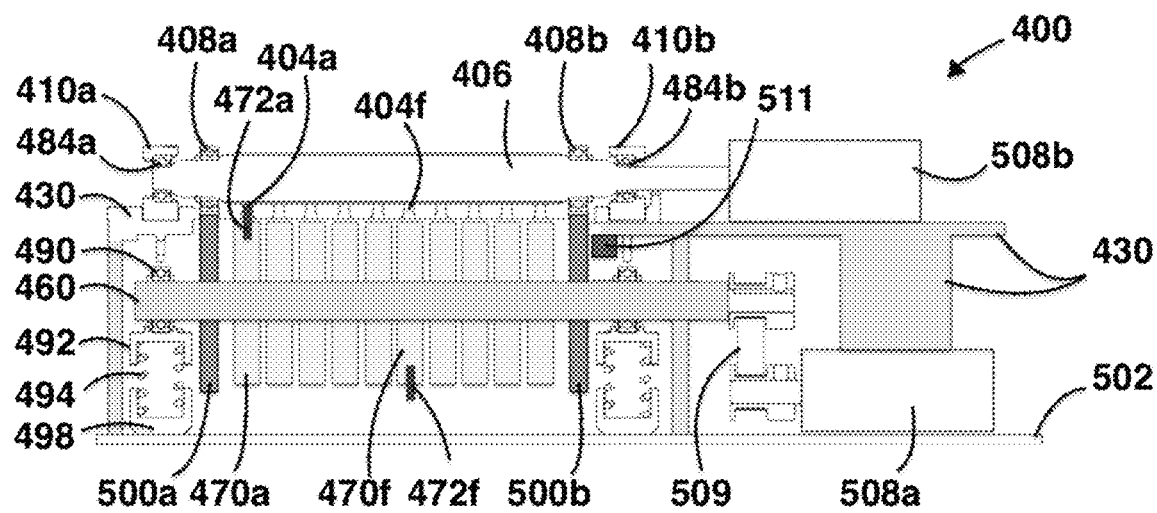
FIG. 8 shows a drive system according to an example embodiment.

FIG. 8 shows a cross section of RSS 400 through the drive gear 406 and selector disk shaft 460. Drive gear 406 is connected to the substructure 430 through the drive gear bearings 484a, 484b, and their respective drive gear bearing blocks 410a and 410b. Drive gear 406 is connected to motor 508b such that the motors rotation causes the drive gear 406 to rotate. The drive gear has spacer disk bearings 408a and 408b around it and engaging with the spacer disks 500a and 500b that are on the selector disk shaft 460. The ten selector disks (e.g., selector disks 470a, . . . , 470f, etc.) can be seen between the spacer disks and are all mechanically coupled such that the rotation of the selector disk shaft 460 causes rotation of all selector disks and spacer disks. Selector disk 470a is shown in an active position where the selector disk idler 472a is positioned to be in drive channel 404a at the drive gear 406. Selector disk idler 472f of selector disk 470f is also shown in this view and is at a position away from the drive gear 406 such that if filament was in drive channel 404f it would be inactive and disengaged. Selector shaft homing sensor 511 is used to detect the rotational position of the selector disk stack and spacer disks in order to help control motor 508 to engage the desired drive channel(s). As discussed further in FIG. 9A, the springs 494 are configured to bias the selector disk shaft 460 toward the drive gear 406 to force one or more selector disk idlers 472 into the filament to improve grip with the drive gear 406 as it rotates to drive filament. Selector disk shaft bearings 490 travel in channels in the substructure 430 to allow both rotation of the selector disk shaft 460 along its axis and also a "floating" linear motion of the axis towards and away from the drive gear. In order to accommodate this floating motion of the selector disk shaft 460 a belt 509 may be used to connect it to motor 508a. With motor 508a fixed to the substructure, the distance between it and the floating selector disk shaft 460 will change and since belts can perform with a relatively large range of tension, this system will allow for reliable torque transmission from the motor 508a to the selector disk shaft. By positioning the drive motor 508a further away from the plane connecting the length axis of the drive gear 406 and selector disk shaft 460, the belt is able to accommodate larger changes in position of the selector disk shaft 460 with minimal impact on belt tension. If a belt were not used, the motor would move with the floating selector disk shaft 460 which would complicate the constraint of the motor and could lead to reliability problems based on the motor wires being cyclically loaded. Support plate 502 may be connected to the substructure 430, the motor 508a, and the clamshell structure 498 to strengthen the RSS 400. For example, it was found that in some implementations presence of this support plate was useful to achieve reliable performance of the system.

The floating nature of the selector disk shaft 460 can lead to variable force transmission by selector disk idlers to the drive gear 406 at the filament, which is not desirable. When two springs are used that are equal in stiffness and preload, the strongest combined spring force will be realized at selector disk idlers closest to the center between the two springs, such as at drive channel 404f, where the force will be two times the spring force constant of the springs times the displacement of each spring. For selector disks further from the center such as selector disk 470a, the force at channel 404a can in some cases be 50% less than that of the middle at 404f and this variability can cause for poor uniformity of performance across the 10 drives of the RSS 400. For example, this double selector disk idler force at channel 404f may cause for filament to move at a slower rate due to excessive drive gear tooth bite-in to the filament. In order to overcome this drive-to-drive variability, one can implement a method for variable selector disk idler positions that accounts for this variability, as will be described next. For example, the distance between the axis of selector disk bearing 472a and selector disk shaft 460 is larger than that of selector disk bearing 472f and the selector disk shaft. This larger distance causes the selector disk to deflect further down when the selector disk bearing 472a engages with filament in channel 404a and this in turn causes for the spring to deflect further. The increased deflection of the spring causes an increase in the force the spring applies to the filament through the selector disk idler 472a. To design an RSS for consistency across drives, a force balance for any given selector disk bearing position in an RSS can be calculated to determine the appropriate spacing of the idler at that position. Varying this spacing to be smallest for the drives near the center between the springs, and largest for the drives that get closer to the springs, has been shown to reduce spring force variability from 50% down to as low as 0-5%.

A portion of the RSS 400 is shown in cross section in FIG. 9A, wherein the drive gear 406 in drive gear bearing 484a is in drive gear bearing block 410a, which secures it to the substructure 430. Selector disk shaft 460 is in selector disk shaft bearing 490 that is located in a channel in substructure 430 with sides 496 such that the bearing 490 can travel linearly up and down. The selector disk shaft bearing 490 has a spring 494 biasing it toward the drive gear 406 through bearing spring adaptor 492, forming a spring-biased or spring-loaded mechanism 495. The spring 494 is restrained by clamshell structure 498 that is secured to substructure 430 to form a closed structure around the spring-loaded mechanism 495. The clamshell structure 498 also has a support plate 502 to structurally reinforce the spring-biased selector disk shaft mechanism 495. The selector disk shaft bearing 490 permits free rotation of the selector disk shaft 460 in addition to the up and down sliding motion of the selector disk shaft bearing 490 mentioned above. In some embodiments, the selector disk shaft 460 may have one or more spring-biased mechanism(s) 495; for example, some embodiments may include two spring-biased mechanisms, one at either end of the selector disk shaft 460.

FIG. 9B shows a similar cross section view to FIG. 9A of the drive gear 406 and selector disk shaft 460, but in FIG. 9B the cross-section cuts through drive gear 406 and selector disk shaft 460 at spacer disk 500a. The spacer disk 500a has an outer profile including ten peaks 506 and ten valleys 504. The outer profile of the spacer disk 500a is engaged with spacer disk bearing 408a. As the selector disk shaft 460 rotates the spacer disk 500a, the outer profile of the spacer disk 500a will remain in contact with the spacer disk bearing 408a as the force of the spring-loaded mechanism 495 is biasing the spacer disk upward until the spacer disk 500a engages with the spacer disk bearing 408a. As the spacer disk 500a rotates from the position shown in FIG. 9B, the spacer disk will deflect the selector disk shaft 460 downward as the next peak 506 engages the spacer disk bearing 408a and then will return the selector disk shaft 460 back upward as the next valley 504 engages the spacer disk bearing 408a. Simply put, this mechanism will convert rotary motion of the selector disk support shaft 460 into linear motion separating the drive gear 406 from the selector disk shaft 460.

When the valley 504 of the spacer disk 500a is engaged with the spacer disk bearing 408a, this represents an active state of one or more selector disk idler(s) 472, as is shown in FIG. 10A and FIG. 10B. FIG. 10A shows a partially exploded view where the selector disk 470a, the selector disk idler 472a, the selector disk support shaft 460, and the spacer disk 500a (behind the plane of the selector disk 470a) are shown moved down below the substructure 430. Filament 121 is in the ingoing path region 405 and the spacer disk bearing 408a is visible behind the drive gear 406. The selector disk idler 472a is in line with the upper valley of the spacer disk 500a.

FIG. 10B shows the identical parts, as in FIG. 10A, not in an exploded view, wherein the valley 504 is engaged with the spacer disk bearing 408a and there is a small gap between the selector disk idler 472a and the drive gear 406. One benefit of the spacer disk 500a is that it permits this distance to be controlled. For example, if the valley 504 of the spacer disk 500a was made shallower, this would allow the drive gear 406 and the selector disk idler 472a to move closer together. The ability to control the size of this gap can permit wear on the bearing to be avoided, such that it will not rub the drive gear 406. In some embodiments, it may be preferable for the position of the selector disk idler to be spaced a predefined distance (e.g., 0.5 mm) as this permits material to be gripped better by the gear during loading.

When the filament 121 is advanced to the drive gear, the drive gear 406 will grip the filament, moving it in the channel and causing the selector disk shaft 460 to move away as the selector disk idler 472a is displaced by the filament and translates this displacement through the selector disk. The force of the spring-loaded mechanism 495 (see, e.g., FIGS. 8, 9A) that biases the selector disk support shaft 460 toward the drive gear 406 will be realized at the selector disk idler 472a, effectively pushing the filament 121 into the drive gear 406. This is beneficial as it allows the drive gear 406 to translate torque into linear force to move the filament and reduces risk of the drive gear 406 slipping on the filament 121. This can be seen in FIG. 11A, which is similar to FIG. 10B, although in FIG. 11A the filament 121 is engaged by the drive gear 406 and is separating the selector disk idler 472a from the drive gear 406 by an amount approximately equivalent to the thickness of the filament 121. In this active/engaged state, the spacer disk 500a is no longer engaged with the spacer disk bearing 408, as the filament 121 has pushed the selector disk 470 away from the spacer disk bearing 408 such that it no longer makes full contact. It can thus be appreciated that, when there is no filament 121 between the drive gear 406 and the selector disk idler 472, the load of the spring-loaded mechanism 495 is applied to the drive gear 406 through the spacer disk bearing. Similarly, when there is filament 121 between the drive gear 406 and the selector disk idler 472, the load of the spring-loaded mechanism 495 is applied to the drive gear via the filament. In both cases, the load is not applied to the substructure 430, which is beneficial.

FIG. 11B shows the selector disk 470a to have rotated approximately 36 degrees relative to its position in FIG. 11A. As the selector disk rotates, the selector disk idler 472a does not make contact with the substructure 430 at bottom surface location 512, where the substructure bottom surface has a cut-out to accommodate the selector disk idler. During the rotation, the profile of the spacer disk, e.g. spacer disk 500a, is able to space the selector disk shaft 460 such that the selector disk idler, e.g., selector disk idler 472a, has clearance with the bottom surface at any angular position of the selector disk shaft. Since the RSS is able to effectively translate loads to the drive gear, which is rigid and structurally linked to the spring-loaded mechanism 495, the force that the spring(s) 494 can apply to the selector disk idlers 472 can be relatively large without causing significant wear or damage to the thin sections of the substructure 430 that provide constraint for the filament channels 404.

In this embodiment of the RSS, the spacing between the drive gear and the filament is defined by the distance between the drive gear and the top surface of the channel that the filament is in. Since in this embodiment this spacing is fixed, it is important for there to be a spacing between the filament 121 and the drive gear 406 when the selector disk is disengaged or in an inactive state. A spacing of 0.5 mm was found through testing to be a convenient minimum distance, and a preferred distance was found to be between 0.5 mm and 2 mm. In an RSS with two or more filaments 121, having such spacing between the drive gear 406 and each filament means that the drive gear's 406 rotation will not affect the filament 121 position unless the filament 121 is biased toward the drive gear 406 by the selector disk idler. For example, if ten filaments were loaded into the RSS of FIG. 6 and only the selector disk 470 corresponding to the drive channel 404a was active, then as the drive gear 406 rotates, it will move the filament in drive channel 404a but will not move the filament in the other nine drive channels.

As has been described, the channel 404 that the filament 121 passes through helps to radially constrain the filament so that that filament can reliably pass through the system. Referring to FIG. 10A, it is understood that the filament 121 in the ingoing path region 405 of channel 404 is constrained on the top by the cover 476, on the bottom by the bottom of the channel in the substructure, on the back (behind the filament 121 in the view of FIG. 10A) by the back side of the channel in the substructure, and in the front by the other side of the channel in the substructure, which is cut away and thus not shown in the view of FIG. 10A. Accordingly, the filament in the ingoing path region 405 is tightly radially constrained on all sides, preferred. As the filament 121 enters below the drive gear and above the selector disk idler 472, the cover 476 ends and the substructure 430 has a cutout to allow the drive gear 406 and the selector disk idler 472 respectively to contact the filament. In this selective contact region 474, the filament 121 is not radially constrained fully on the top and bottom as it was in the ingoing path region 405.

Referring to FIG. 11B, when the selector disk is in a disengaged position, the outside of the selector disk 470a may act to partially enclose the selective contact region 474, helping to radially constrain the filament. The drive gear 406 may similarly act as a constraint in the upward direction. The RSS 400 can have substantial material thickness below the drive gear to act as a back wall and front wall (not shown in this cross section) to constrain the filament as it travels, due to the spacer disks not directly applying load to the substructure, especially the thin section between the drive gear 406 and the selector disk idlers 472. In this region at the drive gear where there are a front wall and back wall, the front and back walls act as opposite sides that closely constrain with the filament. The other two sides (top and bottom) have some level of constraint from the drive gear and selector disk assembly as described, but this is a looser constraint than the constraint on the front and back, or the constraint on the top and bottom in the ingoing path region 405. Through diligent testing with many different types of filament, embodiments of the RSS 400 similar to what is shown in FIG. 6-11 have been shown to work reliably. Presence of the constraint/barrier 505 between the ingoing path region 405 and the drive gear 406 was shown in testing to substantially improve reliable filament loading.

Advanced Filament Sensor

Constraint of filament as described above is needed for reliable control of a wide range of different types of filaments. However, when it comes to providing sensors for sensing or measuring filament, it is challenging to maintain tight radial constraint of the filament. For example, for a filament sensor using a limit switch that engages the filament in order to detect its presence, the arm from the limit switch must enter into the filament channel. To allow the arm to enter, a cutout must be created in the channel, but such cutout would ordinarily remove at least one side of the channel, reducing constraint in that region. This can commonly lead to material jamming, as sharp fragments of filament can get caught in the cutout region where the constraint ends. Dust or other debris that commonly travels alongside filament can also accumulate in such regions and eventually cause sensor failure.

Provided is a novel filament sensor that can reliably sense filament while maintaining radial constraint of the filament. In FIG. 12A, a filament sensor 320 is shown in cross section, wherein a switch tab 480 is in a thin slot in a housing body 608. The switch tab 480 is biased into filament channel 626 by spring 604 constrained in spring housing 606, which may be mounted to the housing body 608. The switch tab 480 includes contact surfaces 612 angled such that contact from filament 121 traveling in the channel 626 toward the filament tab will cause a component of the contact force to move the switch tab 480 away from and perpendicular to the length of the filament. A section of the switch tab extends into the inside of the spring 604, and a bottom surface 616 of the switch tab is positioned close to a switch tab sensor 600 with a sensing position 614. The switch tab sensor 600 is optionally mounted to a printed circuit board 602. When filament contacts the switch tab 480, it causes the switch tab to move toward the switch tab sensor 600 as shown in FIG. 12B, triggering the switch tab sensor 600 to detect the switch tab 480. In certain embodiments, the switch tab sensor can be an optical interrupt and the switch tab 480 can break the beam of the switch tab sensor, causing it to send a signal to a controller (not shown). The switch tab 480 may be made from any of a variety of materials, including polymers, ceramics, and metals. In certain embodiments, the switch tab 480 may be made from hardened steel such that it can be thin but very strong and abrasion-resistant. The inside geometry of the filament channel 626 may include chamfers 620 and 618 to help prevent the filament 121 from catching on any edges created by the cutout in the channel 626 for the switch tab 480. Having the switch tab 480 be thin, such as for example 0.5 mm thick, allows the cutout to be relatively small, so as to maintain constraint on the filament. One or more sides of the channel 626 may be removable, such as for example top cover 610 shown in FIG. 12A.

Figures 13A, 13B:
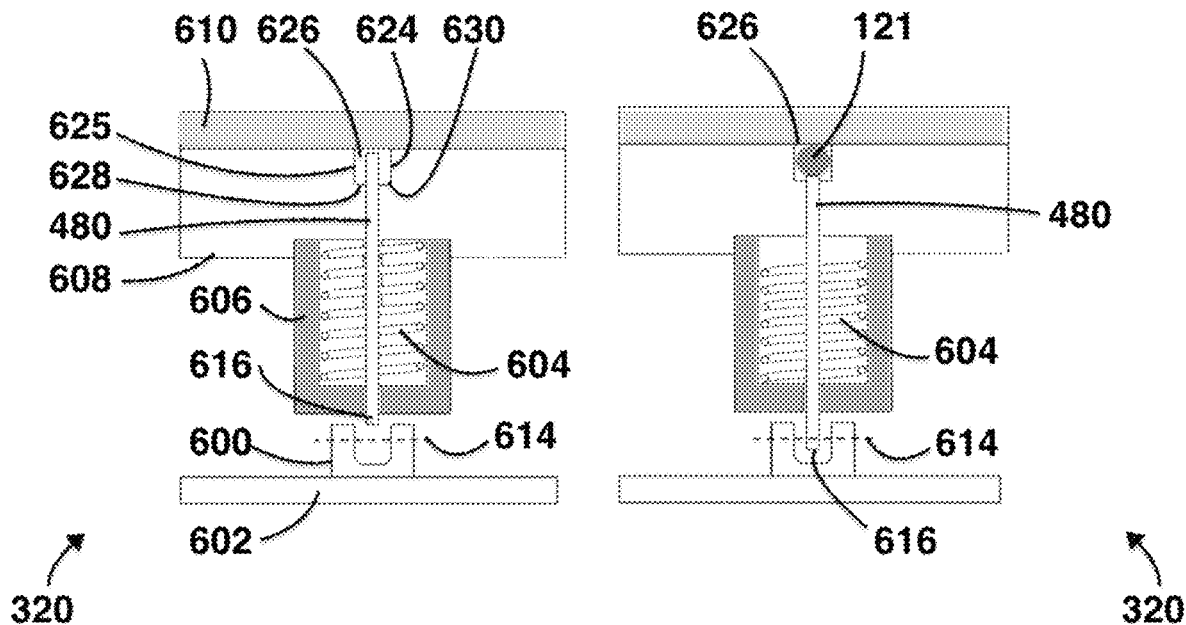
FIGS. 13A and 13B show sectional views of the filament sensor of FIGS. 12A and 13B, respectively.

The same filament sensor 320 is shown in FIG. 13A and FIG. 13B, also in a cross section view but orthogonal to the views of FIGS. 12A and 12B that looked at the length of the filament. Here FIG. 13 looks at a cross section of the filament. Accordingly, in the views of FIG. 13A and FIG. 13B, the constraint of the channel 626 is more apparent. The top of the channel is formed by the top cover 610. The left side 625 and right side 624 are formed by the housing body 608, as are the bottom left 628 and bottom right 630 constraints. It can thus be seen that in this square channel, the filament has radial constraint on all four sides. This is made possible by the switch tab being so thin that it only takes up a portion of one side of the channel 626. While this channel is being shown as a square, it should be understood that when reference is made herein to a channel, the channel need not be square; alternatively, the channel could be circular, rectangular, or have another cross section to constrain the filament.

In certain preferred embodiments, the switch tab has less than half the thickness of the filament. Thus, the constraint provided on the side of the channel having a cutout for the switch tab 480 is half or more of the filament width, for significant filament constraint.

It can be seen in FIG. 13B that when the filament 121 is above the switch tab 480, the bottom of the switch tab 616 passes the sensing position 614 of sensor 616.

The tolerance between the switch tab 480 and the spring 604 may be tight, such that the spring 604 positions the tab so as to minimize its contact with the housing body 608. Testing has shown that friction between the switch tab 480 and the housing body 608 can negatively impact performance and thus minimizing or eliminating contact between the switch tab and the housing body is preferred.

The filament sensor 320 offers many advantages over common solutions in the market today as it provides tight radial constraint of the filament through the entire sensing path, reducing or eliminating risk of the filament binding or jamming. In some embodiments, the switch tab exposed in the filament channel is symmetrical, which means that it can perform well in both directions of filament travel. Since the switch tab 480 is independent of and in some cases never in contact with the switch tab sensor 600, any prolonged use, vibrations, wear, or other loads put on the switch tab by the filament are not directly applied to the switch tab sensor, helping improve its durability.

Figure 14:
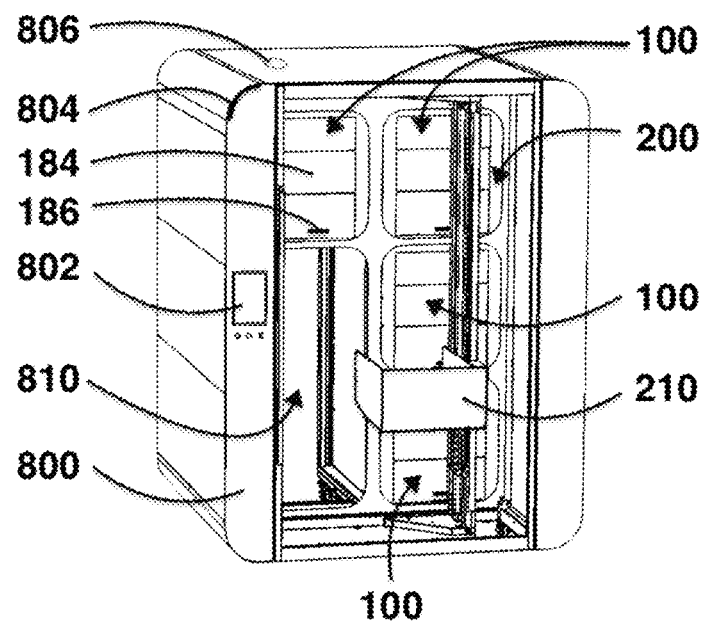
FIG. 14 shows an ACMW system including four 3D printers and a robotic system according to an example embodiment.

FIG. 14 shows an exemplary embodiment of an ACMW system having a casing 800 that houses four 3D printers 100. Each 3D printer 100 is shown with doors 184 with handles 186 that may be opened manually or using the end effector 210 of robotic system 200. The casing 800 includes a user interface screen 802, an illuminated indicator light bar 804, and an exhaust outlet 806. The robotic system 200 including end effector 210 is able to access all four 3D printers 100 as well as the storage area 810, where a mobile cart for storage may be installed (not shown). Multiple ACMW systems can work in parallel.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A method for configuring an additive manufacturing system for automated 3D printing, the system comprising two or more 3D printers configurable to sequentially print parts on the same or a combination of the two or more 3D printers, and two or more non-uniform modules for use in or with the two or more 3D printers, the method comprising, with a controller:
   a) determining a 3D printing workflow according to a production objective; and
   b) driving a workflow configuration device to configure at least two of the 3D printers and the non-uniform modules, wherein at least one of the non-uniform modules is physically added to or removed from at least one of the 3D printers, to achieve the 3D printing workflow, wherein the non-uniform modules are shared among the two or more 3D printers.

2. The method of claim 1, wherein the workflow configuration device includes robotics to move at least one of the 3D printers and the non-uniform modules.

3. The method of claim 1, wherein the two or more non-uniform modules include a feedstock source, wherein the feedstock source comprises at least one feedstock, and a material drive module configured to actuate the feedstock.

4. The method of claim 1, wherein the two or more non-uniform modules include one or more feedstock sources, wherein the one or more feedstock sources comprise at least one feedstock and a material drive module configured to actuate the feedstock, and wherein the workflow configuration device is operationally coupled between the feedstock sources and the two or more 3D printers.

5. The method of claim 4, wherein the controller is configured to drive the workflow configuration device to selectively link the one or more feedstock sources to the two or more 3D printers.

6. The method of claim 1, wherein each of the two or more 3D printers includes a door configured to be automatically opened to remove a printed part, or configured to be automatically closed to begin a print, or both.

7. The method of claim 1, wherein the controller drives the workflow configuration device to remove a printed part by removing a build platform on which the part was printed.

8. The method of claim 7, wherein the controller drives the workflow configuration device to place the removed build platform in a storage area of the system.

9. The method of claim 8, wherein the storage area includes a shelf and wherein the controller is configured to determine a position on the shelf based on a height of a printed part to achieve a tight storage density.

10. The method of claim 1, wherein the controller is configured to determine the 3D printing workflow by selecting the 3D printing workflow from workflow options, the workflow options being computed by the controller or predetermined.

11. The method of claim 1, wherein the two or more non-uniform modules include two or more build platforms that are non-uniform, wherein the build platforms differ in one or more of size, shape, type of build surface, absence or presence of interface layers, and thermal characteristics.

12. The method of claim 1, wherein configuring a selected 3D printer of the two or more 3D printers comprises uncoupling the selected 3D printer from a first module of the two or more non-uniform modules and coupling the selected 3D printer to a second module of the two or more non-uniform modules to achieve the 3D printing workflow.

13. The method of claim 1, wherein the two or more non-uniform modules include two or more print heads that are non-uniform, wherein the print heads differ in one or more of temperature range, wear resistance, and nozzle orifice size.

14. The method of claim 1, wherein the system includes one or more sensors to detect a status of the 3D printing workflow and relay the detected status to the controller.

15. The method of claim 14, wherein the one or more sensors include one or more 3D scanners, cameras, load cells, filament measurements sensors, motor torque measurements, or combinations thereof.

16. The method of claim 14, wherein the controller is configured to stop the 3D printing in response to the detected status.

17. The method of claim 14, wherein the controller is configured to drive the workflow configuration device to reconfigure the at least one of the 3D printers and the non-uniform modules in response to the detected status of the 3D printing workflow.

18. The method of claim 17, wherein the controller is configured to stop the 3D printing in response to the detected status before the reconfiguring of the at least one of the 3D printers and the non-uniform modules.

19. The method of claim 1, wherein the two or more non-uniform modules include a fan, an air filter, a build platform, a print head, or a series enabled multi-material extrusion (SEME) module.

20. The method of claim 1, wherein the two or more non-uniform modules include another 3D printer.

21. The method of claim 1, wherein the at least one of the non-uniform modules is physically removed from a first 3D printer of the two or more 3D printers and then physically added to a second 3D printer of the two or more 3D printers.

22. The method of claim 1, wherein the workflow configuration device is configured to achieve the 3D printing workflow by enabling a first and second 3D printer of the two or more 3D printers to print in parallel.

23. A method for configuring an additive manufacturing system for automated 3D printing, the system comprising two or more 3D printers configurable to sequentially print parts on the same or a combination of the two or more 3D printers, and two or more non-uniform modules for use in or with the two or more 3D printers, the method comprising, with a controller:
 a) determining a 3D printing workflow according to a production objective; and
 b) driving a workflow configuration device to configure at least two of the 3D printers and the non-uniform modules, wherein at least one of the non-uniform modules is physically removed from a first 3D printer of the two or more 3D printers and then physically added to a second 3D printer of the two or more 3D printers, to achieve the 3D printing workflow.

* * * * *